(12) United States Patent
Tsukagoshi

(10) Patent No.: US 12,499,909 B2
(45) Date of Patent: Dec. 16, 2025

(54) INFORMATION PROCESSING APPARATUS, INFORMATION PROCESSING METHOD, AND PROGRAM

(71) Applicant: FUJIFILM Corporation, Tokyo (JP)

(72) Inventor: Kazuma Tsukagoshi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/643,597

(22) Filed: Apr. 23, 2024

(65) Prior Publication Data

US 2024/0274156 A1    Aug. 15, 2024

Related U.S. Application Data

(63) Continuation of application No. 17/933,641, filed on Sep. 20, 2022, now Pat. No. 11,996,122, which is a
(Continued)

(30) Foreign Application Priority Data

Mar. 31, 2020   (JP) .................................. 2020-064619

(51) Int. Cl.
*G11B 27/02* (2006.01)
*G06T 11/60* (2006.01)
*G06V 20/40* (2022.01)

(52) U.S. Cl.
CPC .............. *G11B 27/02* (2013.01); *G06T 11/60* (2013.01); *G06V 20/41* (2022.01); *G06V 20/48* (2022.01)

(58) Field of Classification Search
CPC ........ G11B 27/02; G06V 20/41; G06V 20/48; G06T 11/60
See application file for complete search history.

(56) References Cited

U.S. PATENT DOCUMENTS 9,286,706 B1    3/2016   Krishnaswamy et al.
10,015,463 B2   7/2018   Brahms et al.
(Continued)

FOREIGN PATENT DOCUMENTS

JP    2006-166208 A    6/2006
JP    2007-267356 A    10/2007
(Continued)

OTHER PUBLICATIONS

International Search Report issued in PCT/JP2020/040102; mailed Jan. 12, 2021.
(Continued)

*Primary Examiner* — Mishawn N. Hunter
(74) *Attorney, Agent, or Firm* — Studebaker Brackett PLLC

(57) ABSTRACT

An information processing apparatus acquires editing target image data including video image data, acquires first display image data of a plurality of frames, generates second display image data of a plurality of frames determined in accordance with the number of frames of the first display image data from the editing target image data, and displays display images of a plurality of frames indicated by the second display image data of the plurality of frames on a display. The editing target image data and the first display image data of the plurality of frames are image data having a common attribute. The second display image data of the plurality of frames includes second display image data for video images of a plurality of frames corresponding to still image data of a plurality of frames constituting at least a part of the video image data.

4 Claims, 43 Drawing Sheets

Related U.S. Application Data continuation of application No. PCT/JP2020/040102, filed on Oct. 26, 2020.

(56) References Cited

U.S. PATENT DOCUMENTS

| | | |
|---|---|---|
| 2006/0126963 A1 | 6/2006 | Sonoda et al. |
| 2007/0223878 A1 | 9/2007 | Abe et al. |
| 2011/0181617 A1* | 7/2011 | Tsuda .................. G06F 3/04815 |
| | | 345/619 |
| 2011/0243452 A1 | 10/2011 | Sakaguchi et al. |
| 2012/0154419 A1* | 6/2012 | Nagata .................... H04N 5/76 |
| | | 345/581 |
| 2019/0147292 A1 | 5/2019 | Watanabe et al. |

FOREIGN PATENT DOCUMENTS

| | | |
|---|---|---|
| JP | 2011-215963 A | 10/2011 |
| JP | 2014-146939 A | 8/2014 |

OTHER PUBLICATIONS

International Preliminary Report on Patentability (Chapter I) and Written Opinion of the International Searching Authority issued in PCT/JP2020/040102; issued Sep. 29, 2022.

* cited by examiner

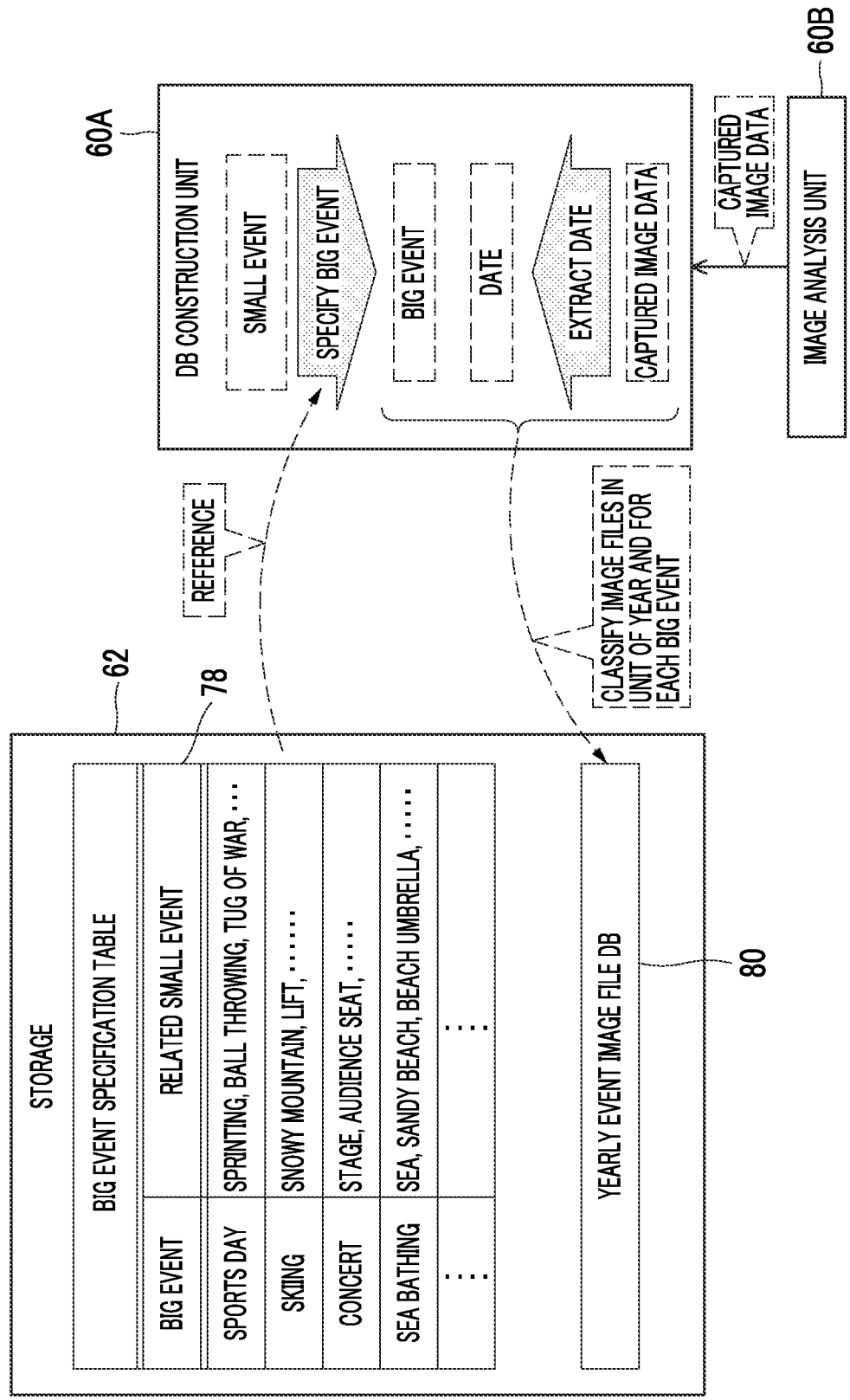

FIG. 13

YEARLY EVENT IMAGE FILE DB /80

| FILE NAME | ORIGINAL IMAGE DATA | BIG EVENT | SMALL EVENT | DATE | IMAGING POSITION | IMAGING PERSON | MODEL | IMAGING TIME |
|---|---|---|---|---|---|---|---|---|
| SPORTS DAY A.jpg | ORIGINAL IMAGE DATA A1 | SPORTS DAY | SPRINTING | X MONTH X DAY, 2018 | LATITUDE: Y1 LONGITUDE: X1 ALTITUDE: Z1 | TARO FUJI | ●●A | — |
| SPORTS DAY B.mpg | ORIGINAL IMAGE DATA C1 TO C500 | SPORTS DAY | SPRINTING | X MONTH X DAY, 2018 | LATITUDE: Y1 LONGITUDE: X1 ALTITUDE: Z1 | TARO FUJI | ●●A | 17 SECONDS |
| SPORTS DAY C.jpg | ORIGINAL IMAGE DATA B1 | SPORTS DAY | SPRINTING | X MONTH X DAY, 2018 | LATITUDE: Y2 LONGITUDE: X2 ALTITUDE: Z1 | JIRO FUJI | ▲▲B | — |
| SPORTS DAY D.mpg | ORIGINAL IMAGE DATA D1 TO D700 | SPORTS DAY | TUG OF WAR | X MONTH X DAY, 2018 | LATITUDE: Y3 LONGITUDE: X3 ALTITUDE: Z1 | SABURO FUJI | ××C | 24 SECONDS |
| SKIING E.jpg | ORIGINAL IMAGE DATA E1 | SKIING | SKI SLOPE | X MONTH X DAY, 2018 | LATITUDE: Y100 LONGITUDE: X100 ALTITUDE: Z100 | TARO FUJI | ●●A | — |
| SKIING F.mpg | ORIGINAL IMAGE DATA F1 TO F700 | SKIING | SKI SLOPE | X MONTH X DAY, 2018 | LATITUDE: Y101 LONGITUDE: X101 ALTITUDE: Z101 | TARO FUJI | ●●A | 24 SECONDS |
| ⋮ | ⋮ | ⋮ | ⋮ | ⋮ | ⋮ | ⋮ | ⋮ | ⋮ |
| SPORTS DAY L.jpg | ORIGINAL IMAGE DATA L1 | SPORTS DAY | SPRINTING | X MONTH X DAY, 2019 | LATITUDE: Y5 LONGITUDE: X5 ALTITUDE: Z1 | TARO FUJI | ●●A | — |
| SPORTS DAY M.jpg | ORIGINAL IMAGE DATA M1 | SPORTS DAY | SPRINTING | X MONTH X DAY, 2019 | LATITUDE: Y5 LONGITUDE: X5 ALTITUDE: Z1 | TARO FUJI | ●●A | — |
| SPORTS DAY N.mpg | ORIGINAL IMAGE DATA N1 TO N800 | SPORTS DAY | SPRINTING | X MONTH X DAY, 2019 | LATITUDE: Y6 LONGITUDE: X6 ALTITUDE: Z1 | JIRO FUJI | ▲▲B | 27 SECONDS |
| ⋮ | ⋮ | ⋮ | ⋮ | ⋮ | ⋮ | ⋮ | ⋮ | ⋮ |

FIG. 14

2018-YEAR FIRST EVENT IMAGE FILE DB

| FILE NAME | ORIGINAL IMAGE DATA | LARGE CLASSIFICATION | SMALL CLASSIFICATION | DATE | IMAGING POSITION | IMAGING PERSON | MODEL | IMAGING TIME |
|---|---|---|---|---|---|---|---|---|
| SPORTS DAY A.jpg | ORIGINAL IMAGE DATA A1 | SPORTS DAY | SPRINTING | X MONTH X DAY, 2018 | LATITUDE: Y1 LONGITUDE: X1 ALTITUDE: Z1 | TARO FUJI | ●●A | — |
| SPORTS DAY B.mpg | ORIGINAL IMAGE DATA C1 TO C500 | SPORTS DAY | SPRINTING | X MONTH X DAY, 2018 | LATITUDE: Y1 LONGITUDE: X1 ALTITUDE: Z1 | TARO FUJI | ●●A | 17 SECONDS |
| SPORTS DAY C.jpg | ORIGINAL IMAGE DATA B1 | SPORTS DAY | SPRINTING | X MONTH X DAY, 2018 | LATITUDE: Y2 LONGITUDE: X2 ALTITUDE: Z1 | JIRO FUJI | ▲▲B | — |
| SPORTS DAY D.mpg | ORIGINAL IMAGE DATA D1 TO D700 | SPORTS DAY | TUG OF WAR | X MONTH X DAY, 2018 | LATITUDE: Y3 LONGITUDE: X3 ALTITUDE: Z1 | SABURO FUJI | ××C | 24 SECONDS |
| .... | .... | .... | .... | .... | .... | .... | .... | .... |

2018-YEAR NTH EVENT IMAGE FILE DB

FIG. 15

2019-YEAR FIRST EVENT IMAGE FILE DB

| FILE NAME | ORIGINAL IMAGE DATA | LARGE CLASSIFICATION | SMALL CLASSIFICATION | DATE | IMAGING POSITION | IMAGING PERSON | MODEL | IMAGING TIME |
|---|---|---|---|---|---|---|---|---|
| SPORTS DAY L.jpg | ORIGINAL IMAGE DATA L1 | SPORTS DAY | SPRINTING | X MONTH X DAY, 2019 | LATITUDE: Y5 LONGITUDE: X5 ALTITUDE: Z1 | TARO FUJI | ●●A | — |
| SPORTS DAY M.jpg | ORIGINAL IMAGE DATA M1 | SPORTS DAY | SPRINTING | X MONTH X DAY, 2019 | LATITUDE: Y5 LONGITUDE: X5 ALTITUDE: Z1 | TARO FUJI | ●●A | — |
| SPORTS DAY N.mpg | ORIGINAL IMAGE DATA N1 TO N800 | SPORTS DAY | SPRINTING | X MONTH X DAY, 2019 | LATITUDE: Y6 LONGITUDE: X6 ALTITUDE: Z1 | JIRO FUJI | ▲▲B | 27 SECONDS |

. . . .

2019-YEAR NTH EVENT IMAGE FILE DB

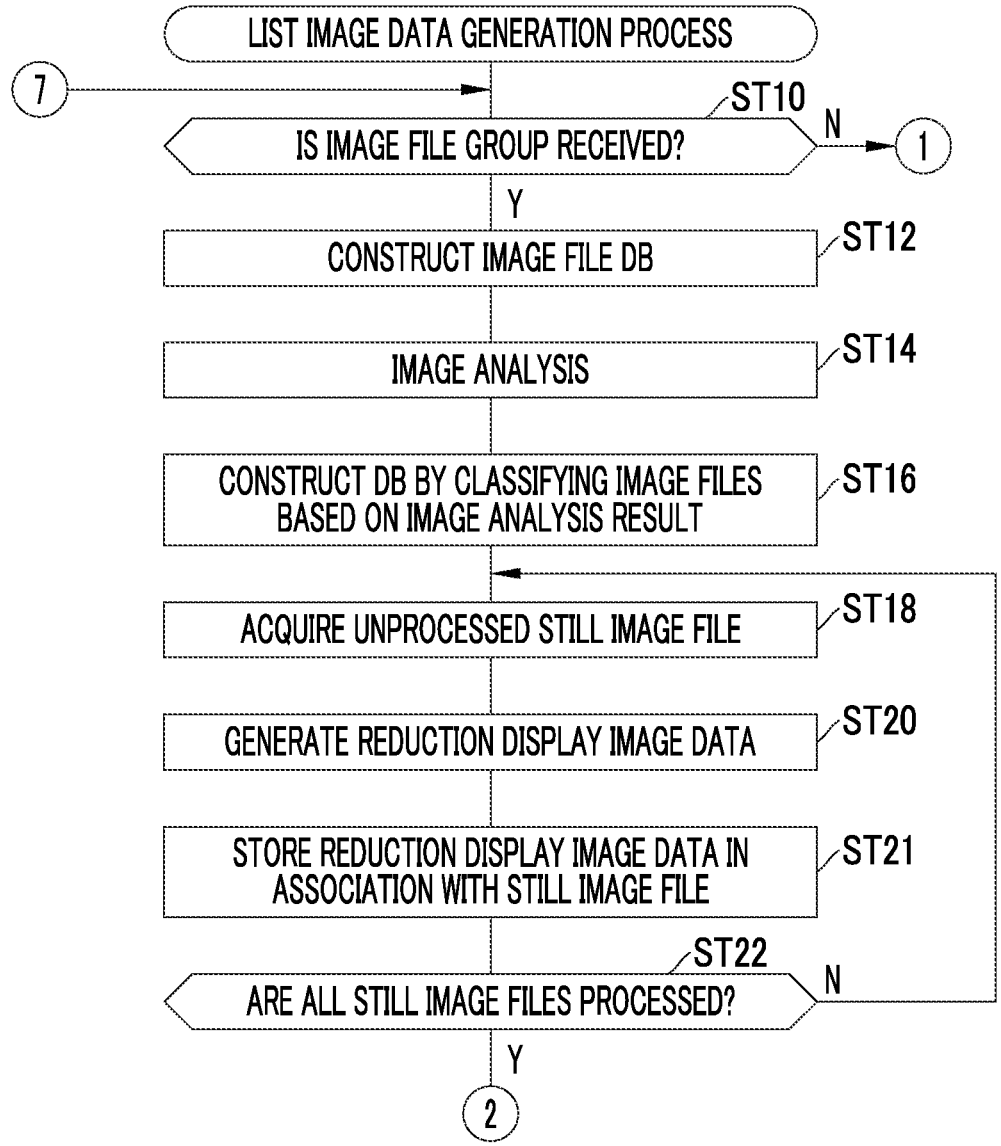

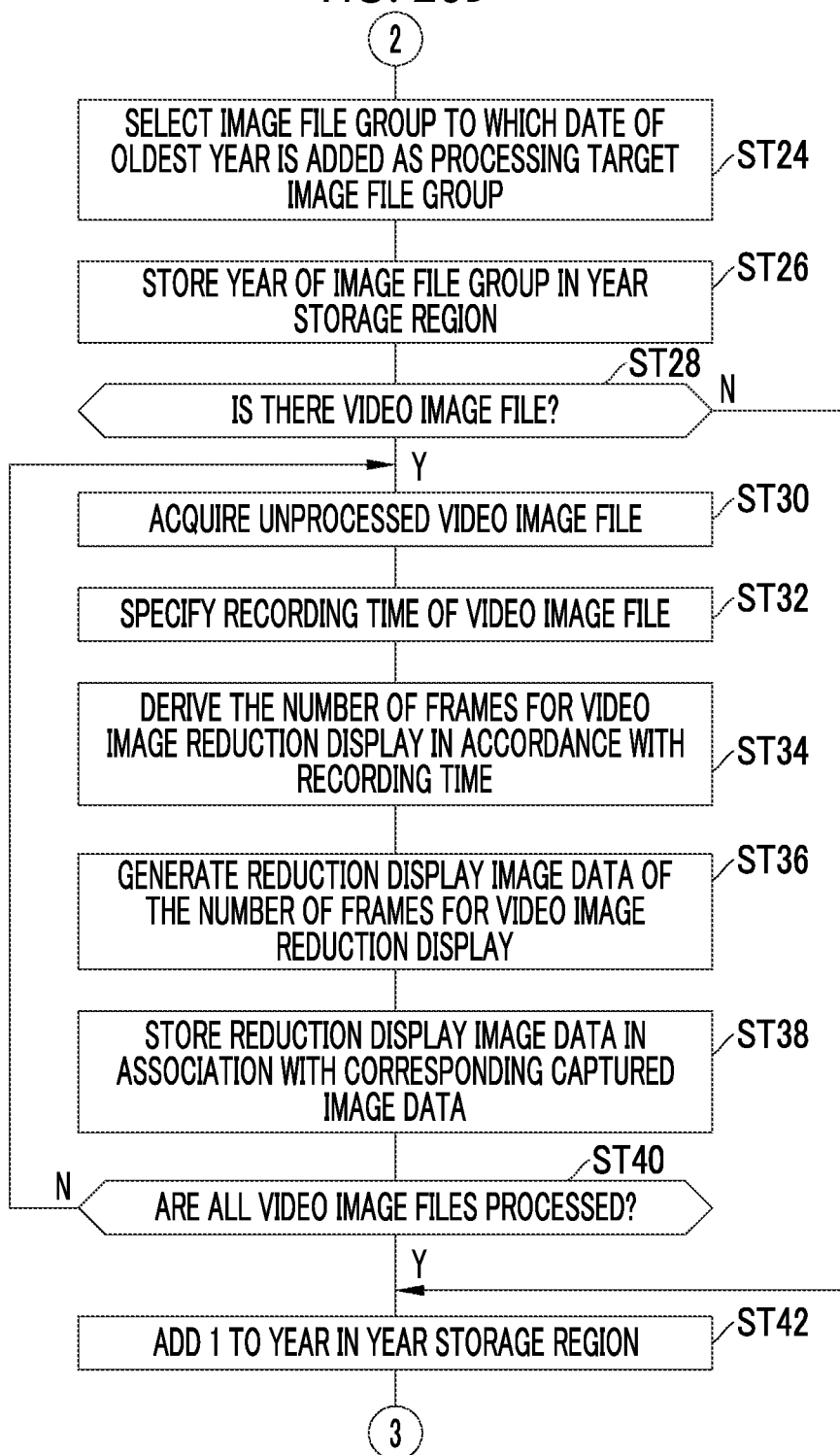

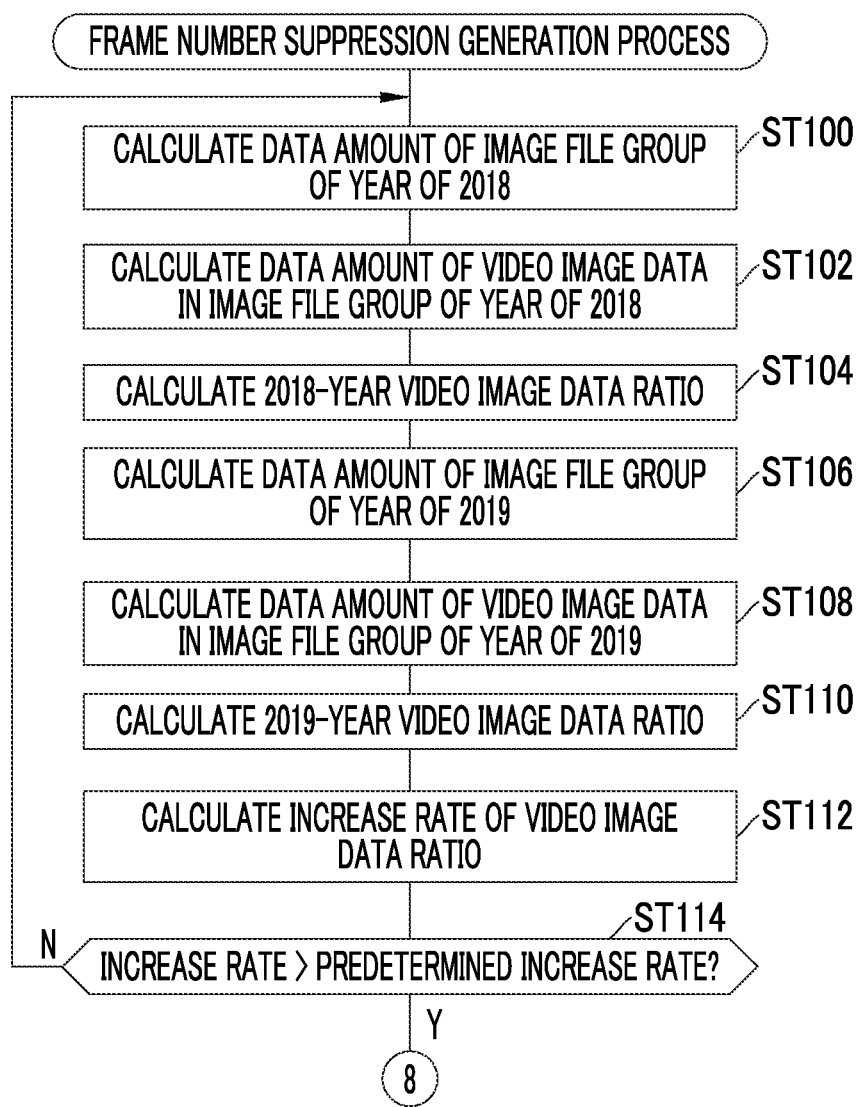

FIG. 37

| FRAME NUMBER DERIVATION TABLE ||| 
|---|---|---|
| MINIMUM NUMBER OF FRAMES | 2018-YEAR VIDEO IMAGE DATA RATIO | THE NUMBER OF FRAMES OF ADJUSTMENT FRAME DISPLAY IMAGE DATA |
| SMALLER THAN 10 FRAMES | LOWER THAN 10% | 1 |
| | EQUAL TO OR HIGHER THAN 10% AND LOWER THAN 20% | 2 |
| | EQUAL TO OR HIGHER THAN 20% AND LOWER THAN 30% | 3 |
| | ⋮ | ⋮ |
| EQUAL TO OR LARGER THAN 10 FRAMES AND SMALLER THAN 20 FRAMES | LOWER THAN 10% | 1 |
| | EQUAL TO OR HIGHER THAN 10% AND LOWER THAN 20% | 2 |
| | EQUAL TO OR HIGHER THAN 20% AND LOWER THAN 30% | 3 |
| | ⋮ | ⋮ |
| ⋮ | ⋮ | ⋮ |

| SHORTAGE NUMBER OF FRAMES | FRAME NUMBER DERIVATION TABLE 88 | |
|---|---|---|
| | IMAGING TIME INTERVAL | THE NUMBER OF FRAMES OF ADJUSTMENT FRAME DISPLAY IMAGE DATA |
| SMALLER THAN 10 FRAMES | SHORTER THAN 1 SECOND | 1 |
| | EQUAL TO OR LONGER THAN 1 SECOND AND SHORTER THAN 5 SECONDS | 2 |
| | EQUAL TO OR LONGER THAN 5 SECONDS AND SHORTER THAN 10 SECONDS | 3 |
| | ⋮ | ⋮ |
| EQUAL TO OR LARGER THAN 10 FRAMES AND SMALLER THAN 20 FRAMES | SHORTER THAN 1 SECOND | 1 |
| | EQUAL TO OR LONGER THAN 1 SECOND AND SHORTER THAN 5 SECONDS | 2 |
| | EQUAL TO OR LONGER THAN 5 SECONDS AND SHORTER THAN 10 SECONDS | 3 |
| | ⋮ | ⋮ |
| ⋮ | ⋮ | ⋮ |

# INFORMATION PROCESSING APPARATUS, INFORMATION PROCESSING METHOD, AND PROGRAM

CROSS-REFERENCE TO RELATED APPLICATIONS

The present application is a Continuation of U.S. patent application Ser. No. 17/933,641, filed on Sep. 20, 2022, which is a continuation application of International Application No. PCT/JP2020/040102, filed Oct. 26, 2020, the disclosure of which is incorporated herein by reference in its entirety. Further, this application claims priority under 35 USC 119 from Japanese Patent Application No. 2020-064619 filed Mar. 31, 2020, the disclosure of which is incorporated by reference herein.

BACKGROUND

1. Technical Field

The technology of the present disclosure relates to an information processing apparatus, an information processing method, and a program.

2. Related Art

JP2014-146939A discloses a photobook creation terminal that extracts image data from video image data and lays out pages in a photobook. The photobook creation terminal disclosed in JP2014-146939A comprises an input unit, a page allocation unit, an image number calculation unit, an image extraction unit, and a layout unit. The input unit inputs the video image data. The page allocation unit allocates a scene included in the video image data to one or a plurality of pages of the photobook. The image number calculation unit calculates the required number of frames for the scene for each page allocated by the page allocation unit. The image extraction unit extracts the image data of the required number of frames calculated by the image number calculation unit for each scene of the video image data. The layout unit lays out the image data extracted by the image extraction unit on the page allocated by the page allocation unit.

SUMMARY

However, in the technology disclosed in JP2014-146939A, the required number of frames of the image data is calculated without considering attributes, such as events similar between the image data. Therefore, in a case in which the image data is classified for each attribute, such as the event, it is conceivable that the number of frames of the image data varies greatly between the attributes.

One embodiment according to the technology of the present disclosure is to provide an information processing apparatus, an information processing method, and a program capable of displaying a display image with a uniform number of display frames for each attribute of the display image.

A first aspect according to the technology of the present disclosure relates to an information processing apparatus comprising a processor, and a memory built in or connected to the processor, in which the processor acquires editing target image data including video image data, acquires first display image data of a plurality of frames, generates second display image data of a plurality of frames determined in accordance with at least one of the number of frames of the first display image data or a time interval between the frames of the first display image data from the editing target image data, and displays display images of a plurality of frames indicated by the second display image data of the plurality of frames on a display, the editing target image data and the first display image data of the plurality of frames are image data having a common attribute, and the second display image data of the plurality of frames includes second display image data for video images of a plurality of frames corresponding to a still image data of a plurality of frames constituting at least a part of the video image data.

A second aspect according to the technology of the present disclosure relates to the information processing apparatus according to the first aspect, in which the number of frames of the first display image data is equal to or larger than the number of frames of the second display image data.

A third aspect according to the technology of the present disclosure relates to the information processing apparatus according to the first or second aspect, in which the editing target image data and the first display image data are classified for each attribute, and the processor acquires the editing target image data and the first display image data of the plurality of frames as the image data having the common attribute based on the attribute.

A fourth aspect according to the technology of the present disclosure relates to the information processing apparatus according to any one of the first to third aspects, in which the attribute includes at least one of a date, an event, a subject, an imaging position, an imaging person, or a model of an imaging apparatus.

A fifth aspect according to the technology of the present disclosure relates to the information processing apparatus according to any one of the first to third aspects, in which the attribute of the editing target image data is specified by performing image analysis with respect to the editing target image data.

A sixth aspect according to the technology of the present disclosure relates to the information processing apparatus according to any one of the first to fifth aspects, in which an imaging time point at which imaging for the first display image data is performed is added to the first display image data for each frame, and the processor derives the number of frames of the second display image data for the video images in accordance with an interval of the imaging time points in a first display image data block in which the interval of the imaging time points between adjacent frames is equal to or smaller than a predetermined interval and the first display image data is continuous.

A seventh aspect according to the technology of the present disclosure relates to the information processing apparatus according to any one of the first to sixth aspects, in which the video image data includes first video image data having a first attribute as the attribute, and second video image data having a second attribute different from the first attribute as the attribute, and the processor executes a frame number suppression generation process of, in a case in which a first number of frames of the second display image data for the video images corresponding to the first video image data and a second number of frames of the second display image data for the video images corresponding to the second video image data are different from each other, generating the second display image data for the video images from the video image data by the number of frames determined in accordance with a smaller number of frames out of the first number of frames and the second number of frames.

An eighth aspect according to the technology of the present disclosure relates to the information processing apparatus according to the seventh aspect, in which the processor executes the frame number suppression generation process in a case in which a degree of a temporal change of a ratio of a data amount of the video image data to a data amount of the editing target image data exceeds a predetermined degree.

A ninth aspect according to the technology of the present disclosure relates to the information processing apparatus according to the eighth aspect, in which the frame number suppression generation process is a process of generating the second display image data for the video images from the video image data by the number of frames determined in accordance with a smaller number of frames out of the first number of frames and the second number of frames and the ratio before the degree exceeds the predetermined degree.

A tenth aspect according to the technology of the present disclosure relates to the information processing apparatus according to any one of the first to ninth aspects, in which the processor generates the second display image data for the video images by the number of frames determined in accordance with a time required for imaging to obtain the video image data.

An eleventh aspect according to the technology of the present disclosure relates to the information processing apparatus according to any one of the first to tenth aspects, in which the processor limits a maximum number of frames of the second display image data for the video images in accordance with a time required for imaging to obtain the video image data.

A twelfth aspect according to the technology of the present disclosure relates to the information processing apparatus according to any one of the first to eleventh aspects, in which the still image data of the plurality of frames is a still image data group in which a similarity degree derived in accordance with at least one of a result obtained by performing an image recognition process with respect to the video image data or a time interval between frames in the video image data is within a predetermined range.

A thirteenth aspect according to the technology of the present disclosure relates to the information processing apparatus according to any one of the first to twelfth aspects, in which the still image data of the plurality of frames is a still image data group in which a similarity degree derived in accordance with at least one of a result obtained by performing an image recognition process with respect to the video image data or a time interval between frames in the video image data is out of a predetermined range.

A fourteenth aspect according to the technology of the present disclosure relates to the information processing apparatus according to any one of the first to thirteenth aspects, in which the display displays, for the display images of the plurality of frames, a display image based on the second display image data for the video images and a display image based on the second display image data other than the second display image data for the video images in a distinguishable aspect.

A fifteenth aspect according to the technology of the present disclosure relates to the information processing apparatus according to any one of the first to fourteenth aspects, in which the display displays the display images of the plurality of frames based on the second display image data for the video images generated from the same video image data on a band-shaped background extending along a time axis in an aspect distinguishable from a display image based on the second display image data other than the second display image data for the video images.

A sixteenth aspect according to the technology of the present disclosure relates to the information processing apparatus according to any one of the first to fifteenth aspects, in which the second display image data of the plurality of frames includes time slot overlapping display image data of a plurality of frames generated from the editing target image data obtained by being captured in time slots overlapping with each other, and the display displays second display images of the plurality of frames in time series, and displays time slot overlapping display images of a plurality of frames indicated by the time slot overlapping display image data of the plurality of frames in an aspect in which the time slot overlapping display images of the plurality of frames are arranged to correspond to positions indicating the time slots on a time axis.

A seventeenth aspect according to the technology of the present disclosure relates to the information processing apparatus according to the sixteenth aspect, in which the display displays a time slot overlapping display image for a video image in which the time slot overlapping display images of the plurality of frames correspond to a video image and a still image time slot overlapping display image in which the time slot overlapping display images of the plurality of frames correspond to a still image in an aspect in which the time slot overlapping display image for the video image and the still image time slot overlapping display image are arranged in separate stages corresponding to the positions indicating the time slots on the time axis.

An eighteenth aspect according to the technology of the present disclosure relates to the information processing apparatus according to any one of the first to seventeenth aspects, in which second display image data for the video images of at least one frame out of the second display image data for the video images of the plurality of frames corresponds to the still image data of the plurality of frames constituting at least a part of the video image data.

A nineteenth aspect according to the technology of the present disclosure relates to an information processing method including acquiring editing target image data including video image data, acquiring first display image data of a plurality of frames, generating second display image data of a plurality of frames determined in accordance with at least one of the number of frames of the first display image data or a time interval between the frames of the first display image data from the editing target image data, and displaying display images of a plurality of frames indicated by the second display image data of the plurality of frames on a display, in which the editing target image data and the first display image data of the plurality of frames are image data having a common attribute, and the second display image data of the plurality of frames includes second display image data for video images of a plurality of frames corresponding to a still image data of a plurality of frames constituting at least a part of the video image data.

A twentieth aspect according to the technology of the present disclosure relates to a program causing a computer to execute a process including acquiring editing target image data including video image data, acquiring first display image data of a plurality of frames, generating second display image data of a plurality of frames determined in accordance with at least one of the number of frames of the first display image data or a time interval between the frames of the first display image data from the editing target image data, and displaying display images of a plurality of frames indicated by the second display image data of the plurality of frames on a display, in which the editing target image data and the first display image data of the plurality of frames are image data having a common attribute, and the second display image data of the plurality of frames includes second display image data for video images of a plurality of frames corresponding to a still image data of a plurality of frames constituting at least a part of the video image data.

According to one embodiment of the technology of the present disclosure, the effect that the display image can be displayed with a uniform number of display frames for each attribute of the display image can be obtained.

BRIEF DESCRIPTION OF THE DRAWINGS

Exemplary embodiments of the technology of the disclosure will be described in detail based on the following figures, wherein:

FIG. 12 is a block diagram showing an example of the process content in a case in which the CPU of the server provided in the information processing system according to the embodiment is operated as the DB construction unit and the image analysis unit;

FIG. 13 is a conceptual diagram showing an example of a configuration of a yearly event image file DB constructed by the CPU of the server provided in the information processing system according to the embodiment;

FIG. 14 is a conceptual diagram showing an example of a configuration of a 2018-year first event image file DB;

FIG. 15 is a conceptual diagram showing an example of a configuration of a 2019-year first event image file DB;

FIG. 28A is a flowchart showing an example of a flow of the list image data generation process according to the embodiment;

FIG. 28B is a continuation of the flowchart shown in FIG. 28A;

FIG. 36A is a flowchart showing an example of a flow of the frame number suppression generation process according to the embodiment;

FIG. 37 is a conceptual diagram showing a first modification example of a frame number derivation table used by the CPU of the server provided in the information processing system according to the embodiment;

FIG. 38 is a conceptual diagram showing a second modification example of a frame number derivation table used by the CPU of the server provided in the information processing system according to the embodiment.

DETAILED DESCRIPTION

An example of an embodiment of an information processing apparatus, an information processing method, and a program according to the technology of the present disclosure will be described with reference to the accompanying drawings.

First, the terms used in the following description will be described.

CPU refers to an abbreviation of "central processing unit". RAM refers to an abbreviation of "random access memory". SSD refers to an abbreviation of "solid state drive". HDD refers to an abbreviation of "hard disk drive". EEPROM refers to an abbreviation of "electrically erasable and programmable read only memory". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". CMOS refers to an abbreviation of "complementary metal oxide semiconductor". CCD refers to an abbreviation of "charge coupled device". EL refers to an abbreviation of "electro-luminescence". UI refers to an abbreviation of "user interface". USB refers to an abbreviation of "universal serial bus". GPU refers to an abbreviation of "graphics processing unit". GPS refers to an abbreviation of "global positioning system". RTC refers to an abbreviation of "real time clock". ID refers to an abbreviation of "identification". Exif refers to an abbreviation of "exchangeable image file format". WAN refers to an abbreviation of "wide area network". LAN refers to an abbreviation of "local area network". DB refers to an abbreviation of "database". JPEG refers to an abbreviation of "joint photographic experts group". MPEG refers to an abbreviation of "moving picture experts group".

Figure 1:
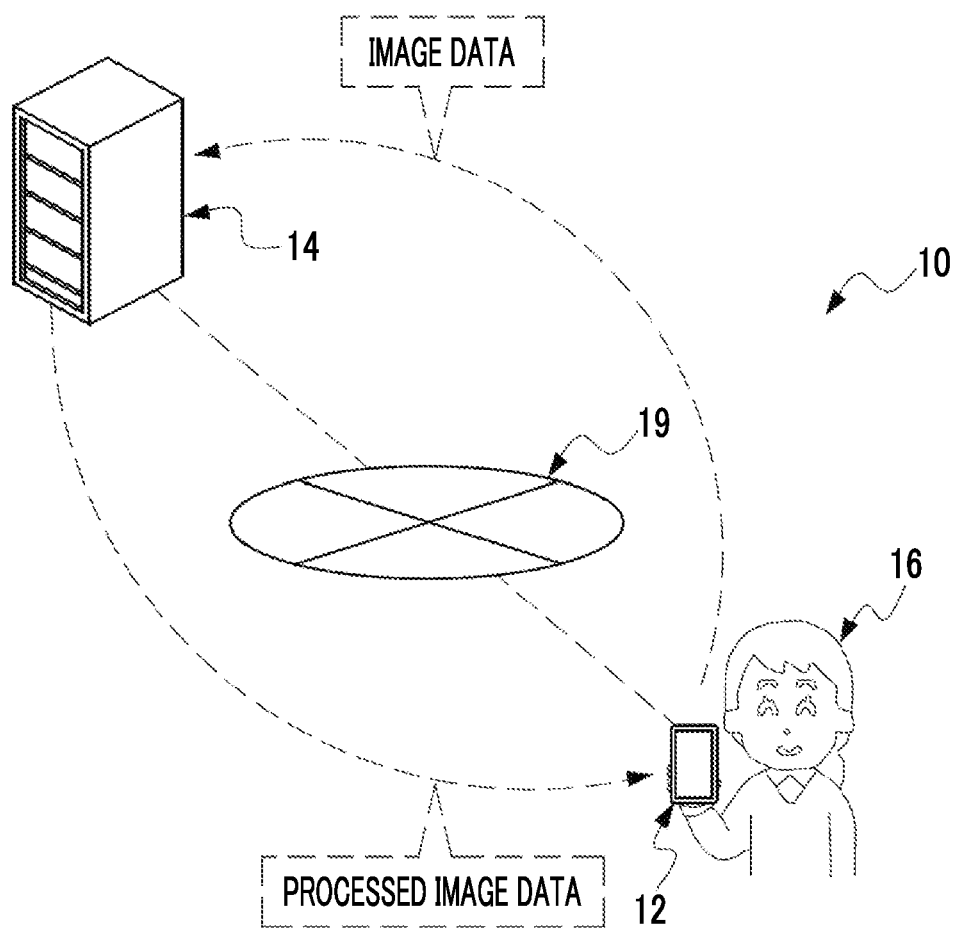
FIG. 1 is a conceptual diagram showing a schematic configuration of an information processing system according to an embodiment.

As an example, as shown in FIG. 1, an information processing system 10 comprises a user device 12 and a server 14. The user device 12 is a terminal device that transmits and receives input information and/or image information by a user 16 to and from the server 14, and is, for example, a smartphone. It should be noted that this is merely an example, and the user device 12 may be a terminal device, such as a tablet terminal, a personal computer, a wearable terminal, and/or a digital camera.

The information processing system 10 is used by a plurality of users 16. The user device 12 is allocated to the user 16. For example, the user 16 is an owner of the user device 12.

The user device 12 is communicably connected to the server 14 via a network 19. Examples of the network 19 include a WAN, such as the Internet. In addition, the network 19 is not limited to the WAN, and may be a LAN, or may be a network in which the LAN and the WAN are connected. It should be noted that the user device 12 and the network 19 may be connected by a wireless communication method or may be connected by a wired communication method. In addition, the server 14 and the network 19 may be connected by a wireless communication method or may be connected by a wired communication method. In addition, in the example shown in FIG. 1, although not shown, the network 19 includes, for example, a base station. The network 19 establishes communication between the user device 12 and the server 14, and transmits and receives various pieces of information to and from the user device 12 and the server 14.

The server 14 receives a request from the user device 12 via the network 19, and provides a service in response to the request to the user device 12 of a request source via the network 19.

Figure 4:
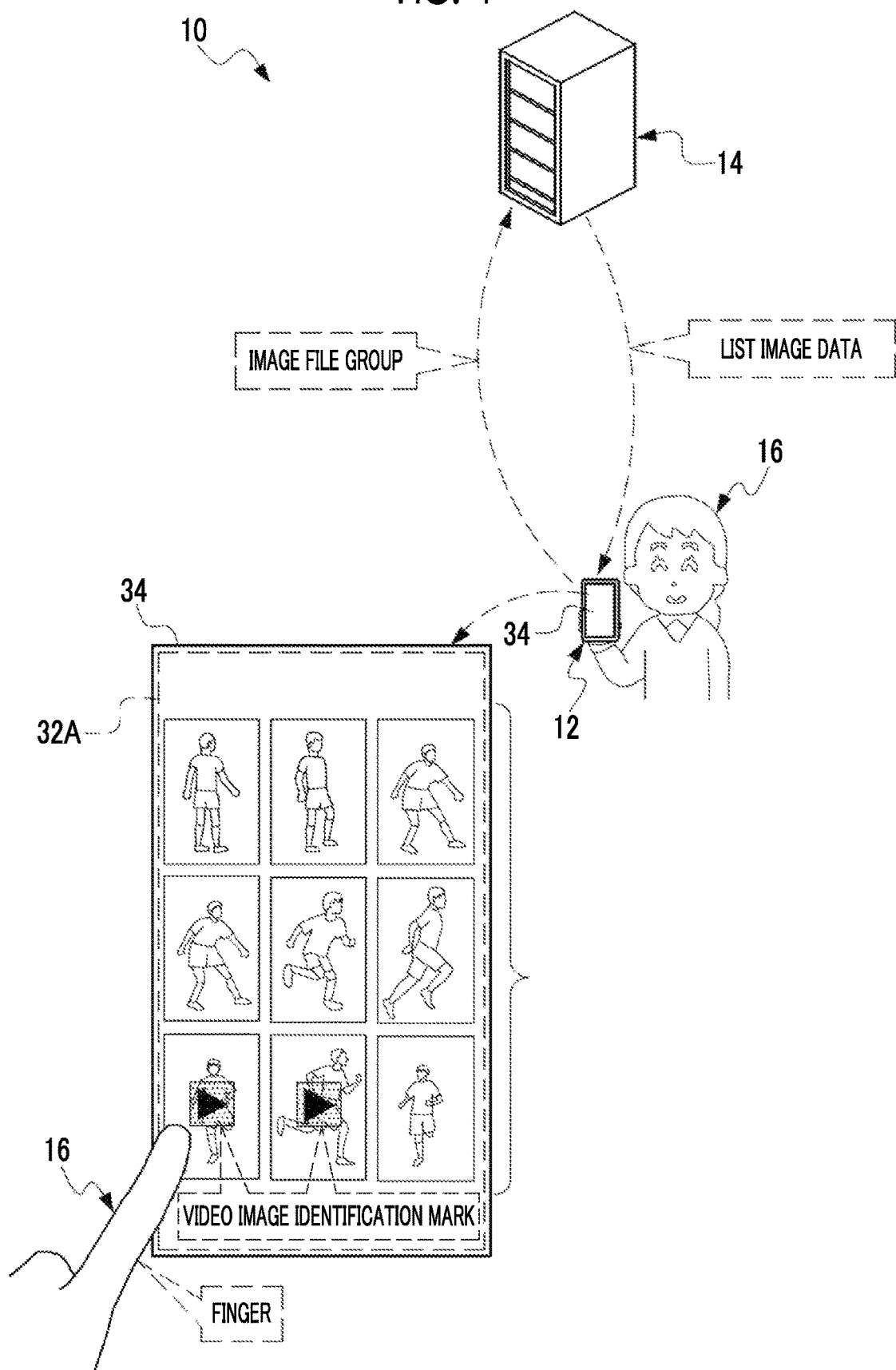
FIG. 4 is a conceptual diagram for describing the use of the information processing system according to the embodiment.

For example, the user device 12 requests the server 14 to process image data (for example, the "image file group" shown in FIG. 4). The server 14 performs the process with respect to the image data provided by the user device 12 and provides the processed image data (for example, "list image data" shown in FIG. 4) to the user device 12. It should be noted that the server 14 is an example of an "information processing apparatus" according to the technology of the present disclosure.

Figure 2:
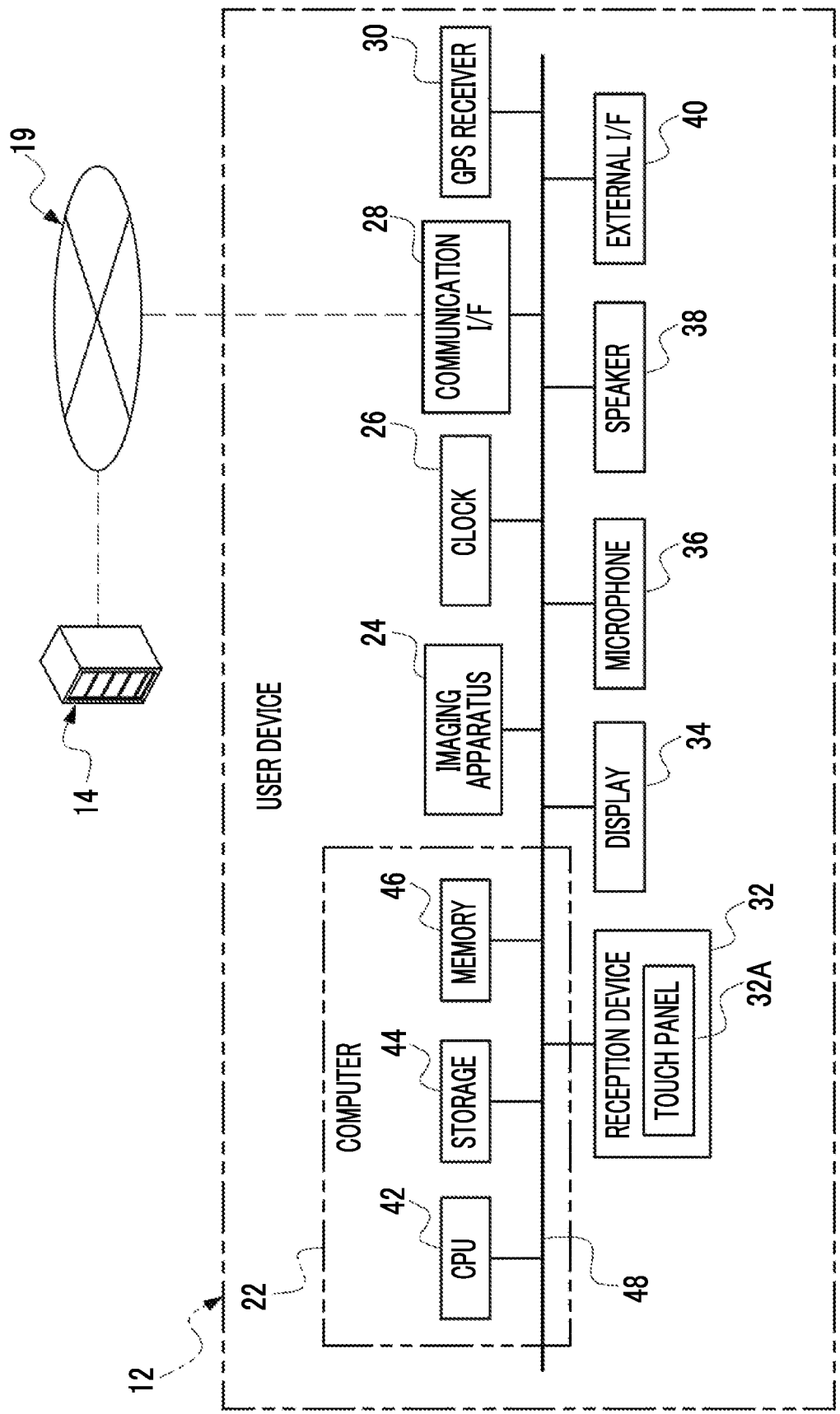
FIG. 2 is a block diagram showing an example of a hardware configuration of an electric system of a user device provided in the information processing system according to the embodiment.

As an example, as shown in FIG. 2, the user device 12 comprises a computer 22, an imaging apparatus 24, a clock 26, a communication I/F 28, a GPS receiver 30, a reception device 32, a display 34, a microphone 36, a speaker 38, and an external I/F 40. The computer 22 comprises a CPU 42, a storage 44, and a memory 46. The CPU 42, the storage 44, and the memory 46 are connected to a bus 48. In addition, the imaging apparatus 24, the clock 26, the communication I/F 28, the GPS receiver 30, the reception device 32, the display 34, the microphone 36, the speaker 38, and the external I/F 40 are also connected to the bus 48. It should be noted that, in the example shown in FIG. 2, for convenience of illustration, one bus is shown as the bus 48, but a data bus, an address bus, a control bus, and the like are included in the bus 48.

The CPU 42 controls the entire user device 12. Various parameters and various programs are stored in the storage 44. The storage 44 is a non-volatile storage device. Here, an EEPROM is adopted as an example of the storage 44, but the technology of the present disclosure is not limited to this, and an SSD and/or an HDD may be used. The memory 46 is a volatile storage device. The memory 46 is used as a work memory by the CPU 42, and temporarily stores various pieces of information. Here, a DRAM is adopted as an example of the memory 46, but the technology of the present disclosure is not limited to this, and another type of volatile storage device, such as an SRAM, may be used.

The imaging apparatus 24 is a device that generates the image data. The imaging apparatus 24 includes, for example, a CMOS image sensor, and comprises a zoom mechanism, and a focus adjustment mechanism. It should be noted that, here, the CMOS image sensor is described as an example of the image sensor of the imaging apparatus 24, but the technology of the present disclosure is not limited to this, and another type of the image sensor, such as a CCD image sensor, may be used. The imaging apparatus 24 images a subject in accordance with an instruction from the CPU 42. Moreover, the imaging apparatus 24 generates the image data indicating the subject by imaging the subject. The CPU 42 acquires the image data generated by the imaging apparatus 24, to store the acquired image data in the storage 44.

The clock 26 acquires a current time point. The clock 26 is, for example, an RTC, and receives driving power from a power supply system that is disconnected from a power supply system for the computer 22 and continues to mark the current time point (year, month, day, hour, minute, and second) even in a case in which the computer 22 is shut down. The clock 26 outputs the current time point to the CPU 42 each time the current time point is updated.

The communication I/F 28 is connected to the network 19 by a wireless communication method, and controls the exchange of various pieces of information between the CPU 42 and the server 14 via the network 19. It should be noted that, here, although the wireless communication method is described as an example, the technology of the present disclosure is not limited to this, and a wired communication method may be used.

The GPS receiver 30 receives radio waves from a plurality of GPS satellites (not shown) in accordance with the instruction from the CPU 42, and outputs reception result information indicating a reception result to the CPU 42. The CPU 42 calculates GPS information as position specification information for specifying the current position of the user device 12 based on the reception result information input from the GPS receiver 30. The GPS information is, for example, the latitude, the longitude, and the altitude for specifying the current position of the user device 12.

The reception device 32 receives an instruction from the user 16 or the like. Examples of the reception device 32 include a touch panel 32A, and a hard key. The instruction received by the reception device 32 is acquired by the CPU 42. The reception device 32 may receive the instruction from the user 16 or the like by voice input via the microphone 36.

The display 34 displays various pieces of information under the control of the CPU 42. Examples of the display 34 include a liquid crystal display. It should be noted that another type of display, such as an EL display, may be adopted as the display 34 without being limited to the liquid crystal display.

It should be noted that, in the present embodiment, an out-cell type touch panel display in which the touch panel 32A is superimposed on a surface of a display region of the display 34 is adopted. It should be noted that the out-cell type touch panel display is merely an example, and for example, an on-cell type or an in-cell type touch panel display can be applied.

The microphone 36 converts the collected sound into an electric signal to output the electric signal obtained by converting the sound to the CPU 42. The speaker 38 converts the electric signal input from a specific device (for example, CPU 42) into the sound, and outputs the sound obtained by converting the electric signal to the outside of the user device 12.

The external I/F 40 controls the exchange of various pieces of information with the device present outside the user device 12. Examples of the external I/F 40 include a USB interface. A user device, a personal computer, a server, a USB memory, a memory card, and/or a printer are connected to the USB interface.

Figure 3:
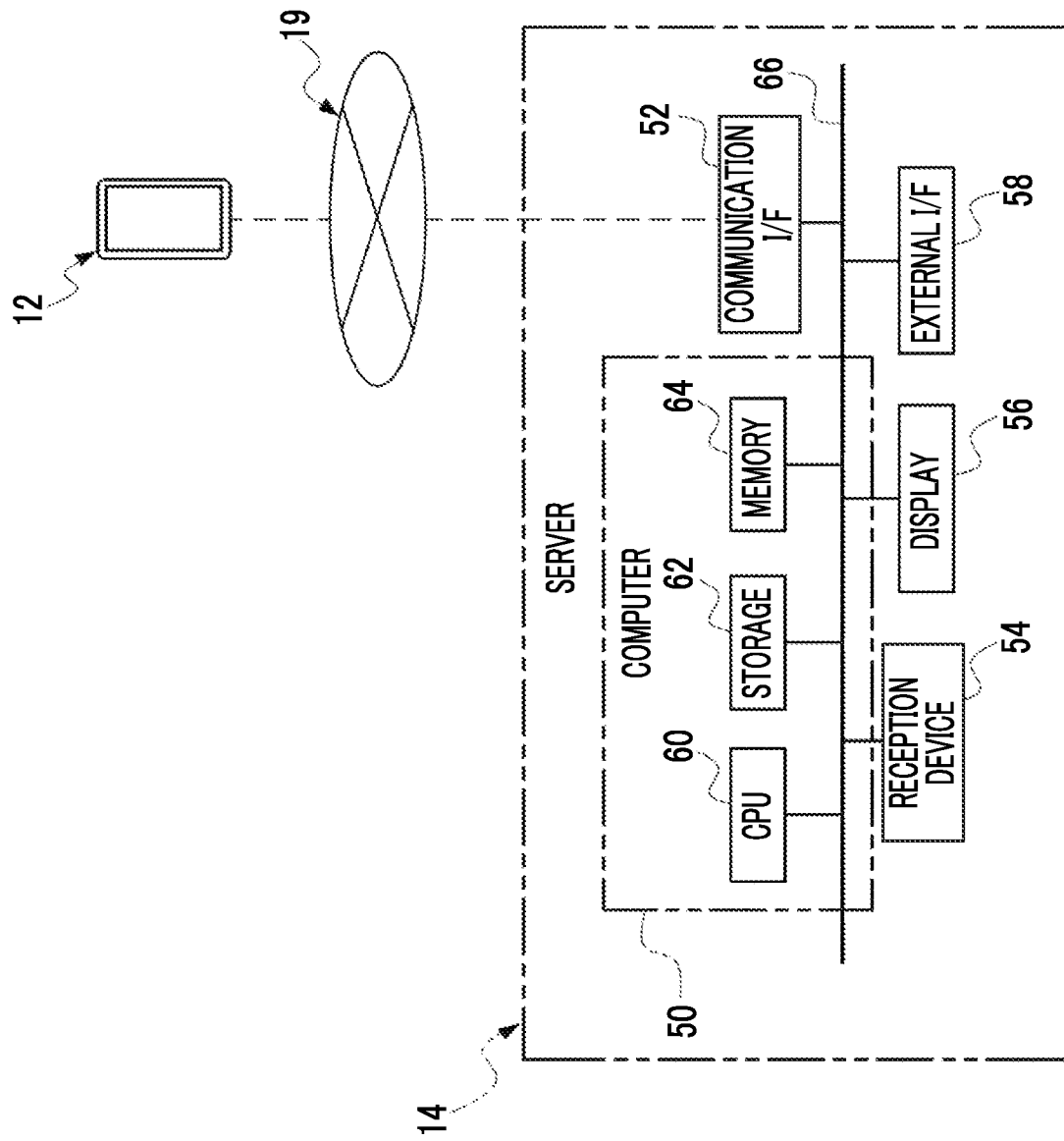
FIG. 3 is a block diagram showing an example of a hardware configuration of an electric system of a server provided in the information processing system according to the embodiment.

As an example, as shown in FIG. 3, the server 14 comprises a computer 50, a communication I/F 52, a reception device 54, a display 56, and an external I/F 58. The computer 50 comprises a CPU 60, a storage 62, and a memory 64. The CPU 60, the storage 62, and the memory 64 are connected to a bus 66. In addition, the communication I/F 52, the reception device 54, the display 56, and the external I/F 58 are also connected to the bus 66. It should be noted that, in the example shown in FIG. 3, for convenience of illustration, one bus is shown as the bus 66, but a data bus, an address bus, a control bus, and the like are included in the bus 66.

The CPU 60 controls the entire server 14. Various parameters and various programs are stored in the storage 62. The storage 62 is a non-volatile storage device. Here, an SSD is adopted as an example of the storage 62, but the technology of the present disclosure is not limited to this, and an EEPROM and/or an HDD may be used. The memory 64 is a volatile storage device. The memory 64 is used as a work memory by the CPU 60, and temporarily stores various pieces of information. Here, a DRAM is adopted as an example of the memory 64, but the technology of the present disclosure is not limited to this, and another type of volatile storage device, such as an SRAM, may be used. It should be noted that the CPU 60 is an example of a "processor" according to the technology of the present disclosure, and the storage 62 and the memory 64 are examples of a "memory" according to the technology of the present disclosure.

The communication I/F 52 is communicably connected to the network 19, and controls the exchange of various pieces of information between the CPU 60 and the user device 12 via the network 19.

The reception device 54 receives an instruction from an administrator or the like of the server 14. Examples of the reception device 54 include a remote controller, a touch panel, and/or a hard key. In addition, the instruction received by the reception device 54 may include an instruction by voice input via the microphone or the like. The instruction received by the reception device 54 is acquired by the CPU 60.

The display 56 displays various pieces of information under the control of the CPU 60. Examples of the display 56 include a liquid crystal display. It should be noted that another type of display, such as an EL display, may be adopted as the display 56 without being limited to the liquid crystal display.

The external I/F 58 controls the exchange of various pieces of information with the device present outside the server 14. Examples of the external I/F 58 include a USB interface. A user device, a personal computer, a server, a USB memory, a memory card, and/or a printer are connected to the USB interface.

As an example, as shown in FIG. 4, in the information processing system 10, the user device 12 uploads the image file group to the server 14, and the server 14 manages the uploaded image file group. The image file group includes a plurality of image files. The image file is, for example, a file including the captured image data obtained by imaging the subject using the user device 12. The image files are roughly classified into still image files and video image files. The still image file includes the captured image data of one frame. The video image file includes the captured image data of a plurality of frames obtained by imaging the subject at a predetermined frame rate (for example, 30 frame/sec).

The server 14 generates the list image data by performing image processing with respect to the image file group and provides the generated list image data to the user device 12. The list image data refers to, for example, image data in which a plurality of reduction display image data are collected in a list format. The reduction display image data is image data obtained by reducing the captured image data. That is, the reduction display image data is image data of which a size and an image quality are smaller than those of the captured image data. Specific examples of the reduction display image data include thumbnail image data indicating a thumbnail image.

The user 16 can view the list images indicated by the list image data via the display 34 of the user device 12. The list images include a plurality of reduction display images indicated by a plurality of reduction display image data. In the example shown in FIG. 4, a plurality of reduction display images corresponding to a plurality of still image files (hereinafter, also referred to as "still image file reduction display image") and a plurality of reduction display images corresponding to a plurality of video image files (hereinafter, also referred to as "video image file reduction display image") are shown. A video image identification mark is displayed in the center portion of the video image file reduction display image as a mark for specifying the video image file reduction display image.

The user 16 selects the reduction display image among the list images via the touch panel 32A. In a case in which the reduction display image is selected by the user 16, the image file corresponding to the selected reduction display image is downloaded from the server 14 to the user device 12. In the example shown in FIG. 4, since the video image file reduction display image is selected by the user 16, the video image file corresponding to the video image file reduction display image selected by the user 16 is downloaded from the server 14 to the user device 12.

Figure 5:
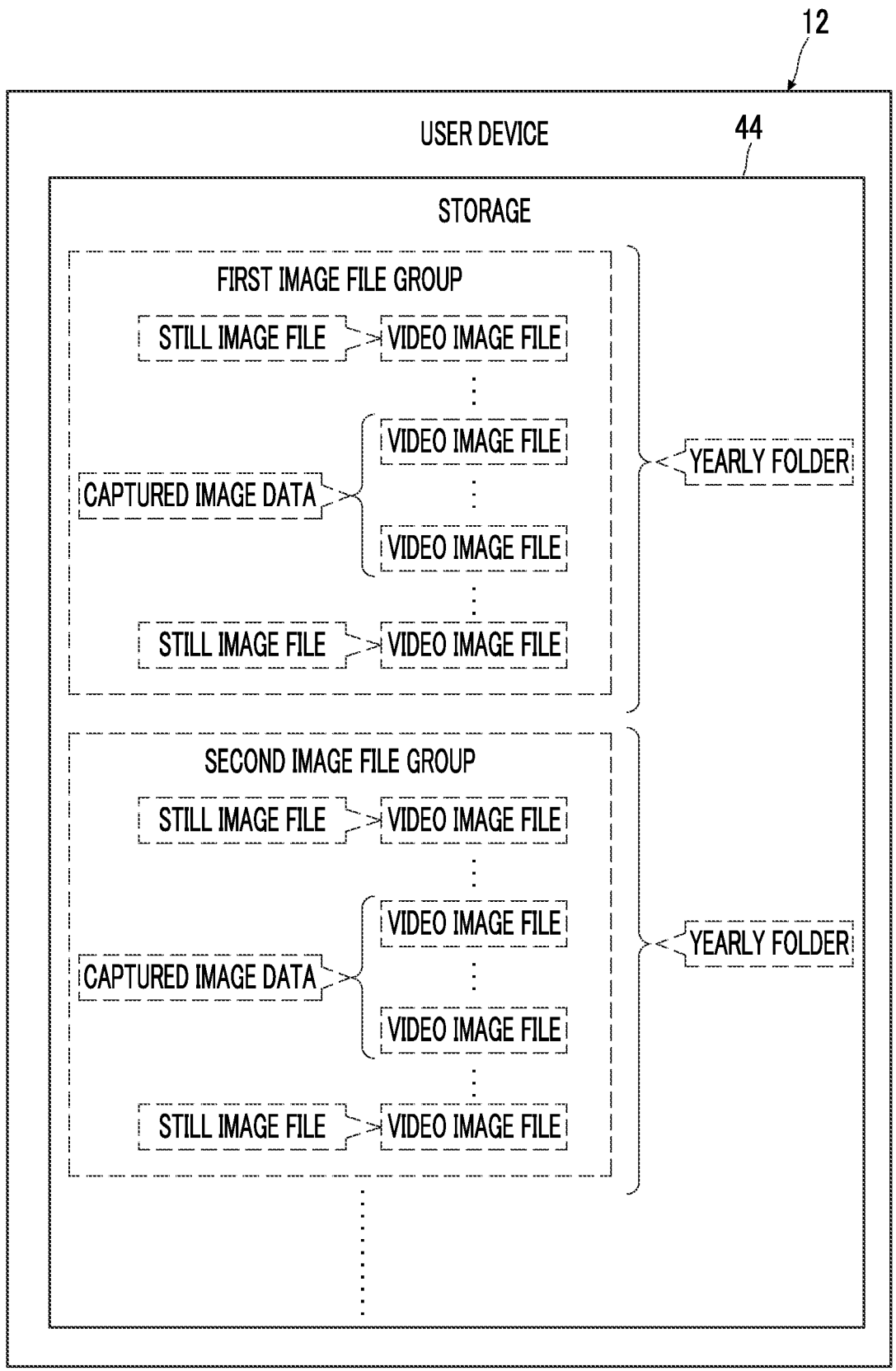
FIG. 5 is a block diagram showing an example of a storage content of a storage of the user device provided in the information processing system according to the embodiment.

As an example, as shown in FIG. 5, the image file group is stored in the storage 44 of the user device 12. The image file group in the storage 44 is uploaded from the user device 12 to the server 14 in accordance with the instruction received by the reception device 32. In the example shown in FIG. 5, the storage 44 stores a plurality of image file groups including a first image file group and a second image file group. Each of the image file groups is stored in a yearly folder, for example. For example, the yearly folder in which the first image file group is stored is a folder indicating a year of 2018. In the folder indicating the year of 2018, the image file group obtained by being captured by the imaging apparatus 24 in the year of 2018 is stored. In addition, for example, the yearly folder in which the second image file group is stored is a folder indicating a year of 2019. In the folder indicating the year of 2019, the image file group obtained by being captured by the imaging apparatus 24 in the year of 2019 is stored.

Figure 6:
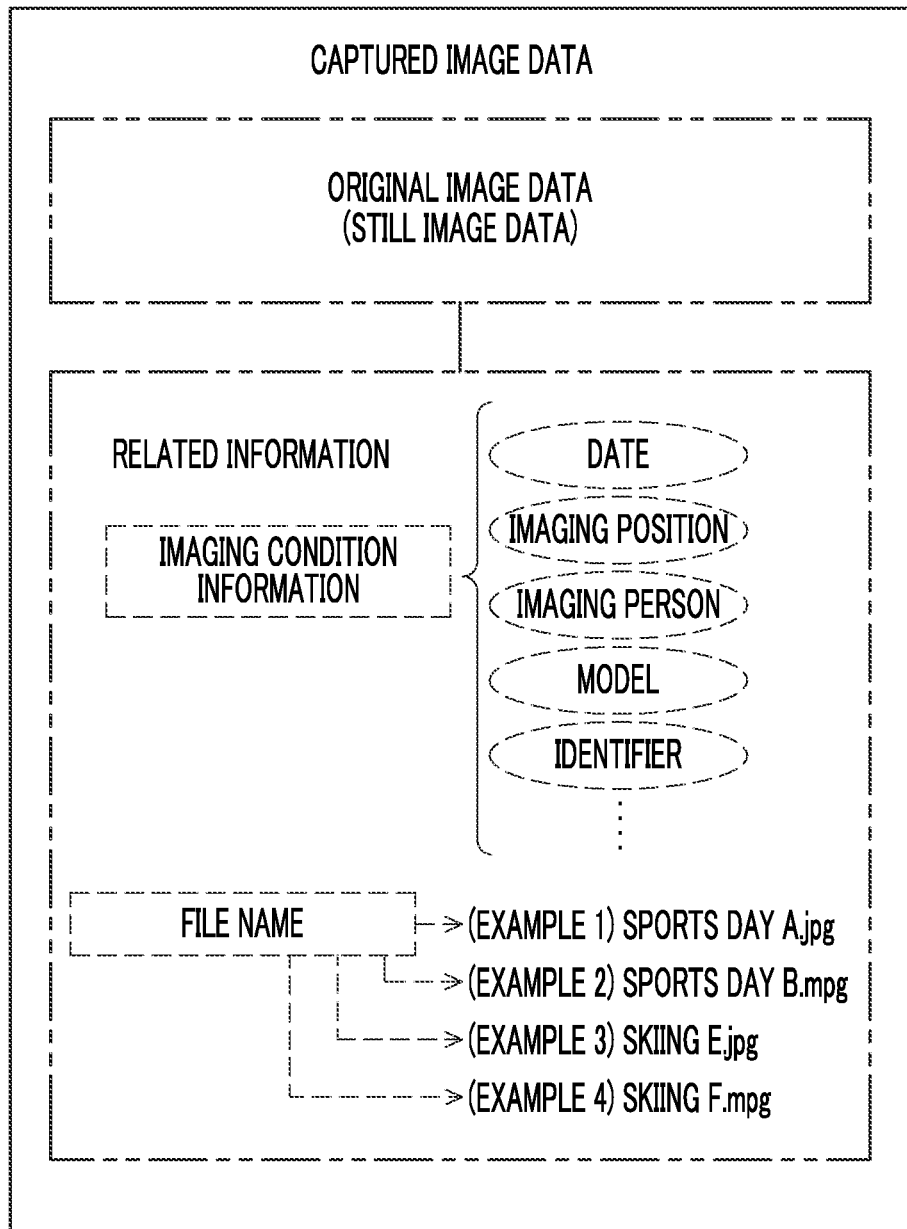
FIG. 6 is a conceptual diagram showing an example of a configuration of captured image data according to the embodiment.

As shown in FIG. 6 as an example, the captured image data included in the still image file and the video image file has original image data and related information. The original image data and the related information are associated with each other on a one-to-one basis for each captured image data. The original image data is the still image data. Therefore, the still image file includes the original image data of one frame, and the video image file includes the original image data of a plurality of frames.

The related information includes a file name of the corresponding image file and imaging condition information indicating an imaging condition performed to obtain the corresponding original image data (hereinafter, also referred to as "imaging condition"). Examples of the imaging condition information include Exif information. In the example shown in FIG. 6, the imaging condition information includes date information, imaging position information, imaging person information, model information, captured image data identifier, and the like. The date information is information indicating the date when the imaging of one frame is performed. Examples of the date information include the year, month, day, hour, minute, and second acquired from the clock 26 at a timing at which the imaging of one frame is performed. The imaging position information is information indicating a position at which the imaging is performed by the imaging apparatus 24. Examples of the imaging position information include the GPS information calculated at a timing at which the imaging of one frame is performed. The imaging person information is information indicating an imaging person, and the model information is information indicating a model of the imaging apparatus 24. The imaging person information and the model information are registered in advance, for example, in the user device 12. The captured image data identifier is an identifier for specifying the corresponding captured image data. Therefore, one captured image data identifier is added to the still image file, and a plurality of captured image data identifiers are added to the video image file.

By the way, in general, the reduction display image data of one frame is generated for one image file. Therefore, in a case in which the number of files of image files differs between the image file groups uploaded from the user device 12 to the server 14, the number of frames of the reduction display image data included in the list image data corresponding to the image files also differs.

Figure 7:
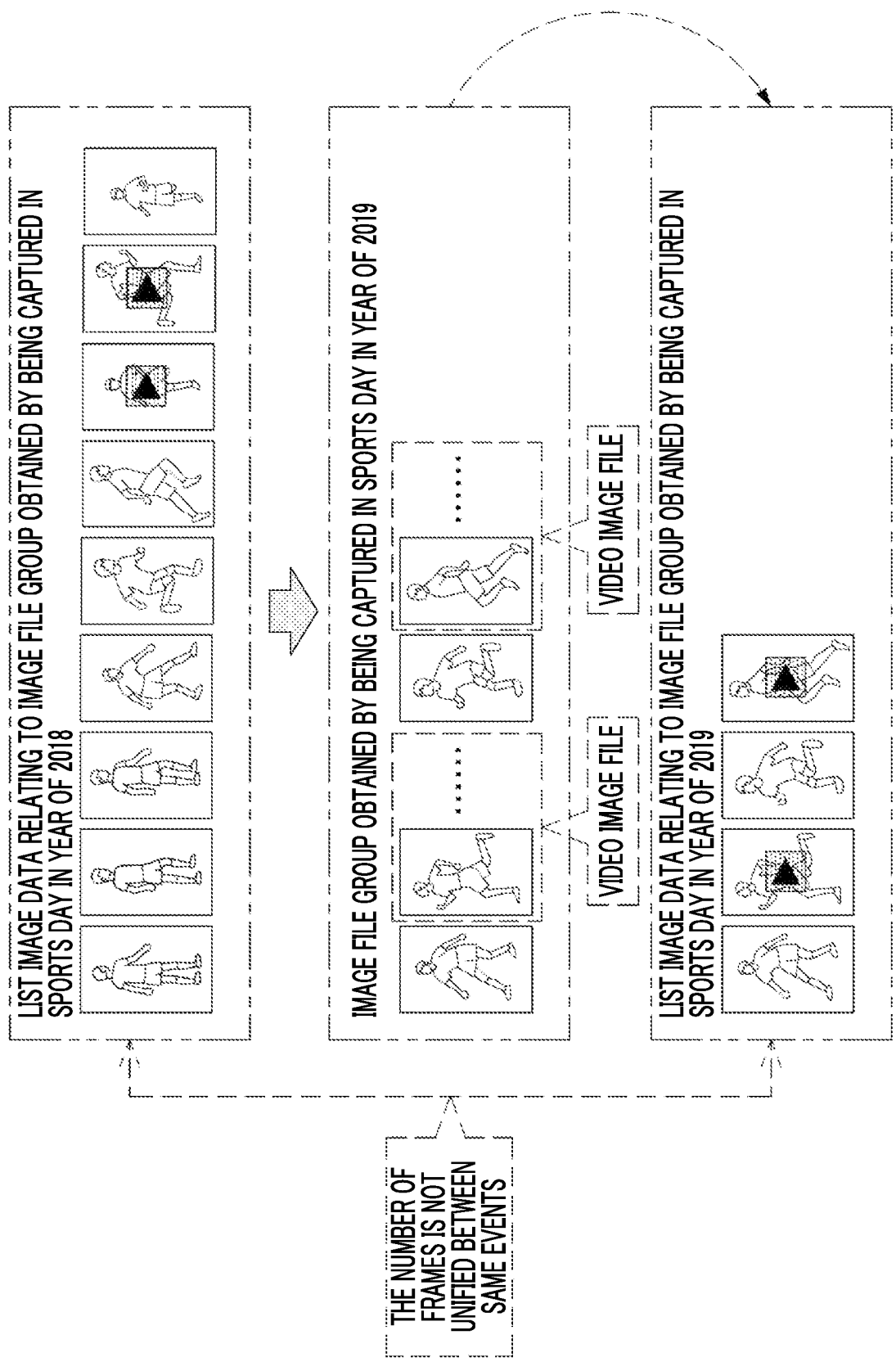
FIG. 7 is a conceptual diagram for describing a generation method of list image data in the related art.

For example, as shown in FIG. 7, the reduction display image data of nine frames is included in the list image data relating to the image file group obtained by being captured on sports day in the year of 2018 (hereinafter, also referred to as "2018-year sports day image file group"). On the other hand, the image file group obtained by being captured on the sports day in the year of 2019 (hereinafter, also referred to as "2019-year sports day image file group") includes two still image files and two video image files. Therefore, in a case in which the reduction display image data of one frame is generated for one image file, the list image data relating to the 2019-year sports day image file group includes four reduction display image data. The four reduction display image data refer to two still image file reduction display image data corresponding to two still image files and two video image file reduction display image data corresponding to two video image files.

As described above, the number of frames of the reduction display image data corresponding to the 2019-year sports day image file group is smaller than the number of frames of the reduction display image data corresponding to the 2018-year sports day image file group. That is, the number of frames of the reduction display image data is not unified between the years of 2018 and 2019, even though the image file groups are captured and obtained at the same event called "sports day" in the years of 2018 and 2019.

Figure 8:
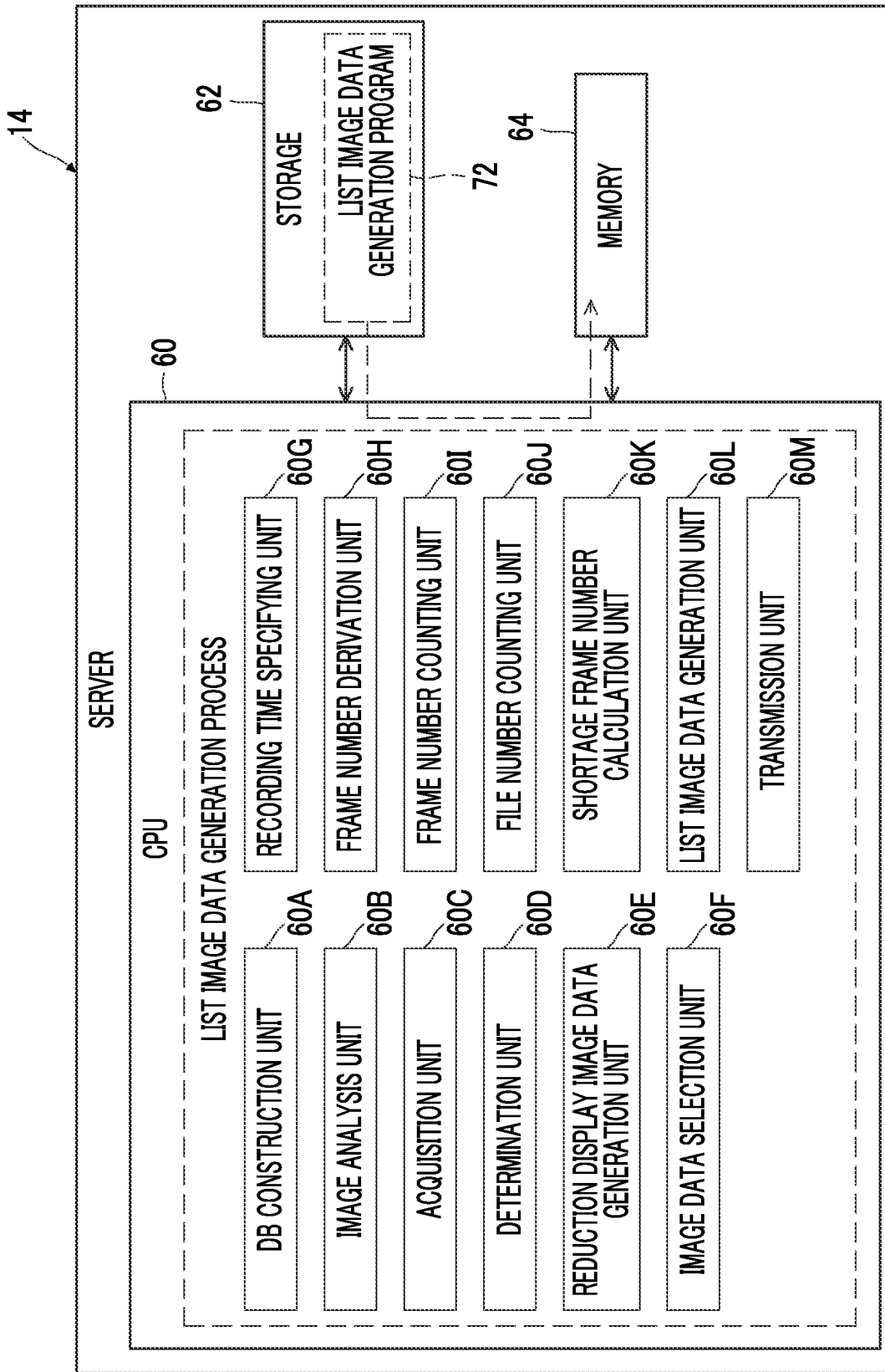
FIG. 8 is a block diagram showing an example of a main function of a CPU in a case in which a list image data generation process is executed by the CPU of the server provided in the information processing system according to the embodiment.

In view of such circumstances, as shown in FIG. 8 as an example, in the server 14, a list image data generation process is executed by the CPU 60. A list image data generation program 72 is stored in the storage 62 of the server 14. The CPU 60 reads out the list image data generation program 72 from the storage 62. Moreover, the CPU 60 executes the list image data generation program 72 read out from the storage 62 on the memory 64 to be operated as a DB construction unit 60A, an image analysis unit 60B, an acquisition unit 60C, a determination unit 60D, a reduction display image data generation unit 60E, an image data selection unit 60F, a recording time specifying unit 60G, a frame number derivation unit 60H, a frame number counting unit 60I, a file number counting unit 60J, a shortage frame number calculation unit 60K, a list image data generation unit 60L, and a transmission unit 60M. That is, the list image data generation process is realized by the CPU 60 being operated as the DB construction unit 60A, the image analysis unit 60B, the acquisition unit 60C, the determination unit 60D, the reduction display image data generation unit 60E, the image data selection unit 60F, the recording time specifying unit 60G, the frame number derivation unit 60H, the frame number counting unit 60I, the file number counting unit 60J, the shortage frame number calculation unit 60K, the list image data generation unit 60L, and the transmission unit 60M.

The CPU 60 acquires the editing target image data including the video image file, and acquires the first display image data of the plurality of frames by executing the list image data generation process. In addition, the CPU 60 generates second display image data of a plurality of frames determined in accordance with the number of frames of the first display image data from the editing target image data by executing the list image data generation process. In addition, the CPU 60 displays display images of a plurality of frames indicated by the second display image data of the plurality of frames on the display 34 by executing the list image data generation process. Here, the editing target image data and the first display image data of the plurality of frames are image data having a common attribute. In addition, the second display image data of the plurality of frames includes second display image data for the video images of a plurality of frames corresponding to still image data of a plurality of frames constituting at least a part of the video image data. In the following, a form example of the list image data generation process will be described in more detail.

Figure 9:
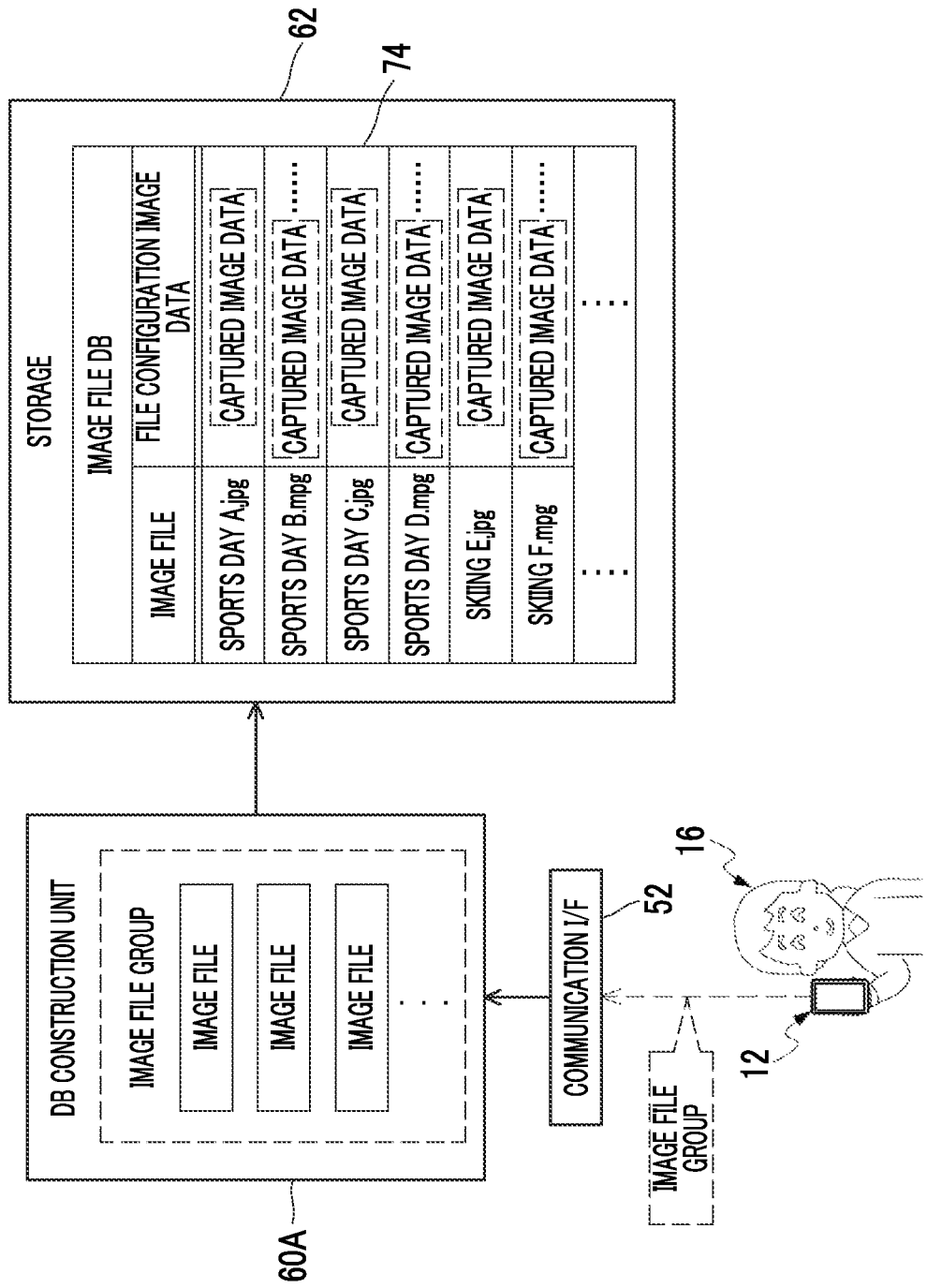
FIG. 9 is a block diagram showing an example of a process content in a case in which the CPU of the server provided in the information processing system according to the embodiment is operated as a DB construction unit.

As an example, as shown in FIG. 9, in a case in which an image data group transmitted from the user device 12 is received by the communication I/F 52, the DB construction unit 60A acquires the image data group received by the communication I/F 52. The DB construction unit 60A constructs an image file DB 74 in the storage 62 by using the acquired image data group. In the image file DB 74, file configuration image data is associated with each file name indicating the image file. The file configuration image data refers to the captured image data constituting the image file, that is, the captured image data included in the image file. In the example shown in FIG. 9, the file name with the extension "jpg" indicating a JPEG file format is the still image file. In addition, in the example shown in FIG. 9, the file name with the extension of "mpg" indicating the MPEG file format is the video image file. It should be noted that the file format of the still image file is not limited to JPEG, and may be another file format. In addition, the file format of the video image file is not limited to MPEG, and may be another file format.

Figure 10:
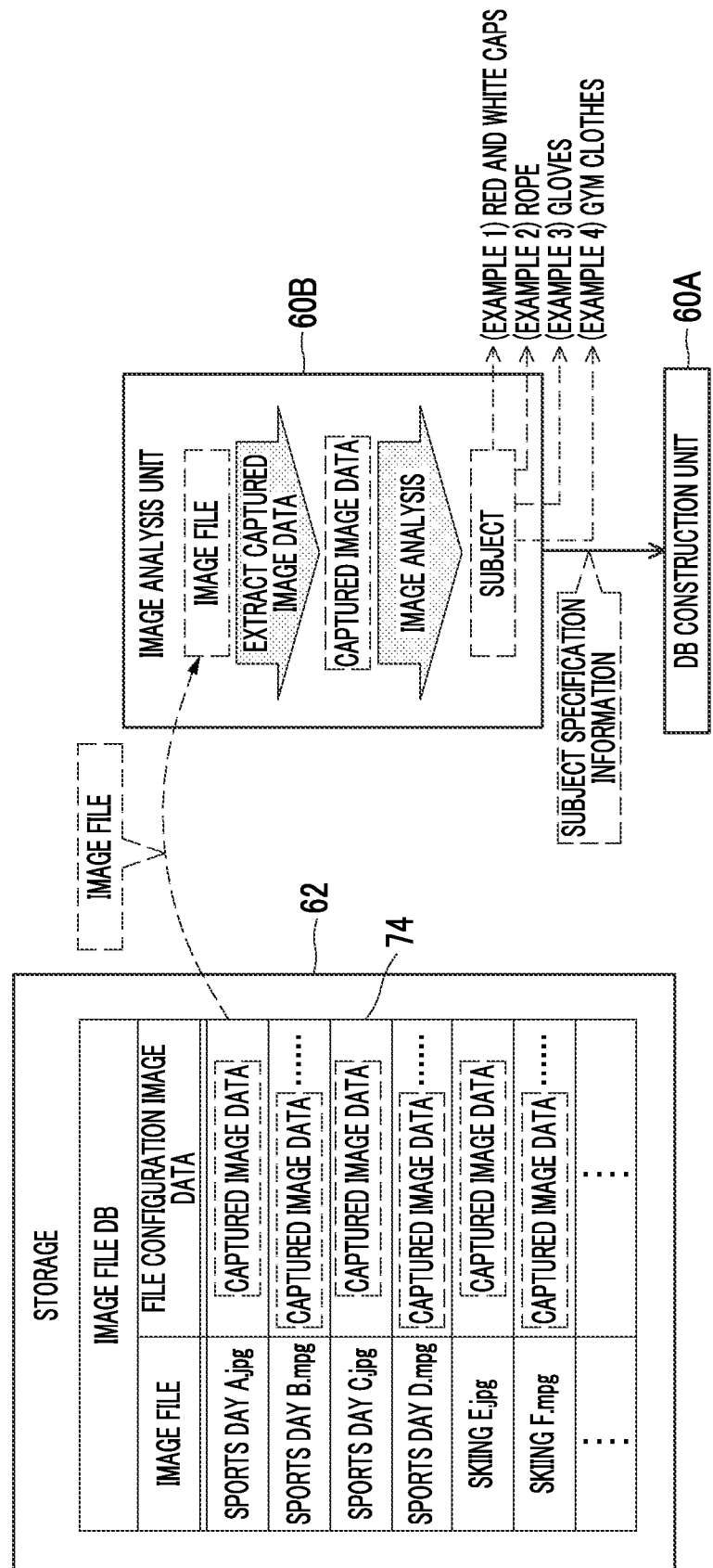
FIG. 10 is a block diagram showing an example of a process content in a case in which the CPU of the server provided in the information processing system according to the embodiment is operated as the DB construction unit and an image analysis unit.

As an example, as shown in FIG. 10, the image analysis unit 60B acquires the image file from the image file DB 74 and extracts the captured image data from the acquired image file. Moreover, the image analysis unit 60B specifies the subject reflected in the captured image data by performing image analysis with respect to the captured image data extracted from the image file. Here, the image analysis using a cascade classifier is performed with respect to the captured image data. It should be noted that this is merely an example, and another method of the image analysis, such as pattern matching, may be used, and any method of the image analysis may be used as long as the subject reflected in the captured image data can be specified by the image analysis.

For example, as the subject reflected in the captured image data obtained by being captured in the sports day, the subject specified by the image analysis by the image analysis unit 60B is, for example, red and white caps, a rope, gloves, and gym clothes.

The image analysis unit 60B outputs subject specification information for specifying the specified subject by performing the image analysis with respect to the captured image data to the DB construction unit 60A.

Figure 11:
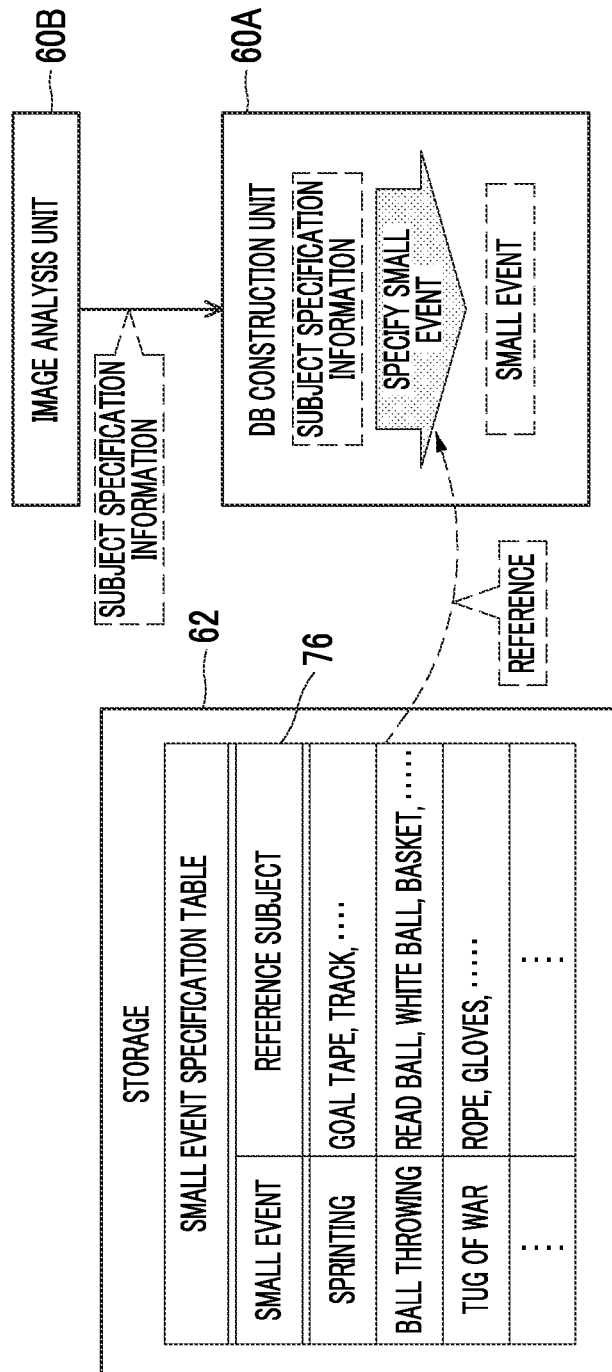
FIG. 11 is a block diagram showing an example of the process content in a case in which the CPU of the server provided in the information processing system according to the embodiment is operated as the DB construction unit and the image analysis unit.

As an example, as shown in FIG. 11, the storage 62 stores a small event specification table 76. The small event specification table 76 is a table used for specifying a small event. Here, the small event refers to an event or the like having a larger scale than a big event. For example, in a case in which the sports day is a big event, an occurrence that occurs in the sports day and an element for establishing the sports day are the small events. Examples of the small event relating to the sports day include sprinting, ball throwing, and tug of war. In addition, for example, in a case in which skiing is the big event, the small events relating to skiing are a snowy mountain, a slope, a skier, a snowboarder, and the like. In addition, for example, in a case in which a concert is the big event, the small events relating to the concert are a stage, an audience seat, a conductor, and the like. In addition, for example, in a case in which sea bathing is the big event, the small events relating to sea bathing are the sea, a sandy beach, a beach umbrella, and the like.

The DB construction unit 60A specifies the small event and derives the big event based on the specified small event. The DB construction unit 60A refers to the small event specification table 76 to specify the small event. The small event and a reference subject are associated with each other in the small event specification table 76. The reference subject is an element, which is predetermined as a necessary element constituting the small event.

In the example shown in FIG. 11, the sprinting, the ball throwing, and the tug of war are shown as examples of the small events relating to the sports day. In the example shown in FIG. 11, the element constituting the small event of the sprinting, that is, a goal tape, a track, and the like are shown as examples of the reference subject. In addition, examples of the element constituting the small event called the ball throwing, that is, the reference subject include a red ball, a white ball, and a basket. Further, the rope and the gloves are shown as the examples of the element constituting the small event of the tug of war, that is, the reference subject.

The DB construction unit 60A refers to the small event specification table 76 and specifies the small event corresponding to the subject specified by the subject specification information input from the image analysis unit 60B. That is, the small event associated with the reference subject that is the same as or similar to the subject specified by the subject specification information input from the image analysis unit 60B is derived from the small event specification table 76. The processes shown in FIGS. 10 and 11 are performed with respect to the captured image data included in all the image files of the image file DB 74.

As shown in FIG. 12, as an example, the DB construction unit 60A specifies the big event based on the small event specified by referring to the small event specification table 76 (see FIG. 11). A big event specification table 78 is stored in the storage 62. The big event and the small event relating to the big event (hereinafter, also referred to as "related small event") are associated with each other in the big event specification table 78.

In the example shown in FIG. 12, the sports day, the skiing, the concert, the sea bathing, and the like are shown as specific examples of the big event. In the example shown in FIG. 12, the sprinting, the tug of war, the ball throwing, and the like are shown as examples of the related small event associated with the big event called the sports day. In addition, in the example shown in FIG. 12, the snowy mountain, a lift, and the like are shown as examples of the related small event associated with the big event called the skiing. In addition, in the example shown in FIG. 12, the stage, the audience seat, and the like are shown as examples of the related small event associated with the big event called the concert. In addition, in the example shown in FIG. 12, the sea, the sandy beach, the beach umbrella, and the like are shown as examples of the related small event associated with the big event called the sea bathing.

The DB construction unit 60A specifies the big event corresponding to the small event specified by performing the image analysis with respect to the image file by the image analysis unit 60B by referring to the big event specification table 78. That is, the big event associated with the related small event, which is the same as or similar to the small event derived from the small event specification table 76, is derived from the big event specification table 78.

In addition, the DB construction unit 60A acquires the captured image data which is a specifying target of the big event from the image analysis unit 60B, and extracts the date information from the acquired captured image data. The date information is extracted from the imaging condition information (see FIG. 6) of the related information included in the captured image data.

Specifying the big event and the extraction of the date information by the DB construction unit 60A are performed for each captured image data for each of all the image files included in the image file DB 74. Moreover, the DB construction unit 60A constructs the yearly event image file DB 80 by classifying the image files in a unit of a year and for each big event.

As an example, as shown in FIG. 13, in the yearly event image file DB 80, the image files are classified in a unit of a year, and the image files are classified for each big event. In the yearly event image file DB 80 shown in FIG. 13, the file name, the original image data, the big event, the small event, the date information, the imaging position information, the imaging person information, the model information, and imaging time information are associated with each image file.

The file name, the original image data, the date information, the imaging position information, the imaging person information, and the model information are obtained from the imaging condition information (see FIG. 6) associated with the captured image data. Although not shown, the original image data indicates the captured image data identifier (see FIG. 6). The captured image data identifier is also obtained from the imaging condition information associated with the captured image data. The imaging time information is information indicating the time required for the imaging (hereinafter, also referred to as "imaging time") to obtain the video image file. The imaging time information is calculated from, for example, the number of frames of the captured image data included in the video image file and the predetermined frame rate used for the imaging to obtain the video image file. It should be noted that this is merely an example, and in a case in which the imaging time information is added to the video image file, the imaging time information may be acquired from the video image file. The addition of the imaging time information to the video image file is realized, for example, by measuring a time from the start to the termination of the imaging for the video image by the CPU 42 and adding the measured time to the video image file.

FIGS. 14 and 15 show specific examples of the yearly event image file DB 80. In FIG. 14, the DB (hereinafter, also referred to as "2018-year event image file DB") in which the image files obtained by being captured in the year of 2018 are classified in a unit of a year and for each event is shown as an example of the yearly event image file DB 80.

In the example shown in FIG. 14, the 2018-year event image file DB is classified into the 2018-year first to Nth event image file DB for each of the big events called the first to Nth events. In the example shown in FIG. 14, the sports day is shown as an example of the first event. That is, the 2018-year first event image file DB includes the image file obtained by being captured at the big event called the sports day in the year of 2018.

In the example shown in FIG. 15, a 2019-year event image file DB is classified into the 2019-year first to Nth event image file DB for each of the big events called the first to Nth events. Also in the example shown in FIG. 15, the sports day is shown as an example of the first event. That is, the 2019-year first event image file DB includes the image file obtained by being captured at the big event called the sports day in the year of 2019.

Figure 16:
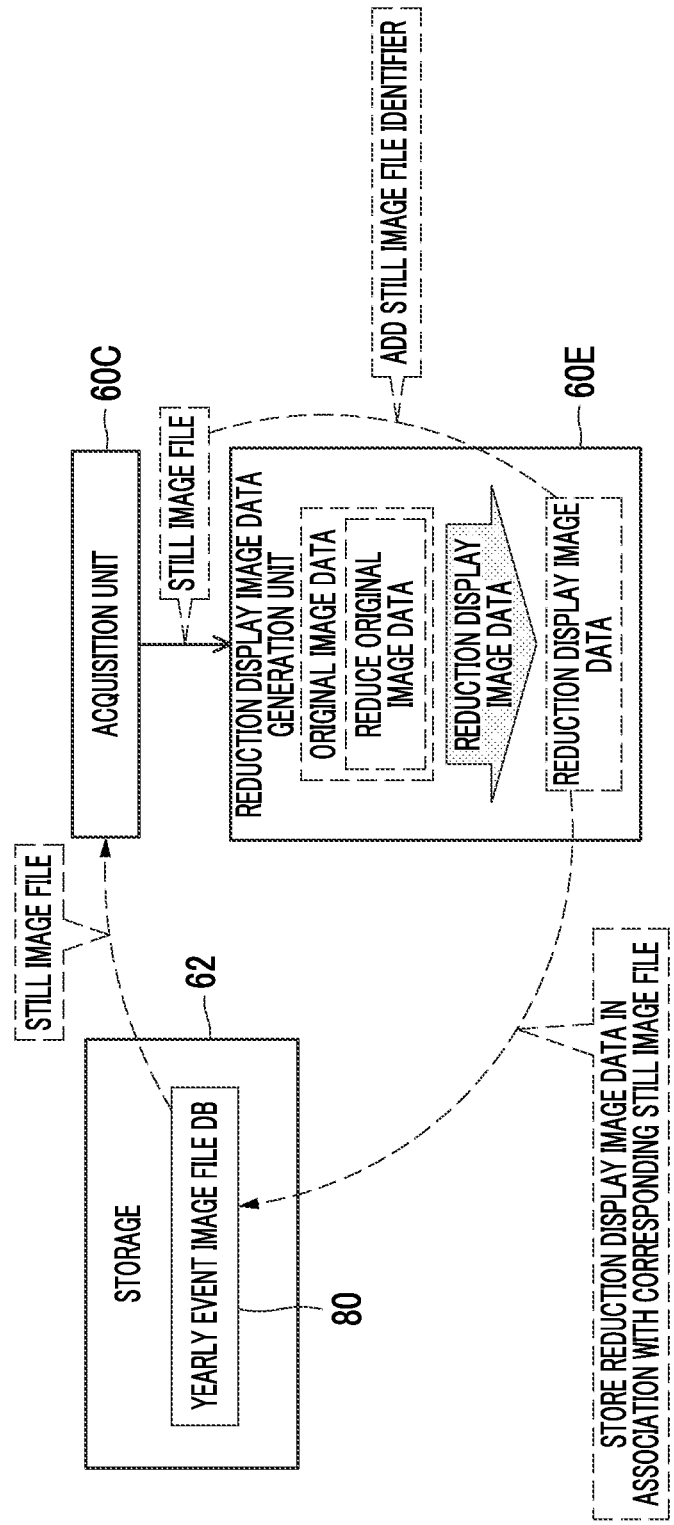
FIG. 16 is a block diagram showing an example of a process content in a case in which the CPU of the server provided in the information processing system according to the embodiment is operated as an acquisition unit.

As an example, as shown in FIG. 16, the acquisition unit 60C acquires the still image file from the yearly event image file DB 80. The reduction display image data generation unit 60E extracts the original image data from the still image file acquired by the acquisition unit 60C, and generates the reduction display image data by reducing the extracted original image data. The reduction display image data generation unit 60E adds a still image file identifier for specifying the corresponding still image file to the reduction display image data. In addition, the reduction display image data generation unit 60E associates the generated reduction display image data with the corresponding still image file and stores the reduction display image data associated with the corresponding still image file in the yearly event image file DB 80. As a result, the reduction display image data is classified in a unit of a year and for each big event in the same manner as the image file.

The acquisition of the still image file by the acquisition unit 60C, the generation of the reduction display image data by the reduction display image data generation unit 60E, the addition of the still image file identifier by the reduction display image data generation unit 60E, the association of the reduction display image data with the still image file by the reduction display image data generation unit 60E, and the storage of the reduction display image data in the yearly event image file DB 80 by the reduction display image data generation unit 60E are performed with respect to all the still image files included in the yearly event image file DB 80.

It should be noted that the still image file identifier is used as a key for calling the still image file corresponding to the reduction display image data. For example, in a case in which the reduction display image data is provided from the server 14 to the user device 12 and then the reduction display image data is selected by the user 16, the server 14 acquires the still image file specified from the still image file identifier from the yearly event image file DB 80 and provides the acquired still image file to the user device 12.

Figure 17:
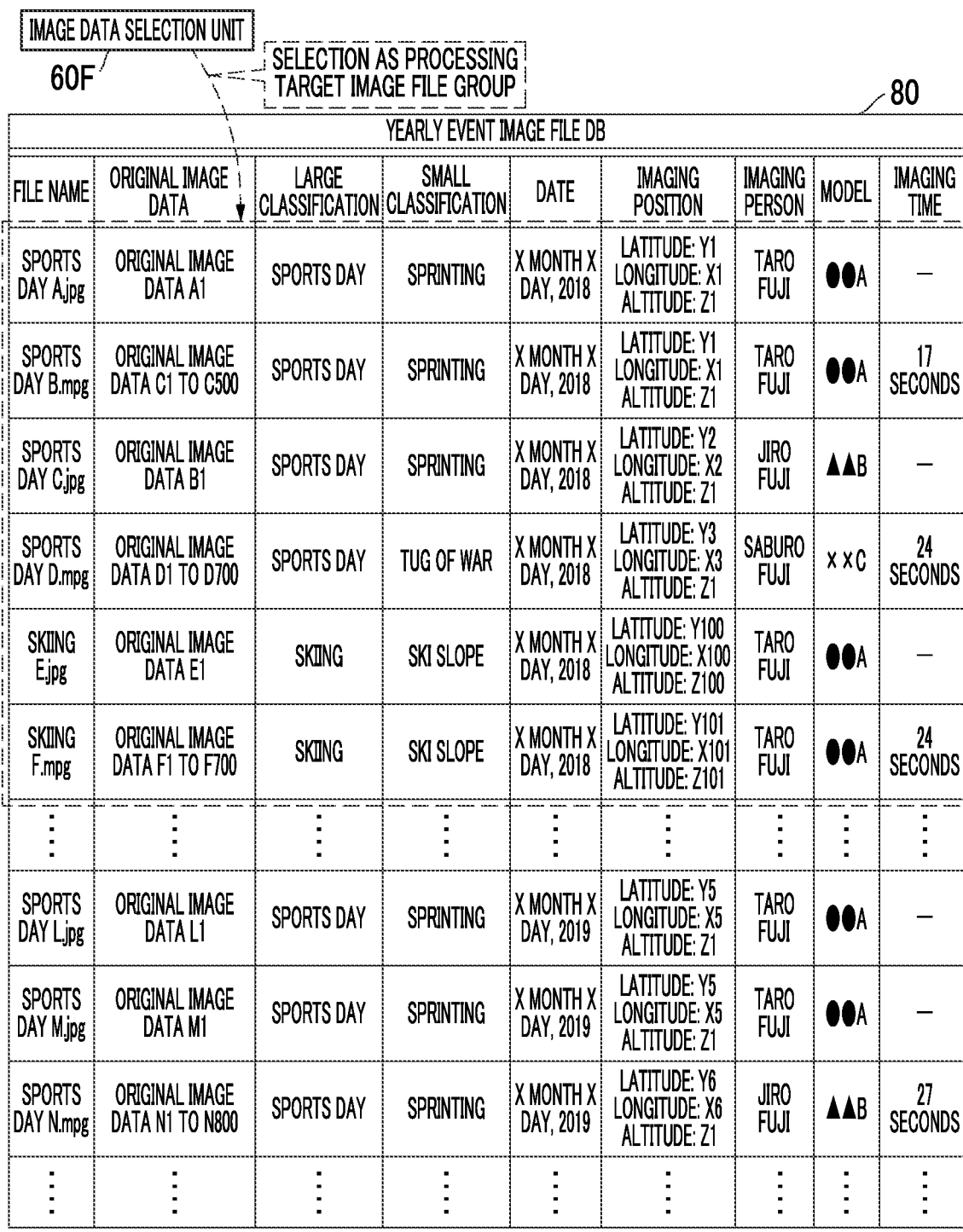
FIG. 17 is a block diagram showing an example of a process content in a case in which the CPU of the server provided in the information processing system according to the embodiment is operated as an image data selection unit.

As an example, as shown in FIG. 17, the image data selection unit 60F selects the image file group to which the date information indicating the date of the oldest year is added as a processing target image file group from the yearly event image file DB 80. In the example shown in FIG. 17, the image file group of the year of 2018 is selected as the processing target image file group.

Figure 18:
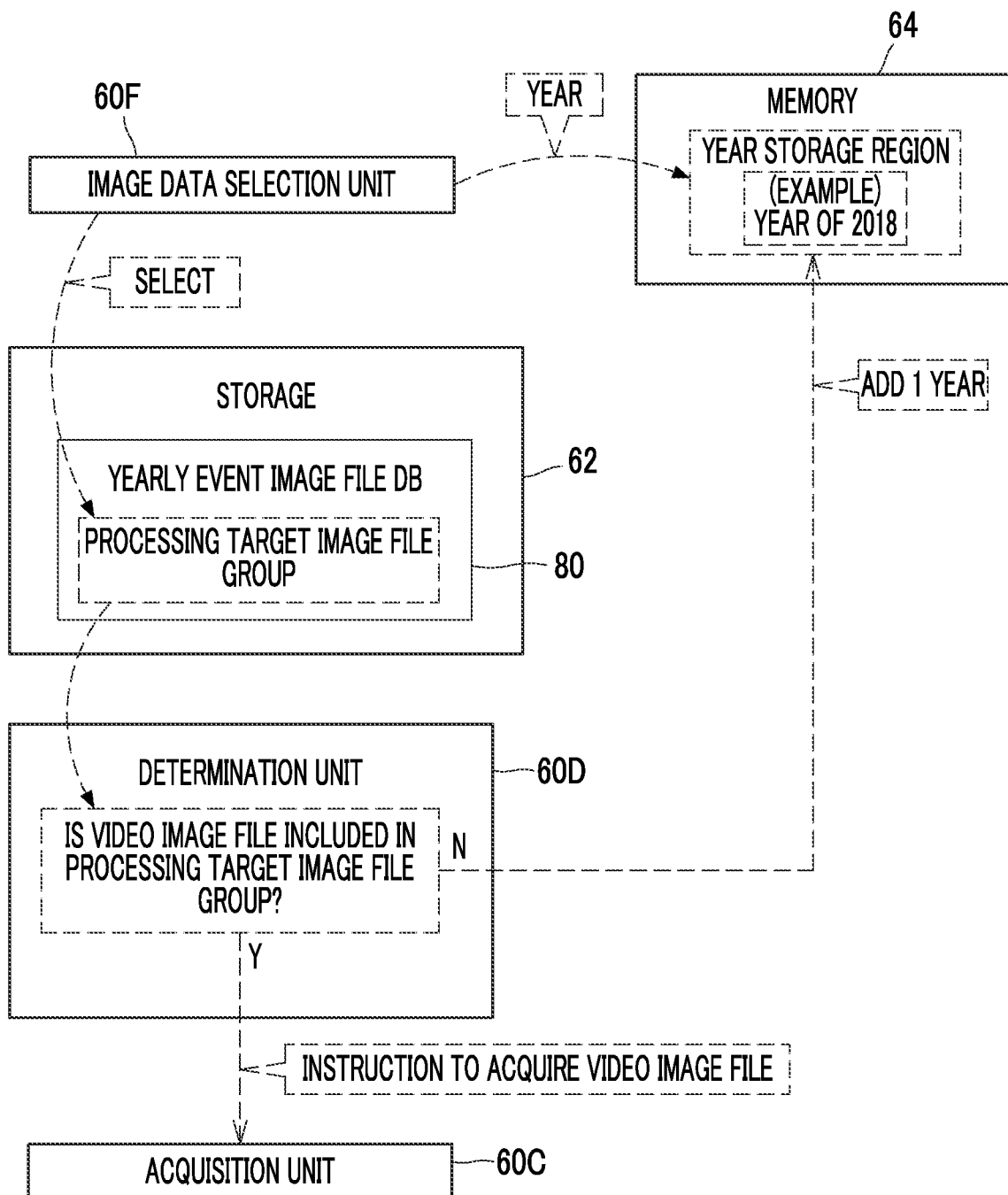
FIG. 18 is a block diagram showing an example of a process content in a case in which the CPU of the server provided in the information processing system according to the embodiment is operated as the image data selection unit, a determination unit, and the acquisition unit.

As an example, as shown in FIG. 18, a year storage region is set in the memory 64. The year storage region is a storage region in which the year included in the date information is stored. In a case in which the image data selection unit 60F selects the processing target image file group from the yearly event image file DB 80, the image data selection unit 60F acquires the date information from the processing target image file group, and stores the year included in the date indicated by the acquired date information in the year storage region. In the example shown in FIG. 18, the "year of 2018" is stored in the year storage region.

The determination unit 60D determines whether or not the video image file is included in the processing target image file group selected by the image data selection unit 60F. In a case in which the determination unit 60D determines that the processing target image file group selected by the image data selection unit 60F does not include the video image file, the determination unit 60D adds one year to the year stored in the year storage region. In a case in which the determination unit 60D determines that the video image file is included in the processing target image file group selected by the image data selection unit 60F, the determination unit 60D instructs the acquisition unit 60C to acquire the video image file.

Figure 19:
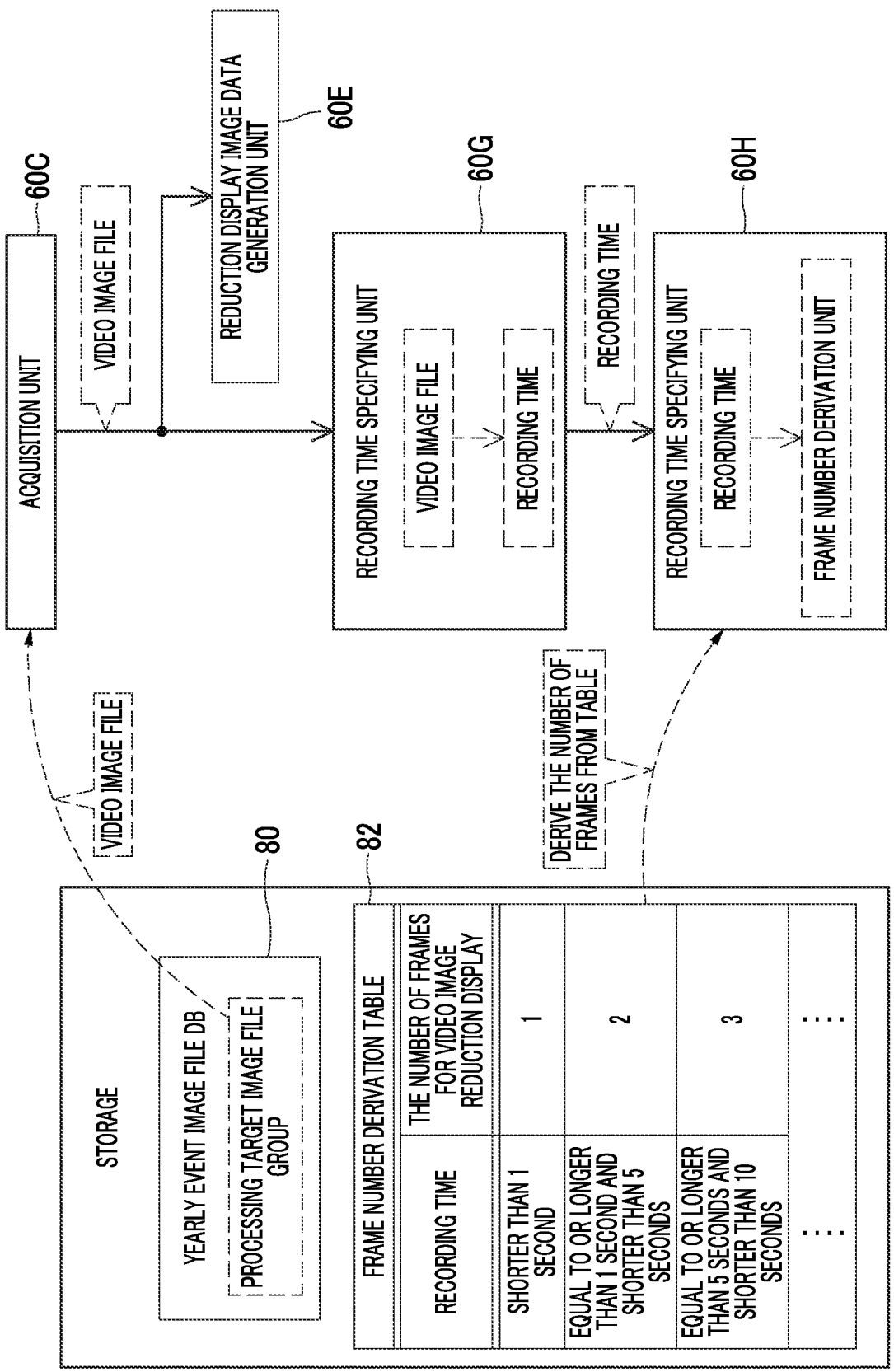
FIG. 19 is a block diagram showing an example of a process content in a case in which the CPU of the server provided in the information processing system according to the embodiment is operated as the acquisition unit, a recording time specifying unit, and a frame number derivation unit.

As an example, as shown in FIG. 19, in a case in which the determination unit 60D makes the instruction to acquire the video image file, the acquisition unit 60C acquires all the video image files from the processing target image file group selected by the image data selection unit 60F. The acquisition unit 60C outputs all the video image files acquired from the processing target image file group to the reduction display image data generation unit 60E, the recording time specifying unit 60G, and the frame number derivation unit 60H.

The recording time specifying unit 60G specifies a recording time of the video image file input from the acquisition unit 60C. As the recording time, for example, the imaging time indicated by the imaging time information is applied.

The frame number derivation unit 60H derives the number of frames for video image reduction display based on the recording time specified by the recording time specifying unit 60G. The number of frames for video image reduction display refers to the number of frames of video image file reduction display image data indicating the video image file reduction display image described above. A frame number derivation table 82 is stored in the storage 62. The recording time and the number of frames for video image reduction display are associated with each other in the frame number derivation table 82.

In the example shown in FIG. 19, the number of frames for video image reduction display is larger as the recording time is longer. Specifically, the number of frames for video image reduction display is "1" in a case in which the recording time is shorter than 1 second, the number of frames for video image reduction display is "2" in a case in which the recording time is equal to or longer than 1 second and shorter than 5 seconds, and the number of frames for video image reduction display is "3" in a case in which the recording time is equal to or longer than 5 seconds and shorter than 10 seconds. It should be noted that this is merely an example, and a content of the frame number derivation table 82 may be a variable value changed in accordance with the instruction received by the reception device 32 or 54. In addition, the contents of the frame number derivation table 82 may be a variable value changed in accordance with various conditions, such as the number of image files (for example, video image files) included in the processing target image file group and/or the number of frames of captured image data included in the video image file.

Figure 20:
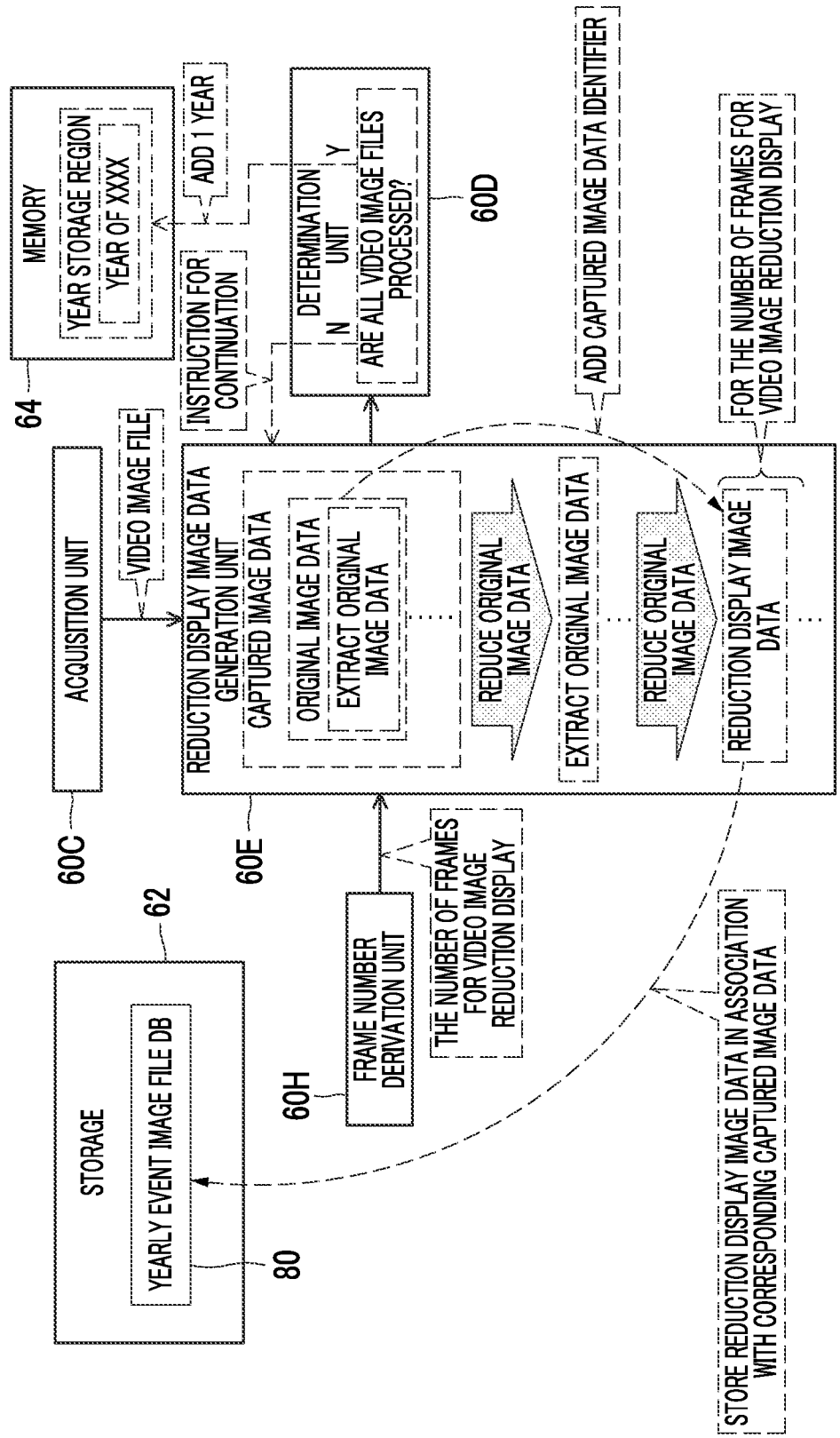
FIG. 20 is a block diagram showing an example of a process content in a case in which the CPU of the server provided in the information processing system according to the embodiment is operated as the acquisition unit, a reduction display image data generation unit, the determination unit, and the frame number derivation unit.

As an example, in the example shown in FIG. 20, the reduction display image data generation unit 60E extracts the original image data from each of the plurality of captured image data included in the video image file input from the acquisition unit 60C. Moreover, the reduction display image data generation unit 60E generates the reduction display image data by reducing the extracted original image data.

The reduction display image data generation unit 60E adds the captured image data identifier for specifying the corresponding captured image data to the reduction display image data. In addition, the reduction display image data generation unit 60E associates the generated reduction display image data with the corresponding captured image data, and stores the reduction display image data associated with the corresponding captured image data in the yearly event image file DB 80.

It should be noted that the captured image data identifier is used as a key for calling the video image file corresponding to the reduction display image data. For example, in a case in which the reduction display image data is provided from the server 14 to the user device 12 and then the reduction display image data is selected by the user 16, the server 14 acquires the video image file specified from the captured image file identifier from the yearly event image file DB 80 and provides the acquired captured image file to the user device 12.

The determination unit 60D determines whether or not the process by the reduction display image data generation unit 60E (hereinafter, also referred to as "video image file reduction process") is terminated for all the video image files included in the processing target image file group. Here, the video image file reduction process refers to the generation of the reduction display image data, the addition of the video image file identifier, the association of the reduction display image data with the video image file, and the storage of the reduction display image data in the yearly event image file DB 80.

In a case in which the determination unit 60D determines that the video image file reduction process is terminated for all the video image files included in the processing target image file group, the determination unit 60D adds one year to the year in the year storage region. In a case in which the determination unit 60D determines that the process by the reduction display image data generation unit 60E is not terminated for all the video image files included in the processing target image file group, the determination unit 60D instructs to the reduction display image data generation unit 60E to continue the video image file reduction process. In a case in which the determination unit 60D makes the instruction to continue the video image file reduction process, the reduction display image data generation unit 60E continues the video image file reduction process.

Figure 21:
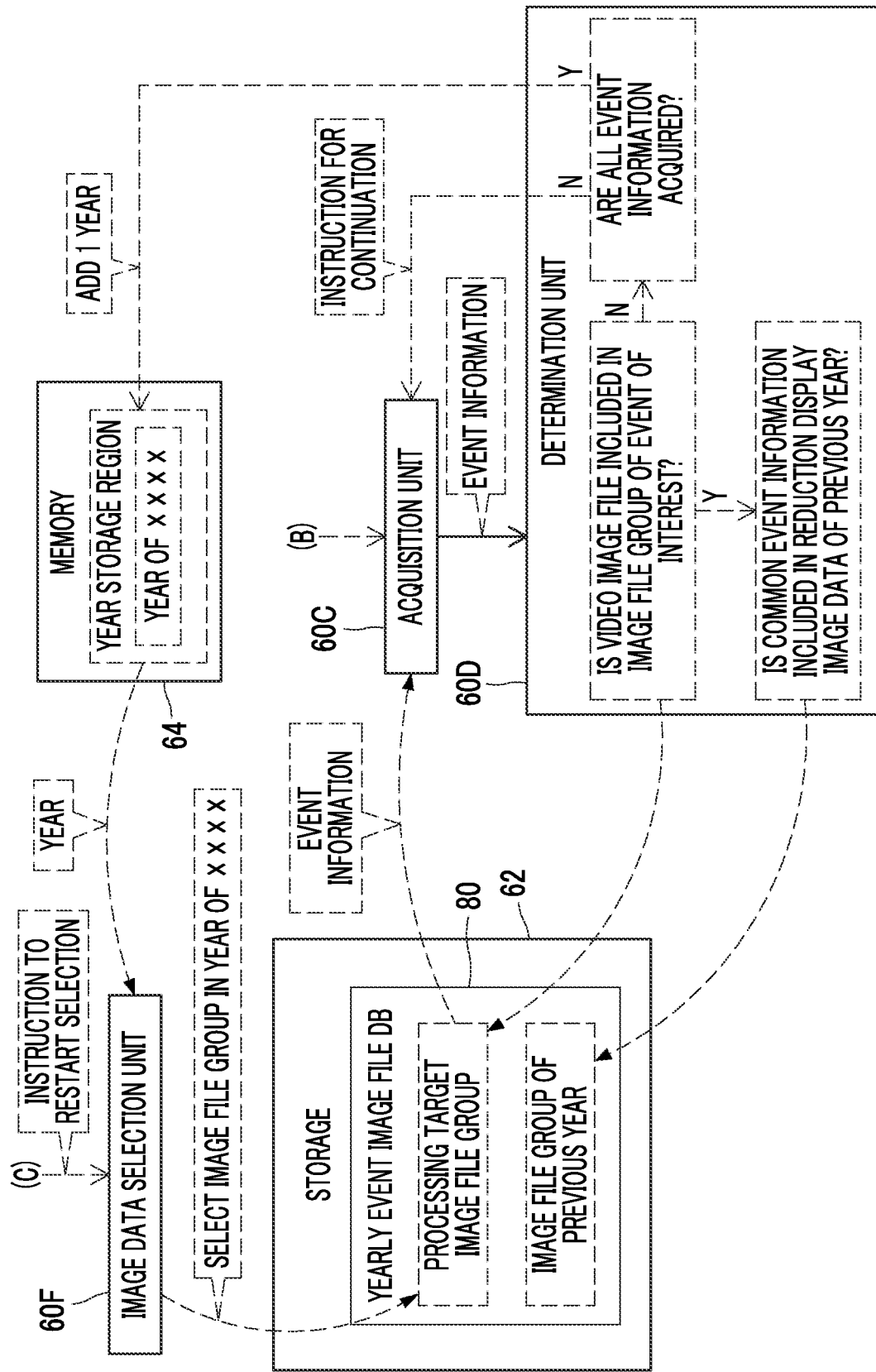
FIG. 21 is a block diagram showing an example of a process content in a case in which the CPU of the server provided in the information processing system according to the embodiment is operated as the image data selection unit, the acquisition unit, and the determination unit.

In a case in which it is determined by the determination unit 60D that the video image file reduction process is terminated for all the video image files included in the processing target image file group, as shown in FIG. 21 as an example, the image data selection unit 60F acquires the year from the year storage region. Moreover, the image data selection unit 60F reselects the image file group of the year acquired from the year storage region as the processing target image file group.

The acquisition unit 60C acquires one event information from the processing target image file group selected by the image data selection unit 60F. The event information is information indicating the big event. The determination unit 60D determines whether or not the video image file is included in the image file group relating to the big event (hereinafter, also referred to as "event of interest") indicated by the event information acquired by the acquisition unit 60C.

In a case in which the determination unit 60D determines that the video image file is not included in the image file group relating to the event of interest, the determination unit 60D subsequently determines whether or not all the event information is acquired by the acquisition unit 60C from the processing target image file group. In a case in which the determination unit 60D determines that all the event information is not acquired by the acquisition unit 60C from the processing target image file group, the determination unit 60D instructs the acquisition unit 60C to continue to acquire the event information. Accordingly, the acquisition unit 60C continues to acquire the event information from the processing target image file group. In a case in which the determination unit 60D determines that all the event information is acquired by the acquisition unit 60C from the processing target image file group, the determination unit 60D adds one year to the year in the year storage region.

On the other hand, in a case in which the determination unit 60D determines that the video image file is included in the image file group relating to the event of interest, the determination unit 60D subsequently determines whether or not the common event information is included in the reduction display image data of the previous year. Here, the reduction display image data of the previous year refers to the reduction display image data associated with the image data group to which the date one year before a processing target image data group selected by the image data selection unit 60F at the present time is added. In addition, the common event information refers to information indicating the big event which is the same as or similar to the event of interest. The determination of whether or not the reduction display image data of the previous year includes the common event information is performed by determining whether or not the big event, which is the same or similar to the event of interest, is included in the image data group of the previous year.

Figure 22:
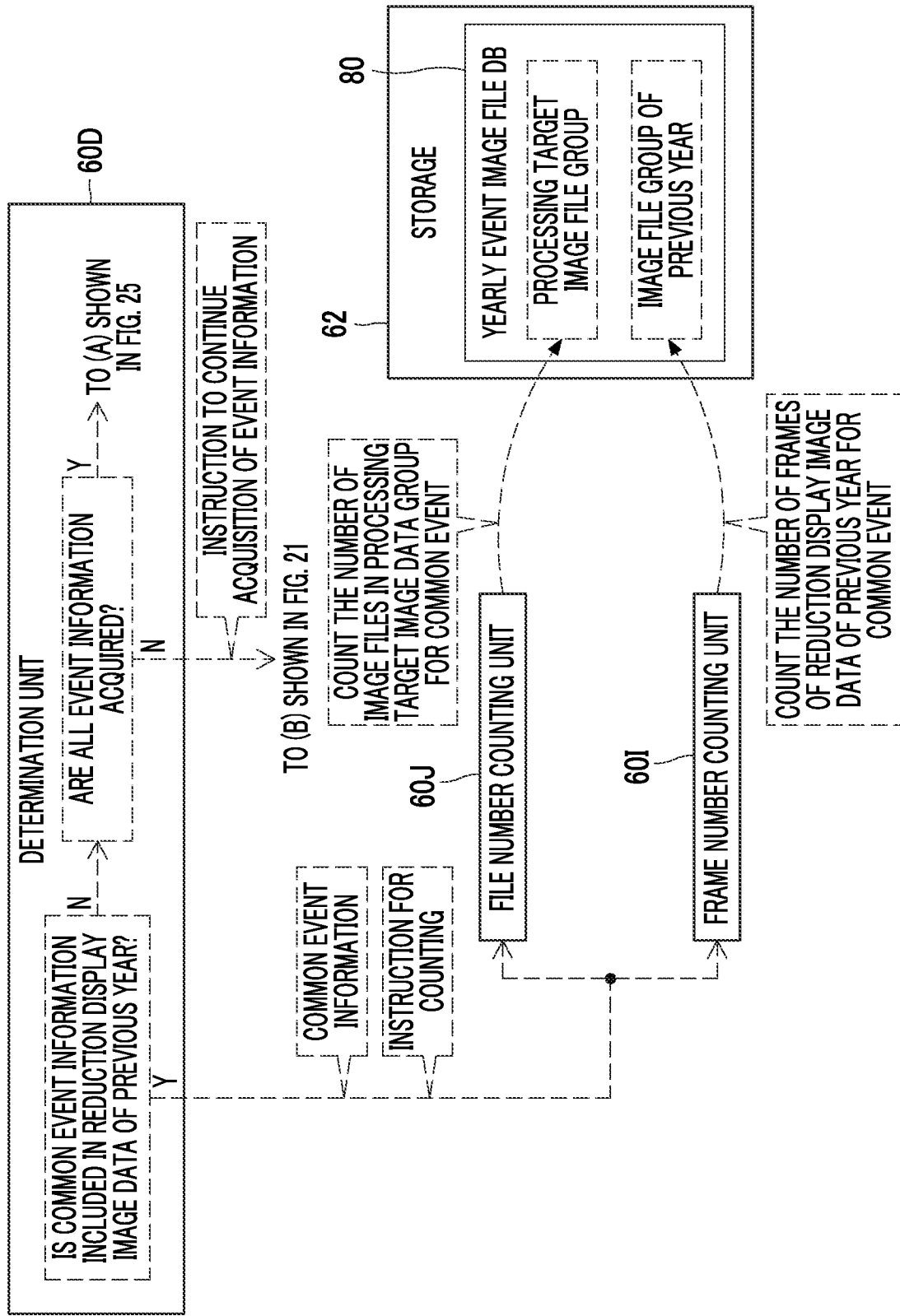
FIG. 22 is a block diagram showing an example of a process content in a case in which the CPU of the server provided in the information processing system according to the embodiment is operated as the determination unit, a file number counting unit, and a frame number counting unit.

As an example, as shown in FIG. 22, in a case in which the determination unit 60D determines that the reduction display image data of the previous year does not include the common event information, the determination unit 60D subsequently determines whether or not all the event information is acquired by the acquisition unit 60C from the processing target image file group. In a case in which the determination unit 60D determines that all the event information is not acquired by the acquisition unit 60C from the processing target image file group, the determination unit 60D instructs the acquisition unit 60C to continue to acquire the event information. Accordingly, the acquisition unit 60C continues to acquire the event information from the processing target image file group. In a case in which the determination unit 60D determines that all the event information is acquired by the acquisition unit 60C from the processing target image file group, the list image data generation process proceeds to (A) shown in FIG. 25.

On the other hand, in a case in which the determination unit 60D determines that the reduction display image data of the previous year includes the common event information, the determination unit 60D instructs the frame number counting unit 60I to start counting the number of frames and instructs the file number counting unit 60J to start counting the number of files.

In a case in which the determination unit 60D makes the instruction to start counting, the frame number counting unit 60I counts the number of frames of reduction display image data from the image file group of the previous year in the yearly event image file DB 80 for the big event indicated by the common event information (hereinafter, also referred to as "common event"). In a case in which the determination unit 60D makes the instruction to start counting, the file number counting unit 60J counts the number of image files in the processing target image file group for the common event.

Figure 23:
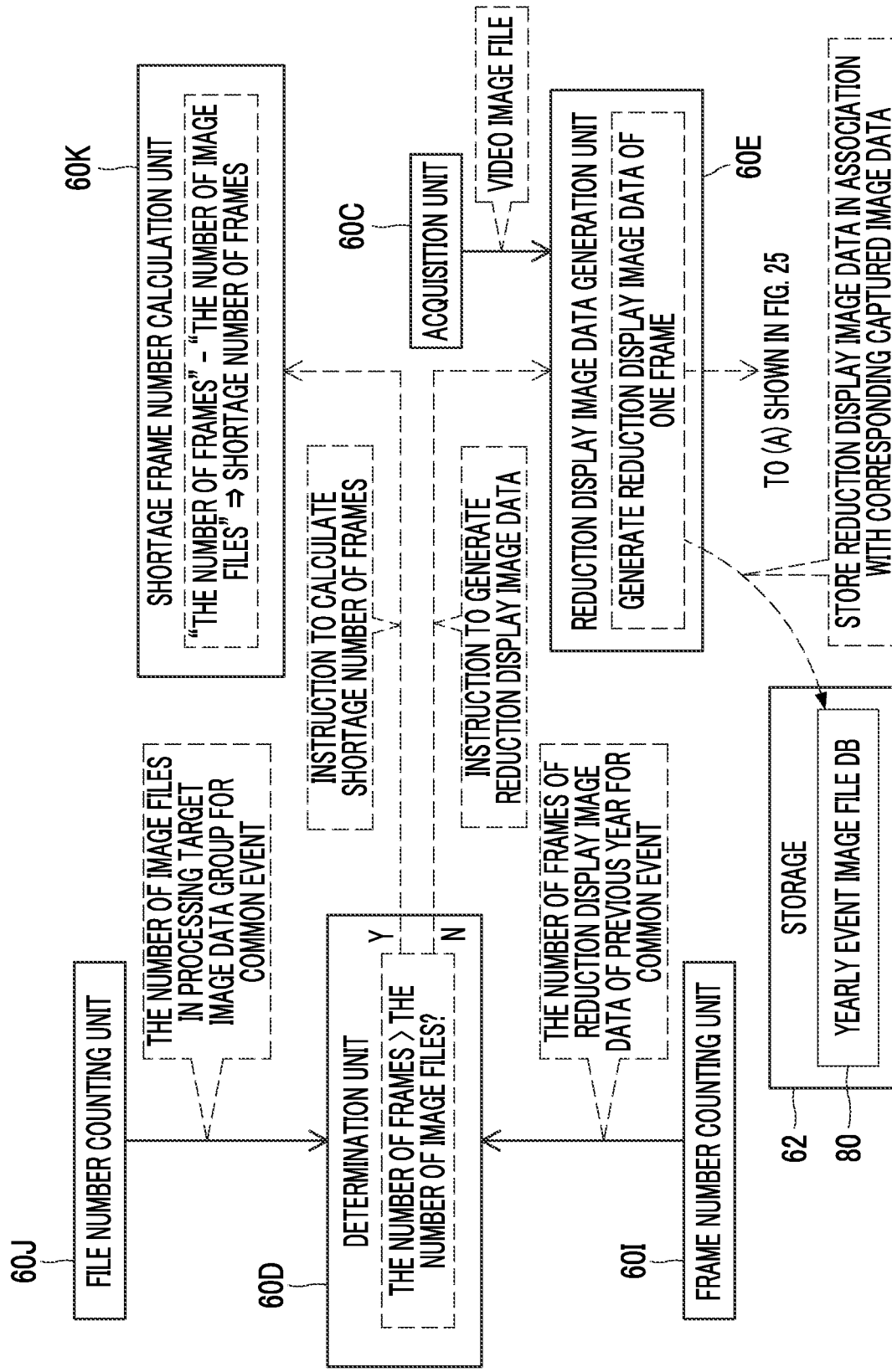
FIG. 23 is a block diagram showing an example of a process content in a case in which the CPU of the server provided in the information processing system according to the embodiment is operated as the file number counting unit, the determination unit, the frame number counting unit, a shortage frame number calculation unit, the acquisition unit, and the reduction display image data generation unit.

As an example, as shown in FIG. 23, the determination unit 60D determines whether or not the number of frames counted by the frame number counting unit 60I is larger than the number of image files counted by the file number counting unit 60J. In a case in which the determination unit 60D determines that the number of frames counted by the frame number counting unit 60I is equal to or smaller than the number of image files counted by the file number counting unit 60J, the determination unit 60D instructs the reduction display image data generation unit 60E to generate the reduction display image data. In a case in which the determination unit 60D determines that the number of frames counted by the frame number counting unit 60I is larger than the number of image files counted by the file number counting unit 60J, the determination unit 60D instructs the shortage frame number calculation unit 60K to calculate the shortage number of frames.

In a case in which the determination unit 60D makes the instruction to generate the reduction display image data, the reduction display image data generation unit 60E acquires the captured image data of one frame from the video image file acquired by the acquisition unit 60C, that is, the video image file which is the processing target at the present time. It should be noted that the processing target image file group including the video image file acquired by the acquisition unit 60C is an example of "editing target image data" according to the technology of the present disclosure.

The reduction display image data generation unit 60E extracts the original image data from the acquired captured image data and reduces the extracted original image data to generate the reduction display image data of one frame. In addition, the reduction display image data generation unit 60E adds the captured image data identifier for specifying the corresponding captured image data to the reduction display image data. Moreover, the reduction display image data generation unit 60E associates the generated reduction display image data with the corresponding captured image data, and stores the reduction display image data associated with the corresponding captured image data in the yearly event image file DB 80. Thereafter, the list image data generation process proceeds to (A) shown in FIG. 25.

The shortage frame number calculation unit 60K calculates the shortage number of frames. The shortage number of frames is a value obtained by subtracting the number of image files counted by the file number counting unit 60J from the number of frames counted by the frame number counting unit 60I.

Figure 24:
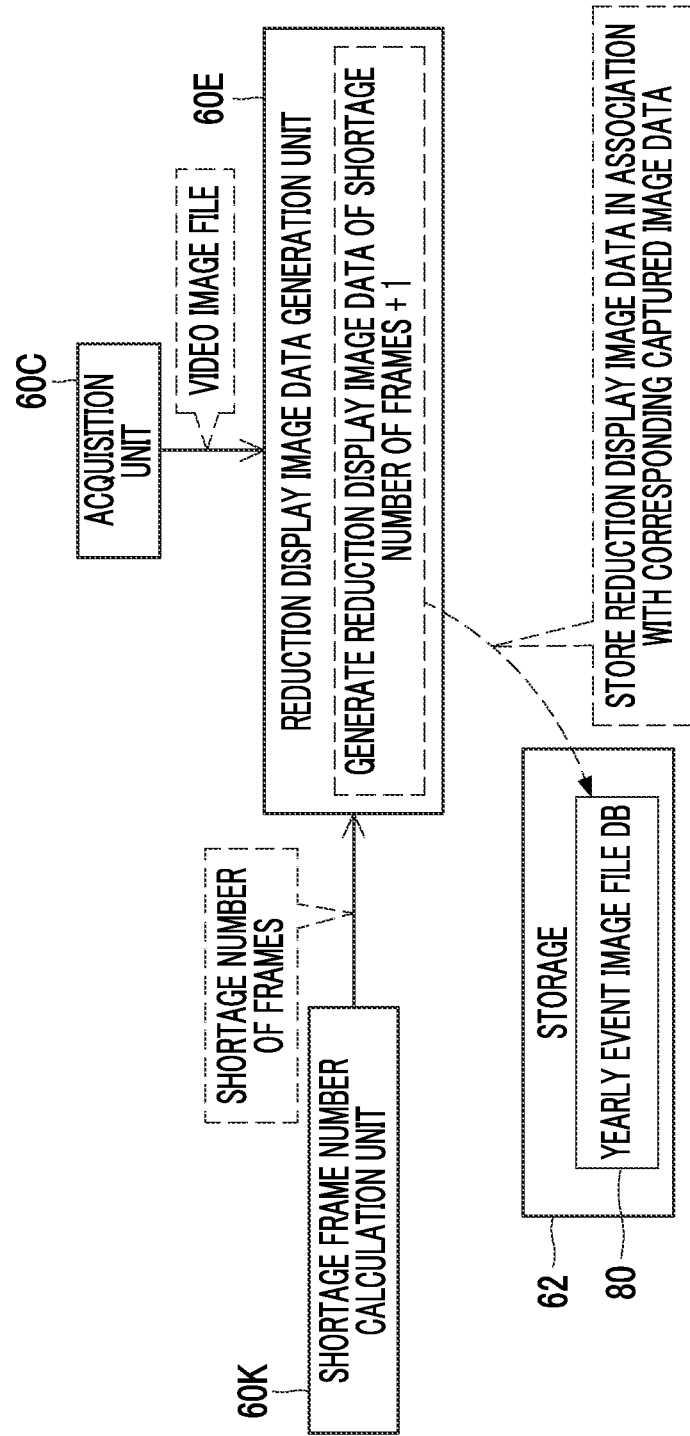
FIG. 24 is a block diagram showing an example of a process content in a case in which the CPU of the server provided in the information processing system according to the embodiment is operated as the acquisition unit, the shortage frame number calculation unit, and the reduction display image data generation unit.

As shown in FIG. 24 as an example, the reduction display image data generation unit 60E acquires the captured image data of the number of frames obtained by adding one to the shortage number of frames calculated by the shortage frame number calculation unit 60K (hereinafter, also referred to as "adjustment number of frames") from the video image file acquired by the acquisition unit 60C, that is, the video image file which is the processing target at the present time. Here, in a case in which there are a plurality adjustment number of frames, the reduction display image data generation unit 60E derives a similarity degree between the captured image data of the adjustment number of frames, that is, the captured image data of the plurality of frames. The similarity degree is derived, for example, in accordance with a result obtained by performing the image recognition process (for example, image recognition process by the cascade classifier and/or pattern matching) with respect to a plurality of original image data included in the captured image data of the plurality of frames. The reduction display image data generation unit 60E acquires the captured image data of which the derived similarity degree is within a predetermined range by the number of frames obtained by adding 1 to the shortage number of frames from the video image file.

The reduction display image data generation unit 60E extracts the original image data from each of the captured image data of the adjustment number of frames and reduces the extracted original image data to generate the reduction display image data by the adjustment number of frames. Here, the reduction display image data of the adjustment number of frames is an example of "second display image data for the video images of a plurality of frames corresponding to still image data of a plurality of frames constituting at least a part of the video image data" according to the technology of the present disclosure.

In addition, the reduction display image data generation unit 60E adds the captured image data identifier for specifying the corresponding captured image data to the reduction display image data. Moreover, the reduction display image data generation unit 60E associates the generated reduction display image data with the corresponding captured image data, and stores the reduction display image data associated with the corresponding captured image data in the yearly event image file DB 80. Thereafter, the list image data generation process proceeds to (A) shown in FIG. 25.

Figure 25:
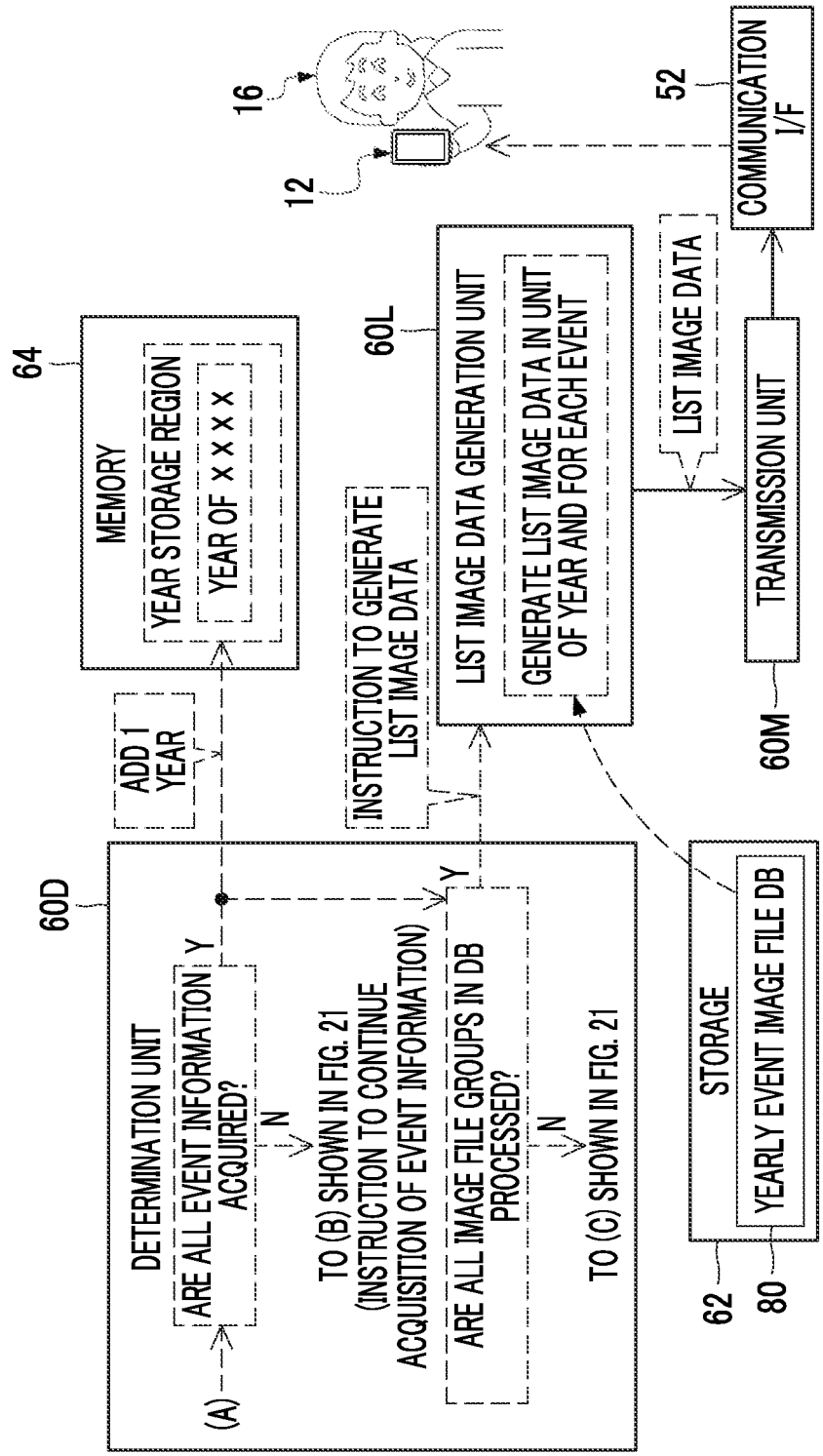
FIG. 25 is a block diagram showing an example of a process content in a case in which the CPU of the server provided in the information processing system according to the embodiment is operated as the determination unit, the list image data generation unit, and a transmission unit.

After the reduction display image data of the adjustment number of frames is generated and stored in the yearly event image file DB 80, as shown in FIG. 25 as an example, the determination unit 60D determines whether or not all the event information is acquired by the acquisition unit 60C from the processing target image file group. In a case in which the determination unit 60D determines that all the event information is not acquired by the acquisition unit 60C from the processing target image file group, the list image data generation process proceeds to (B) shown in FIG. 21, and the determination unit 60D instructs the acquisition unit 60C to continue to acquire the event information. On the other hand, in a case in which the determination unit 60D determines that all the event information is acquired by the acquisition unit 60C from the processing target image file group, the determination unit 60D adds one year to the year in the year storage region. Moreover, the determination unit 60D determines whether or not the processes shown in FIGS. 21 to 24 are executed for the image file group in the yearly event image file DB 80.

In a case in which the determination unit 60D determines that the processes shown in FIGS. 9 to 24 are not executed for all the image file groups in the yearly event image file DB 80, the list image data generation process proceeds to (C) shown in FIG. 21, and the determination unit 60D instructs the image data selection unit 60F to restart the selection of the processing target image file group. Here, restarting the selection of the processing target image file group refers to a process of reselecting the image file group corresponding to the year in the year storage region from the yearly event image file DB 80 as the processing target image file group.

On the other hand, in a case in which the determination unit 60D determines that the processes shown in FIGS. 9 to 24 are executed for all the image file groups in the yearly event image file DB 80, the determination unit 60D instructs the list image data generation unit 60L to generate the list image data.

In a case in which the determination unit 60D makes the instruction to generate the list image data, the list image data generation unit 60L acquires all the reduction display image data from the yearly event image file DB 80 by classifying the reduction display image data in a unit of a year and for each event. Moreover, the list image data generation unit 60L generates the list image data (see FIG. 26) for all the acquired reduction display image data in a unit of a year and for each big event. Here, the list image data generated by the list image data generation unit 60L is an example of "first display image data for a plurality of frames" and "second display image data of a plurality of frames" according to the technology of the present disclosure. In addition, in the present embodiment, the list image data is generated by the list image data generation unit 60L, so that the "first display image data" according to the technology of the present disclosure is acquired.

In the present embodiment, the unit of a year means a unit of one year. It should be noted that this is merely an example, and may be a unit of M (M: a natural number equal to or larger than 2) years. The unit of one year and the big event are examples of a "common attribute" according to the technology of the present disclosure. In addition, the big event is an example of an "event" according to the technology of the present disclosure. It should be noted that, out of the reduction display image data of the plurality of frames relating to the same big event, the reduction display image data of N year is an example of "first display image data" according to the technology of the present disclosure, and the reduction display image data of N+1 year is an example of "second display image data" according to the technology of the present disclosure.

The transmission unit 60M transmits the list image data generated by the list image data generation unit 60L to the user device 12, which is a providing source of the image data group, via the communication I/F 52. The user device 12, which is the providing source of the image data group, refers to the user device that provides the image data group to the server 14 (for example, the user device 12 shown in FIG. 9).

Figure 26:
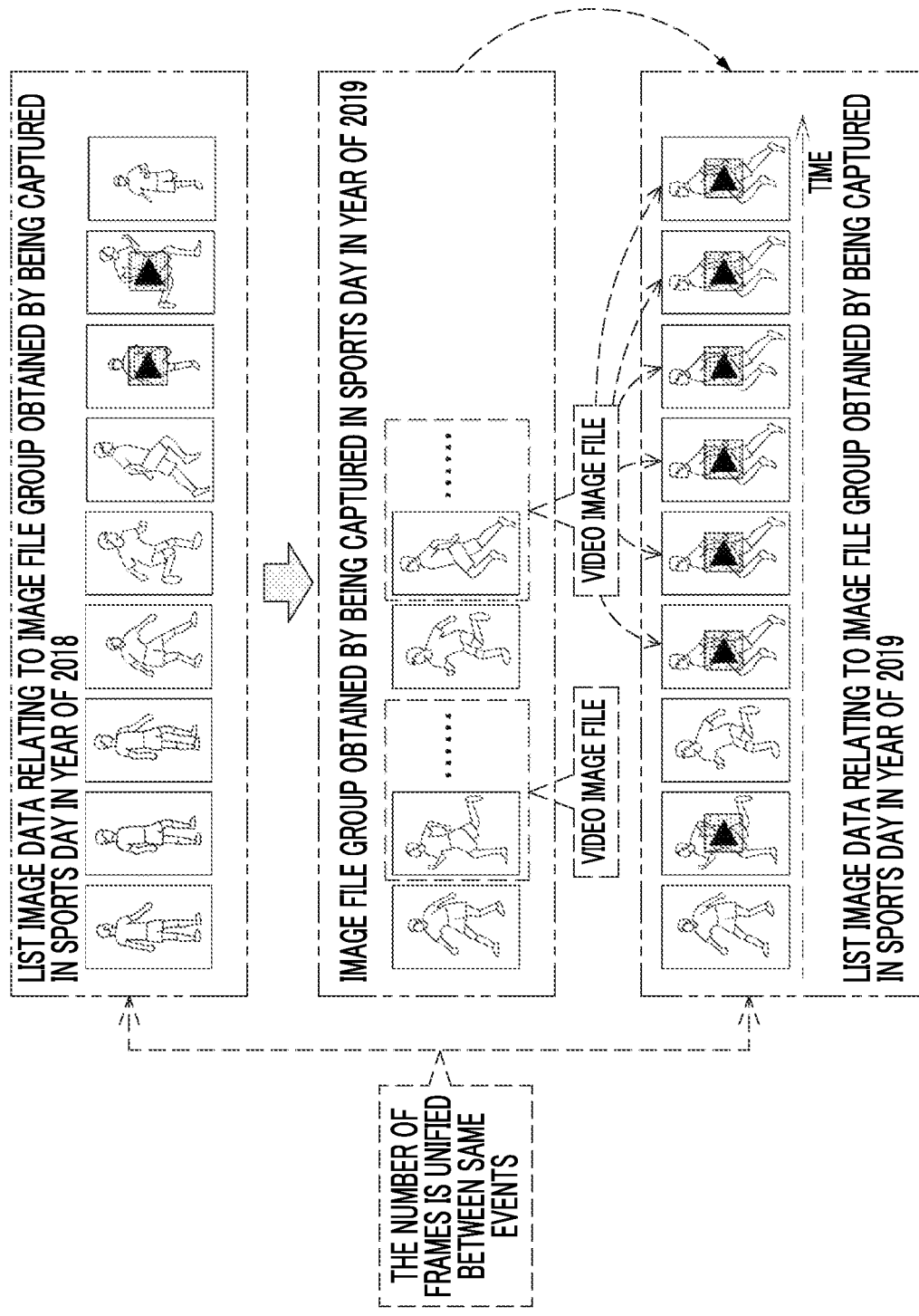
FIG. 26 is an example of the list image data obtained by executing the list image data generation process according to the embodiment.

As an example, as shown in FIG. 26, by executing the list image data generation process by the CPU 60, the 2019-year sports day image file group is acquired, and the reduction display image data of the adjustment number of frames described above (hereinafter, also referred to as "adjustment frame display image data group") is generated from one video image file included in the acquired 2019-year sports day image file group. In addition, by executing the list image data generation process by the CPU 60, the reduction display image data included in the list image data corresponding to the 2018-year sports day image file group is acquired.

Therefore, the number of frames of the reduction display image data included in the list image data corresponding to the 2018-year sports day image file group and the number of frames of the reduction display image data included in the list image data corresponding to the 2019-year sports day image file group are unified. It should be noted that this is merely an example, and the technology of the present disclosure is not limited to this. As long as the adjustment frame display image data group is generated, the number of frames of the reduction display image data included in the list image data corresponding to the 2018-year sports day image file group may be larger than the number of frames of the reduction display image data included in the list image data corresponding to the 2019-year sports day image file group.

In addition, here, the adjustment frame display image data group is generated from one video image file, but the technology of the present disclosure is not limited to this, and the adjustment frame display image data group may be generated from the plurality of video image files. In this case, the adjustment number of frames need only be distributed and allocated to the plurality of video image files to generate the reduction display image data of the allocated number of frames from each image file.

In addition, although the sports day is described as an example of the big event here, the technology of the present disclosure is not limited to this, and the number of frames of the reduction display image data corresponding to the image file group in a unit of one year is unified between the common big events held in a unit of one year. In addition, a unit of one year is merely an example, and the number of frames of the reduction display image data is unified between the common big events held in a unit of a plurality of years (for example, an opening ceremony of the Olympic Games, a closing ceremony of the Olympic Games, and/or a specific competition of the Olympic Games).

It should be noted that, in the example shown in FIG. 26, the list image data relating to the 2018-year sports day image file group is an example of "first display image data of a plurality of frames" according to the technology of the present disclosure. In addition, in the example shown in FIG. 26, the 2019-year sports day image file group is an example of "editing target image data" according to the technology of the present disclosure. In addition, in the example shown in FIG. 26, the video image file which is the basis of the adjustment frame display image data group is an example of "video image data" according to the technology of the present disclosure. In addition, in the example shown in FIG. 26, the captured image data of the plurality of frames included in the video image file that is the basis of the adjustment frame display image data group is an example of "still image data of a plurality of frames" according to the technology of the present disclosure.

Figure 27:
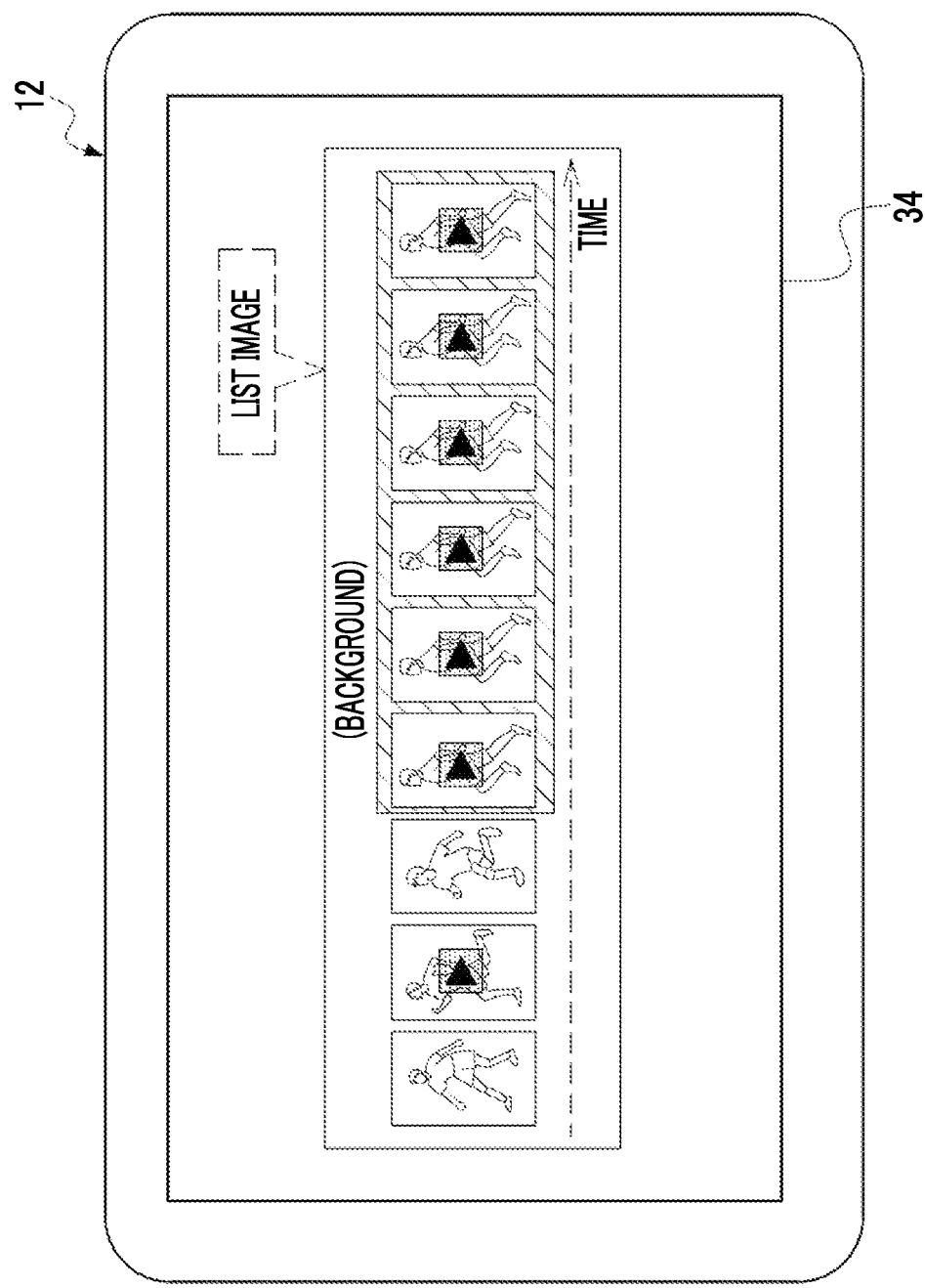
FIG. 27 is a screen view showing an example of an aspect in which list images indicated by the list image data obtained by executing the list image data generation process according to the embodiment are displayed on a display of the user device.

In a case in which the list image data is received by the user device 12, as shown in FIG. 27 as an example, the list images indicated by the list image data are displayed on the display 34. On the display 34, for the reduction display images of the plurality of frames, an image group indicated by the adjustment frame display image data group (hereinafter, also referred to as "adjustment frame display image group") and the reduction display image other than the adjustment frame display image group are displayed in a distinguishable aspect.

Specifically, for the reduction display images of the plurality of frames included in the list images, on a band-shaped background extending along a time axis, the adjustment frame display image group generated from the same video image file and the reduction display images of the plurality of frames other than the adjustment frame display image group are displayed in a distinguishable aspect. In the example shown in FIG. 27, by adding the color different from the background of the reduction display image other than the adjustment frame display images group to the background (hatched region) of the adjustment frame display image group, the adjustment frame display image group and the reduction display image other than the adjustment frame display images group can be visually distinguished.

It should be noted that, in the following, for convenience of description, the image of one frame included in the adjustment frame display image group is referred to as "adjustment frame display image", and the data indicating the adjustment frame display image is referred to as "adjustment frame display image data".

Here, the adjustment frame display image data is an example of "second display image data for the video images" according to the technology of the present disclosure. In addition, the adjustment frame display image is an example of "display image based on the second display image data for the video images" according to the technology of the present disclosure. In addition, the adjustment frame display image group is an example of "display images of a plurality of frames based on the second display image data for the video images" according to the technology of the present disclosure. In addition, the reduction display image other than the adjustment frame display images group among the plurality of reduction display images included in the list images relating to the 2019-year sports day image file group is an example of "display image based on the second display image data other than the second display image data for the video images" according to the technology of the present disclosure.

It should be noted that, here, the adjustment frame display image data is generated not from all the original image data included in one video image file in the 2019-year sports day image file group, but from some original image data. However, the technology of the present disclosure is not limited to this, and the adjustment frame display image data may be generated from each of all the original image data included in the video image file. For example, in a case in which the recording time of the video image file is shorter than 1 second, the adjustment frame display image data may be generated from each of all the original image data included in the video image file.

Then, an action of the information processing system 10 will be described.

FIGS. 28A to 28D show examples of a flow of the list image data generation process. It should be noted that the flows of the list image data generation process shown in FIGS. 28A to 28D are examples of an "information processing method" according to the technology of the present disclosure.

In the list image data generation process shown in FIG. 28A, first, in step ST10, the determination unit 60D determines whether or not the image file group transmitted from the user device 12 is received by the communication I/F 52. In step ST10, in a case in which the image file group transmitted from the user device 12 is not received by the communication I/F 52, a negative determination is made, and the list image data generation process proceeds to step ST80 shown in FIG. 28D. In step ST10, in a case in which the image file group transmitted from the user device 12 is received by the communication I/F 52, a positive determination is made, and the list image data generation process proceeds to step ST12.

In step ST12, the DB construction unit 60A constructs the image file DB 74 in the storage 62 using the image file group received by the communication I/F 52 (see FIG. 9), and then the list image data generation process proceeds to step ST14.

In step ST14, the image analysis unit 60B performs the image analysis with respect to the image file included in the image file DB 74 constructed in step ST12 (see FIGS. 10 and 11), and then the list image data generation process proceeds to step ST16.

In step ST16, the DB construction unit 60A constructs the yearly event image file DB 80 by classifying the image files included in the image file DB 74 in a unit of a year and for each big event based on the result of the image analysis performed in step ST14 (see FIGS. 12 to 15), and then the list image data generation process proceeds to step ST18.

In step ST18, the acquisition unit 60C acquires an unprocessed still image file from the yearly event image file DB 80 constructed in step ST16 (see FIG. 16), and then the list image data generation process proceeds to step ST20. In this step ST18, the unprocessed still image file refers to a still image file which has not yet been processed in step ST20 and step ST21.

In step ST20, the reduction display image data generation unit 60E generates the reduction display image data from the still image file acquired in step ST18 (see FIG. 16), and then the list image data generation process proceeds to step ST21.

In step ST21, the reduction display image data generation unit 60E stores the reduction display image data generated in step ST20 in association with the corresponding still image file in the yearly event image file DB 80 (see FIG. 16), and then the list image data generation process proceeds to step ST22.

In step ST22, the determination unit 60D determines whether or not the processes of step ST20 and step ST21 are performed with respect to all the still image files. In a case in which the processes of step ST20 and step ST21 are not performed for all the still image files in step ST22, a negative determination is made, and the list image data generation process proceeds to step ST18. In a case in which the processes of step ST20 and step ST21 are performed for all the still image files in step ST22, a positive determination is made, and the list image data generation process proceeds to step ST24 shown in FIG. 28B.

In step ST24 shown in FIG. 28B, the image data selection unit 60F selects the image file group to which the date of the oldest year is added from the yearly event image file DB 80 as a processing target image file group (see FIG. 17), and then the list image data generation process proceeds to step ST26.

In step ST26, the image data selection unit 60F stores the year of the date added to the processing target image file group selected in step ST24 in the year storage region (see FIG. 18), and then the list image data generation process proceeds to step ST28.

In step ST28, the determination unit 60D determines whether or not the processing target image file group selected in step ST24 includes the video image file (see FIG. 18). In step ST28, in a case in which the processing target image file group selected in step ST24 does not include the video image file, a negative determination is made, and the list image data generation process proceeds to step ST42. In step ST28, in a case in which the processing target image file group selected in step ST24 includes the video image file, a positive determination is made, and the list image data generation process proceeds to step ST30.

In step ST30, the acquisition unit 60C acquires an unprocessed video image file from the processing target image file group selected in step ST24 (see FIG. 19), and then the list image data generation process proceeds to step ST32. In this step ST30, the unprocessed video image file refers to a video image file which has not yet been processed in step ST32 to step ST38.

In step ST32, the recording time specifying unit 60G specifies the recording time of the video image file acquired in step ST30 (see FIG. 19), and then the list image data generation process proceeds to step ST34.

In step ST34, the frame number derivation unit 60H derives the number of frames for video image reduction display in accordance with the recording time specified in step ST32 using the frame number derivation table 82 (see FIG. 19), and then the list image data generation process proceeds to step ST36.

In step ST36, the reduction display image data generation unit 60E generates the reduction display image data of the number of frames for video image reduction display derived in step ST34 (see FIG. 20), and then the list image data generation process proceeds to step ST38.

In step ST38, the reduction display image data generation unit 60E stores the reduction display image data generated in step ST36 in association with the corresponding captured image data in the yearly event image file DB 80 (see FIG. 20), and then the list image data generation process proceeds to step ST40.

In step ST40, the determination unit 60D determines whether or not the processes of step ST32 to step ST38 are performed with respect to all the video image files included in the processing target image file group selected in step ST24 (see FIG. 20). In step ST40, in a case in which all the video image files included in the processing target image file group selected in step ST24 are not processed in step ST32 to step ST38, a negative determination is made, and the list image data generation process proceeds to step ST30. In step ST40, in a case in which all the video image files included in the processing target image file group selected in step ST24 are processed in step ST32 to step ST38, a positive determination is made, and the list image data generation process proceeds to step ST42.

Figure 28C:
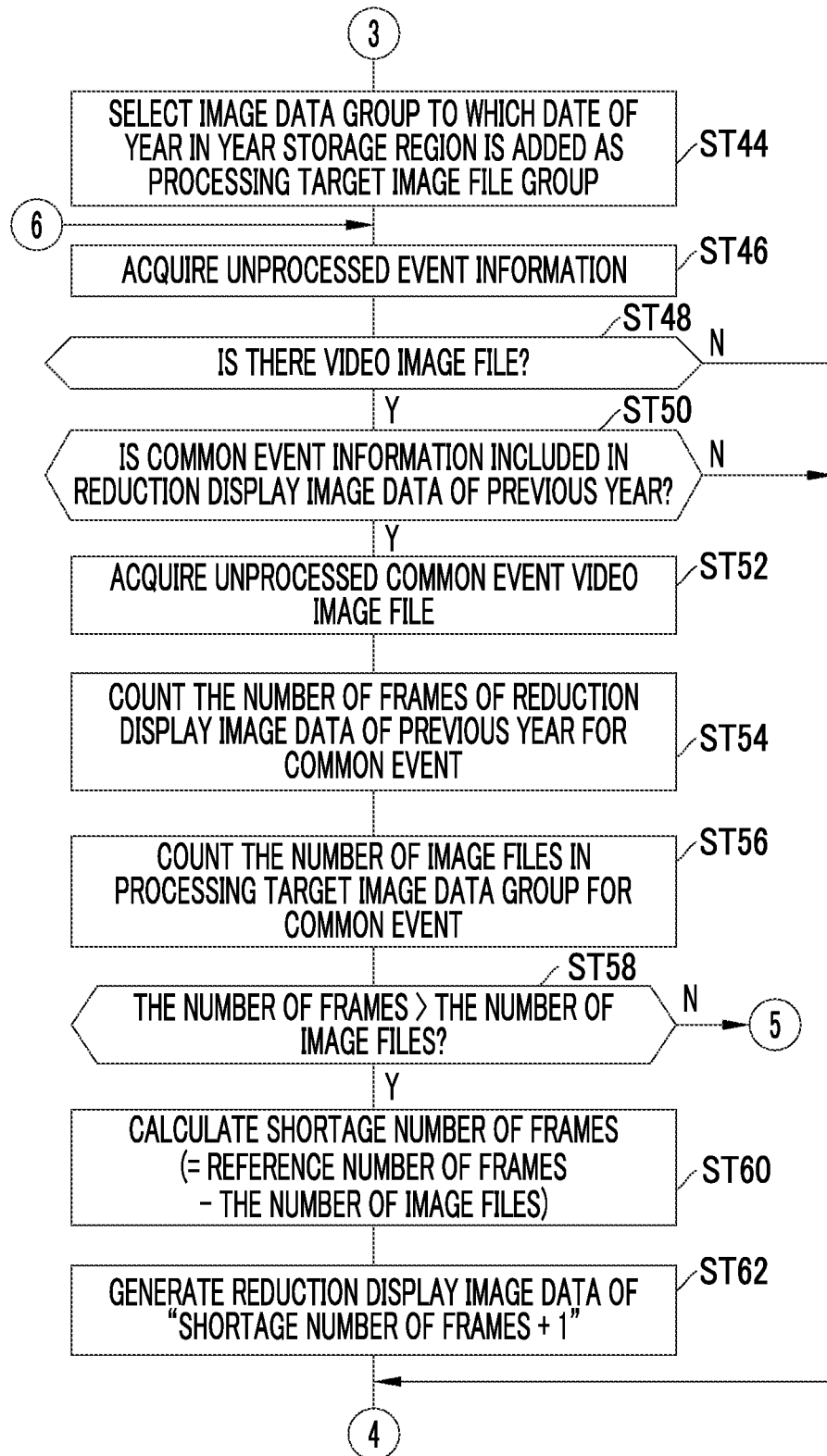
FIG. 28C is a continuation of the flowchart shown in FIG. 28B.

In step ST42, the image data selection unit 60F adds one year to the year in the year storage region (see FIG. 20), and then the list image data generation process proceeds to step ST44 shown in FIG. 28C.

In step ST44 shown in FIG. 28C, the image data selection unit 60F selects the image data group to which the date of the year in the year storage region is added from the yearly event image file DB 80 as the processing target image file group (see FIG. 21), and then the list image data generation process proceeds to step ST46.

In step ST46, the acquisition unit 60C acquires unprocessed event information from the processing target image file group selected in step ST44 (see FIG. 21), and then the list image data generation process proceeds to step ST48. In step ST46, the unprocessed event information refers to event information which has not yet been used in the process after step ST48.

In step ST48, the determination unit 60D determines whether or not the video image file is included in the image file group of the event of interest indicated by the event information acquired in step ST46 out of the processing target image file group selected in step ST44 (see FIG. 21). In step ST48, in a case in which the video image file is not included in the image file group of the event of interest indicated by the event information acquired in step ST46 out of the processing target image file group selected in step ST44, a negative determination is made, and the list image data generation process proceeds to step ST68 shown in FIG. 28D. In step ST48, in a case in which the video image file is included in the image file group of the event of interest indicated by the event information acquired in step ST46 out of the processing target image file group selected in step ST44, a positive determination is made, and the list image data generation process proceeds to step ST50.

In step ST50, the determination unit 60D determines whether or not the common event information is included in the reduction display image data corresponding to the image data group of the previous year in the yearly event image file DB 80 (see FIG. 21). In step ST50, in a case in which the reduction display image data corresponding to the image data group of the previous year in the yearly event image file DB 80 does not include the common event information, a negative determination is made, and the list image data generation process proceeds to step ST68 shown in FIG. 28D. In step ST50, in a case in which the reduction display image data corresponding to the image data group of the previous year in the yearly event image file DB 80 includes the common event information, a positive determination is made, and the list image data generation process proceeds to step ST52.

In step ST52, the acquisition unit 60C acquires an unprocessed common event video image file from the processing target image data group selected in step ST44 (see acquisition unit 60C in FIGS. 23 and 24), and then the list image data generation process proceeds to step ST54. In this step ST52, the unprocessed common event image file is a video image file relating to the common event information included in the reduction display image data of the previous year out of the processing target image data group selected in step ST44, which is a video image file which has not yet been used in the process step ST62 or step ST64.

In step ST54, the frame number counting unit 60I counts the number of frames of the reduction display image data of the previous year for the common event (big event indicated by the common event information) (see FIG. 22), and then the list image data generation process proceeds to step ST56. In this step ST54, the previous year refers to the previous year of the year in the year storage region.

In step ST56, the file number counting unit 60J counts the number of image files in the processing target image data group selected in step ST44 for the common event (big event indicated by the common event information) (see FIG. 22), and then the list image data generation process proceeds to step ST58.

In step ST58, it is determined whether or not the number of frames counted in step ST54 is larger than the number of image files counted in step ST56 (see FIG. 23). In step ST58, in a case in which the number of frames counted in step ST54 is equal to or smaller than the number of image files counted in step ST56, a negative determination is made, and the list image data generation process proceeds to step ST64 shown in FIG. 28D. In step ST58, in a case in which the number of frames counted in step ST54 is larger than the number of image files counted in step ST56, a positive determination is made, and the list image data generation process proceeds to step ST60.

In step ST60, the shortage frame number calculation unit 60K calculates the shortage number of frames using the number of frames counted in step ST54 and the number of image files counted in step ST56 (see FIG. 23), and then the list image data generation process proceeds to step ST62.

Figure 28D:
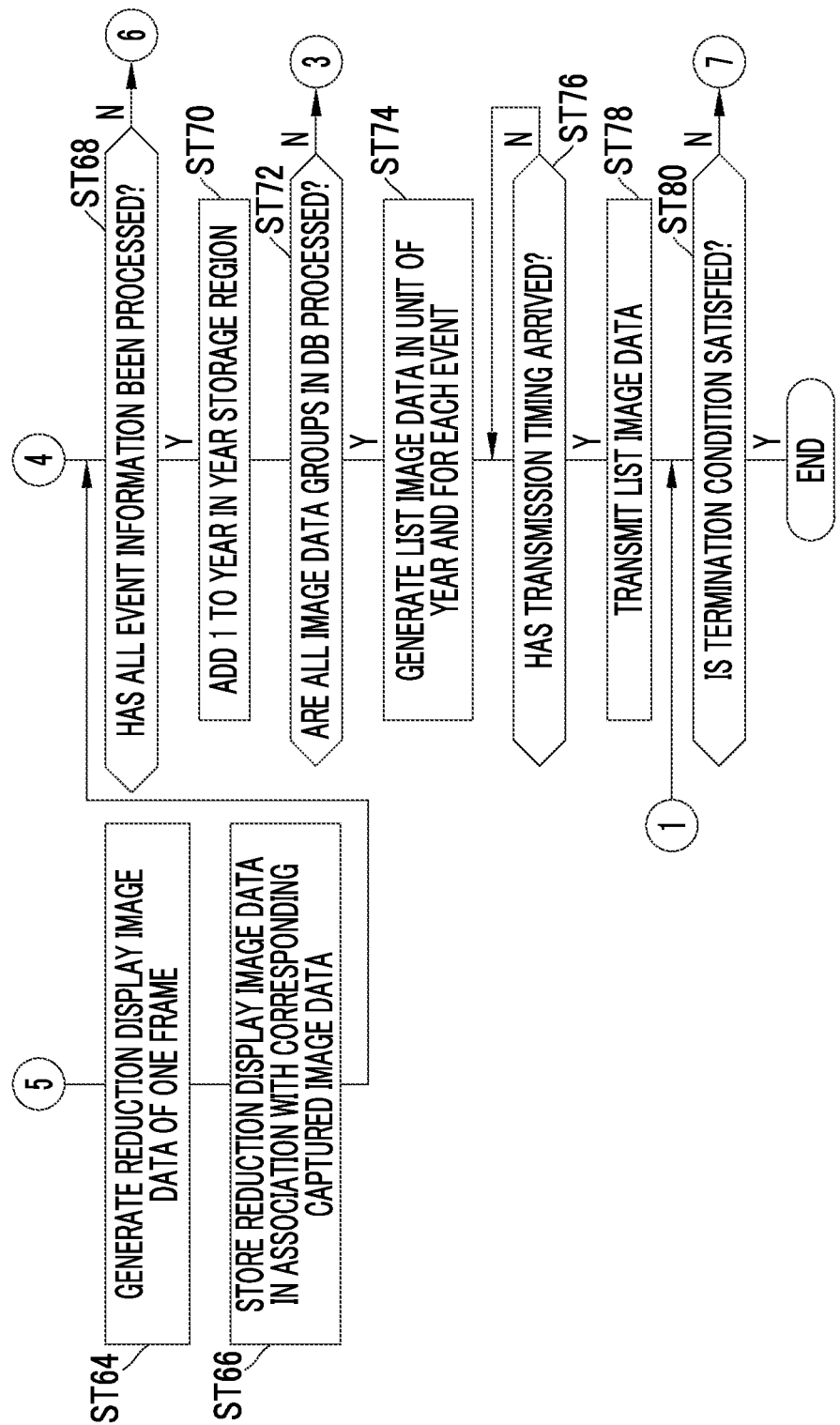
FIG. 28D is a continuation of the flowchart shown in FIG. 28C.

In step ST62, the reduction display image data generation unit 60E generates the reduction display image data of the adjustment number of frames obtained by adding 1 to the shortage number of frames calculated in step ST60 from the common event video image file acquired in step ST52 (see FIG. 24), and then the list image data generation process proceeds to step ST68 shown in FIG. 28D.

In step ST64 shown in FIG. 28D, the reduction display image data generation unit 60E generates the reduction display image data of one frame from the common event video image file acquired in step ST52 (see FIG. 23), and then the list image data generation process proceeds to step ST66.

In step ST66, the reduction display image data generation unit 60E stores the reduction display image data generated in step ST64 in association with the corresponding captured image data in the yearly event image file DB 80 (see FIG. 23), and then the list image data generation process proceeds to step ST68.

In step ST68, the determination unit 60D determines whether or not the process of step ST46 is performed for all the event information included in the processing target image data group selected in step ST44 (see FIG. 25). In step ST68, in a case in which the process of step ST46 is not performed for all the event information included in the processing target image data group selected in step ST44, a negative determination is made, and the list image data generation process proceeds to step ST46 shown in FIG. 28C. In step ST68, in a case in which the process of step ST46 is performed for all the event information included in the processing target image data group selected in step ST44, a positive determination is made, and the list image data generation process proceeds to step ST70.

In step ST70, the determination unit 60D adds one year to the year in the year storage region (see FIG. 25), and then the list image data generation process proceeds to step ST72.

In step ST72, the determination unit 60D determines whether or not the process of step ST44 is performed for all the image file groups in the yearly event image file DB 80 (see FIG. 25). In step ST72, in a case in which the process of step ST44 is not performed for all the image file groups in the yearly event image file DB 80, a negative determination is made, and the list image data generation process proceeds to step ST44 shown in FIG. 28C. In step ST72, in a case in which the process of step ST44 is performed for all the image file groups in the yearly event image file DB 80, a positive determination is made, and the list image data generation process proceeds to step ST74.

In step ST74, the list image data generation unit 60L generates the list image data by classifying all the reduction display image data in the yearly event image file DB 80 in a unit of a year and for each big event (FIGS. 25 and 26), and then the list image data generation process proceeds to step ST76.

In step ST76, the determination unit 60D determines whether or not a timing for transmitting the list image data (hereinafter, also referred to as "transmission timing") has arrived. Examples of the transmission timing include a timing at which the instruction to start the transmission of the list image data is received by the reception device 32 or 54, and a timing at which a predetermined time (for example, 10 seconds) has elapsed since the process of step ST74 is terminated.

In a case in which the transmission timing has not arrived in step ST76, a negative determination is made, and the determination in step ST76 is made again. In a case in which the transmission timing has arrived in step ST76, a positive determination is made, and the list image data generation process proceeds to step ST78.

In step ST78, the transmission unit 60M transmits the list image data generated in step ST74 to the user device 12 via the communication I/F 52 (see FIG. 25), and then the list image data generation process proceeds to step ST80.

In step ST80, the determination unit 60D determines whether or not a condition for terminating the list image data generation process (hereinafter, also referred to as "list image data generation process termination condition") is satisfied. Examples of the list image data generation process termination condition include a condition that the reception device 32 or 54 receives an instruction to terminate the list image data generation process. In a case in which the list image data generation process termination condition is not satisfied in step ST80, a negative determination is made, and the list image data generation process proceeds to step ST10 shown in FIG. 28A. In a case in which the list image data generation process termination condition is satisfied in step ST80, a positive determination is made, and the list image data generation process is terminated.

As described above, in the present embodiment, in the server 14, the adjustment frame display image data of the adjustment number of frames determined in accordance with the number of frames of the reduction display image data included in the list image data corresponding to the 2018-year sports day image file group is generated from the 2019-year sports day image file group (see FIG. 26). The reduction display image data included in the list image data corresponding to the 2018-year sports day image file group and the 2019-year sports day image file group have the common attribute of the unit of one year and the common attribute of the sports day. Moreover, the display 34 displays adjustment frame display images of the adjustment number of frames (see FIG. 27). Therefore, with the present configuration, the list images can be displayed on the display 34 with a uniform number of display frames for each attribute of the reduction display image data.

In addition, in the present embodiment, the number of frames of the adjustment frame display images is limited to be equal to or smaller than the number of frames of the reduction display image data included in the list image data corresponding to the 2018-year sports day image file group (see FIG. 26). Therefore, with the present configuration, it is possible to suppress the number of frames of the reduction display image data from exceeding the number of frames of the reduction display image data included in the list image data corresponding to the 2018-year sports day image file group as compared with a case in which the number of frames of the adjustment frame display images is not limited at all.

In addition, in the present embodiment, in the server 14, the 2019-year sports day image file group and the reduction display image data of the plurality of frames corresponding to the 2018-year sports day image file group are acquired by the CPU 60 as the image data having the common attribute (see FIG. 26). Moreover, the list image data corresponding to the 2019-year sports day image file group is generated from the 2019-year sports day image file group. The number of frames of the list image data corresponding to the 2019-year sports day image file group is the same as the number of frames of the reduction display image data included in the list image data corresponding to the 2018-year sports day image file group. Therefore, with the present configuration, it is possible to unify the number of frames of reduction display image data having the common attribute.

In addition, in the present embodiment, the common attribute of the 2019-year sports day image file group and the reduction display image data of the plurality of frames corresponding to the 2018-year sports day image file group is the big event called the sports day. Therefore, with the present configuration, it is possible to unify the number of frames of reduction display image data having the common attribute called the sports day.

It should be noted that the common attribute is not limited to the big event, and the date, the subject, the imaging position, the imaging person, and/or the model of the imaging apparatus may be adopted instead of the big event or together with the big event. In addition, as the common attribute, the small event may be adopted instead of the big event. In addition, in the above, the unit of a year has been described as an example of the common attribute, but a seasonal unit (for example, spring, summer, autumn, and winter), a monthly unit, a weekly unit, or a daily unit may be adopted.

In addition, in the present embodiment, the attribute of the image file group (for example, a big event) is specified by performing the image analysis with respect to the image file group. Therefore, with the present configuration, it is possible to reduce the trouble of specifying the attribute of the image file group as compared with a case of specifying the attribute of the image file group while visually confirming the content of the image file group.

In addition, in the present embodiment, the captured image data of the adjustment number of frames acquired from the video image file by the reduction display image data generation unit 60E is the captured image data of which the similarity degree is within the predetermined range. The reduction display image data generation unit 60E generates the reduction display image data of the adjustment number of frames from the captured image data of the adjustment number of frames. Therefore, with the present configuration, it is possible to meet a request of the user who wants to confirm a subtle difference between the reduction display image data.

It should be noted that, in the present embodiment, the similarity degree is derived based on the result of the image analysis, but the technology of the present disclosure is not limited to this, and the similarity degree may be derived in consideration of a time interval between the frames of the captured image data acquired from the video image file instead of the result of the image analysis or together with the result of the image analysis.

In addition, the captured image data of the adjustment number of frames acquired from the video image file by the reduction display image data generation unit 60E may be the captured image data of which the similarity degree is out of the predetermined range. In this case, it is possible to meet a request of the user who thinks that similar reduction display image data is unnecessary.

In addition, in the present embodiment, for the reduction display images of the plurality of frames, the adjustment frame display image group and the reduction display image other the adjustment frame display image group are displayed on the display 34 in a distinguishable aspect. In addition, for the reduction display images of the plurality of frames included in the list images, on the band-shaped background extending along a time axis, the display 34 displays the adjustment frame display image group generated from the same video image file and the reduction display images of the plurality of frames other than the adjustment frame display image group in a distinguishable aspect. Therefore, with the present configuration, the user can visually identify the adjustment frame display image group and the reduction display image other than the adjustment frame display image group.

It should be noted that, in the embodiment described above, the form example has been described in which the reduction display images of the plurality of frames included in the list images are displayed side by side in a line along the time axis, but the technology of the present disclosure is not limited to this. For example, the display 34 may display the reduction display images of the plurality of frames included in the list images relating to the 2019-year sports day image file group in separate stages. In this case, in a case in which the time slots of the imaging performed to obtain each of the reduction display images of the plurality of frames overlap with each other, the reduction display images of the plurality of frames may be displayed in separate stages.

Figure 29:
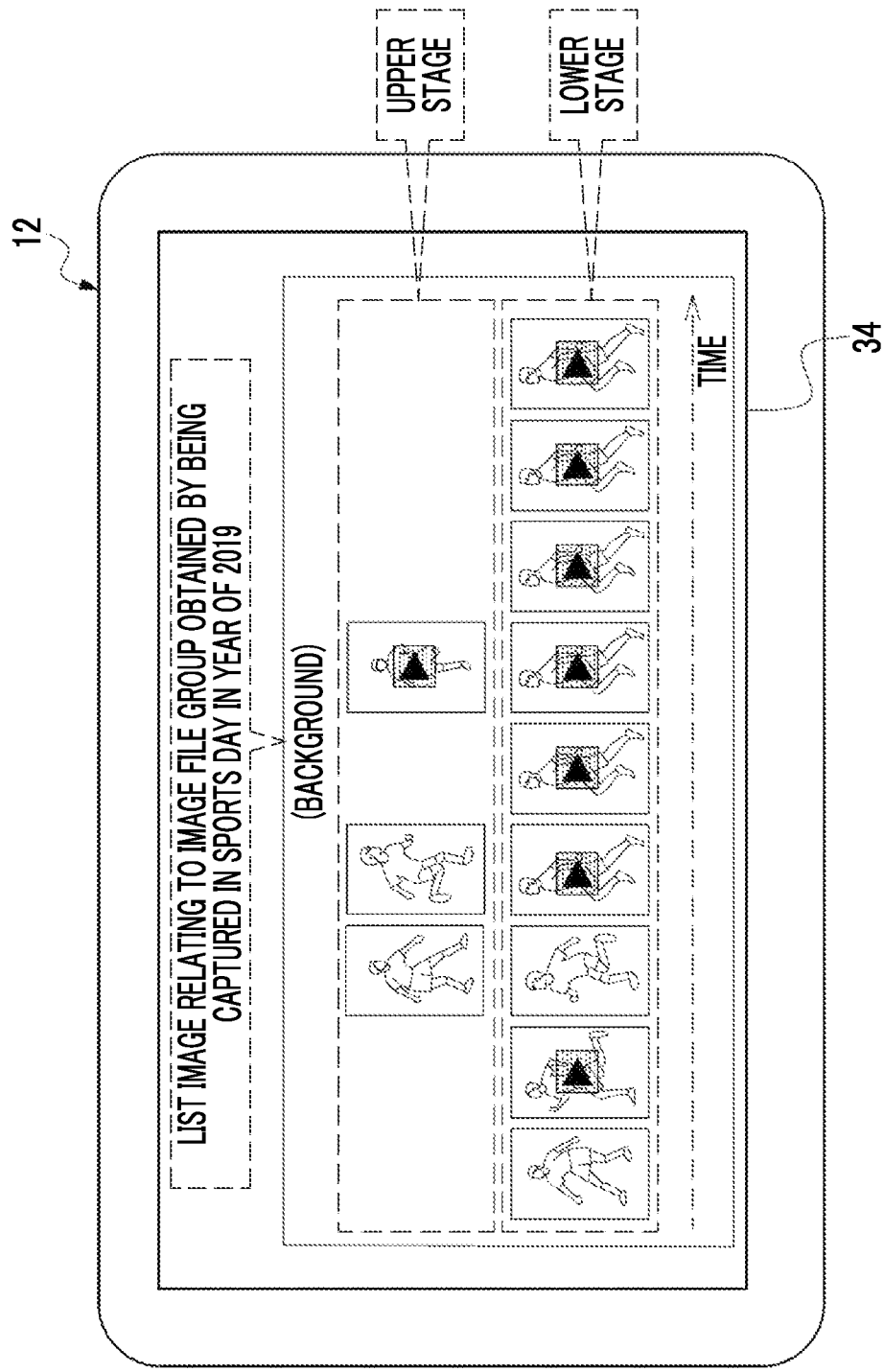
FIG. 29 is a screen view showing a first modification example of a display aspect of the list images displayed on the display of the user device provided in the information processing system according to the embodiment.

Here, as a specific example, a case will be described in which the reduction display image data of the plurality of frames (hereinafter, also referred to as "time slot overlapping display image data of the plurality of frames") obtained by being captured in the time slots overlapping with each other is included in the list image data relating to the 2019-year sports day image file group. In this case, as shown in FIG. 29 as an example, the display 34 displays the time slot overlapping display images of the plurality of frames indicated by the time slot overlapping display image data of the plurality of frames in time series. In addition, the display 34 displays the time slot overlapping display images of the plurality of frames in an aspect in which the time slot overlapping display images of the plurality of frames are arranged to correspond to positions indicating the time slots at which the time slot overlapping display images of the plurality of frames overlap with each other on the time axis. In the example shown in FIG. 29, an upper stage and a lower stage are provided on the time axis, and time slot overlapping display images are displayed in a state of being arranged to correspond to each other on an upper stage and a lower stage at positions indicating the time slots overlapping with each other. Therefore, with the present configuration, a temporal relationship between the time slot overlapping display images of the plurality of frames indicated by the reduction display image data of the plurality of frames obtained by being captured in the time slots overlapping with each other can be visually grasped.

In the example shown in FIG. 29, the form example has been described in which the time slot overlapping display images are displayed in two stages, but this is merely an example, and the time slot overlapping display image may be displayed in three or more stages. The display method of displaying the images in separate stages in this way is effective in a case in which the time slots in which the imaging is performed overlap with each other between the plurality of reduction display images obtained by being captured by each of a plurality of imaging persons.

Figure 30:
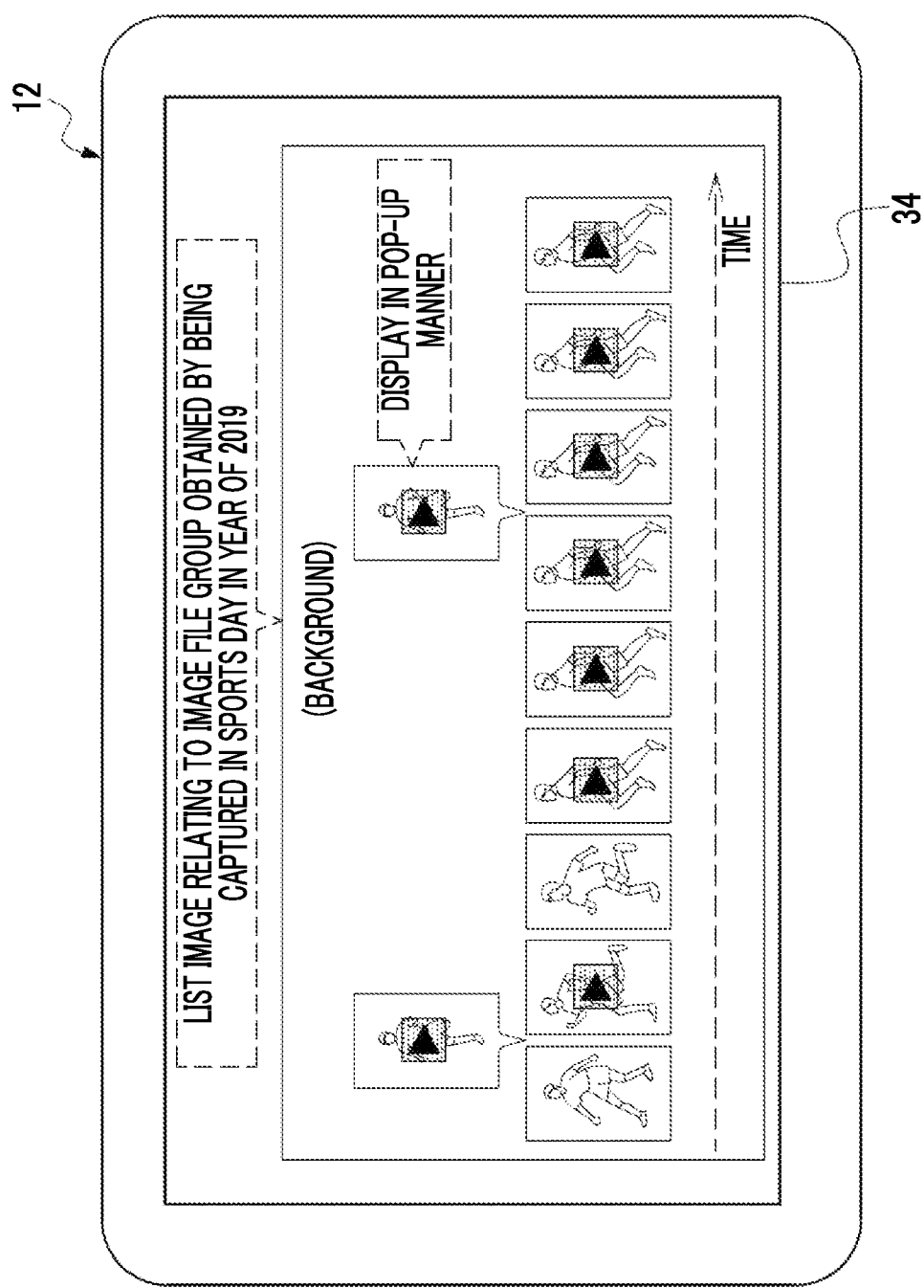
FIG. 30 is a screen view showing a second modification example of the display aspect of the list images displayed on the display of the user device provided in the information processing system according to the embodiment.

In addition, as shown in FIG. 30, other reduction display images may be displayed in a pop-up manner between the reduction display images of the plurality of frames arranged along the time axis. In this case, other reduction display images are displayed to correspond to the positions indicating the captured time points on the time axis.

Figure 31:
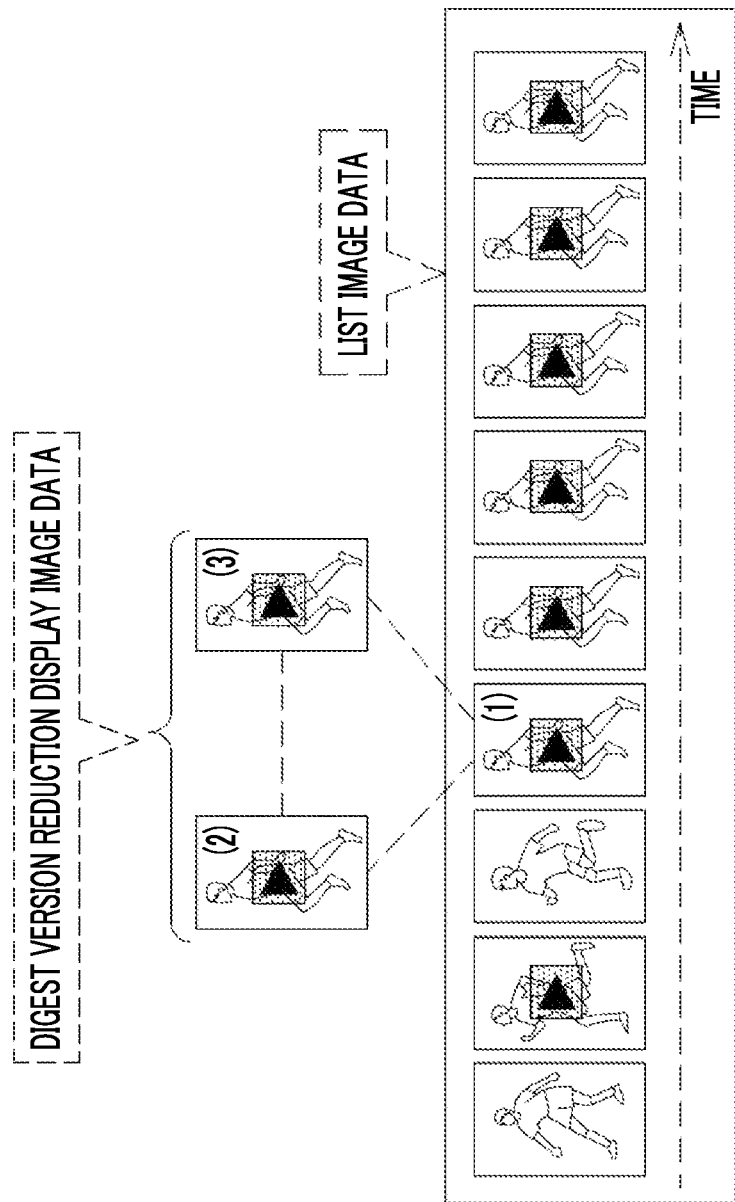
FIG. 31 is a modification example of the list image data obtained by executing the list image data generation process according to the embodiment.
Figure 32:
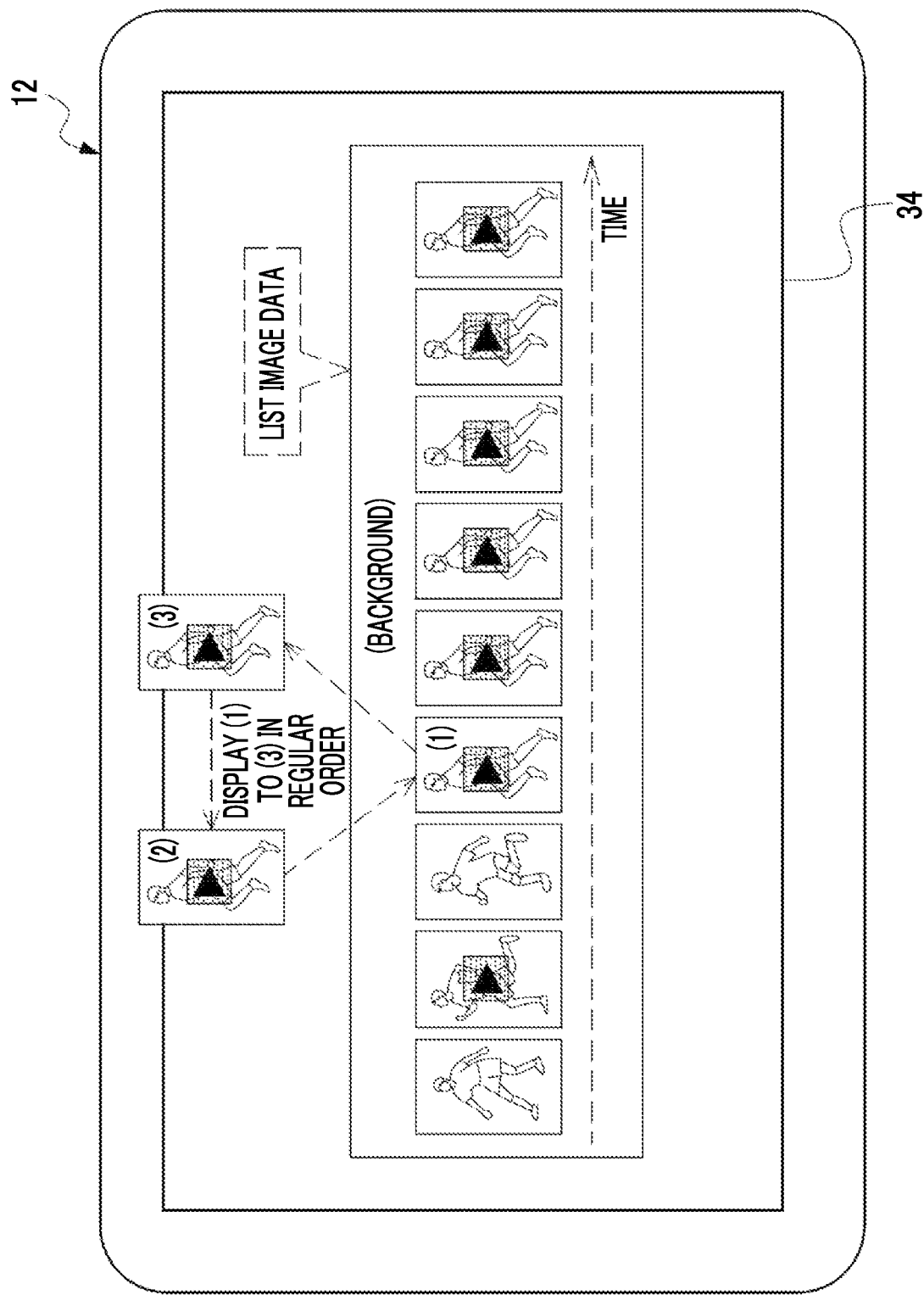
FIG. 32 is a screen view showing an example of an aspect in which the list image data indicated by the list image data shown in FIG. 31 is displayed on the display of the user device.

In addition, in the embodiment described above, in the display region of the adjustment frame display image of one frame, only the adjustment frame display image based on the adjustment frame display image data of one frame generated from the original image data of one frame is displayed, but the technology of the present disclosure is not limited. For example, in the display region of the adjustment frame display image of one frame, the adjustment frame display images of a plurality of frames indicated by the adjustment frame display image data of a plurality of frames (for example, "digest version reduction display image data" shown in FIG. 31) generated from the original image data of the plurality of frames may be displayed in regular order. The digest version reduction display image data shown in FIG. 31 corresponds to the plurality of original image data constituting at least a part of the video image file that is the basis of the generation of the digest version reduction display image data. In the example shown in FIG. 32, in the display region of the adjustment frame display image of one frame, the adjustment frame display images of three frames indicated by the adjustment frame display image data of three frames constituting the digest version reduction display image data are displayed in regular order. With the present configuration, since it is not necessary to display the adjustment frame display images of the plurality of frames side by side, it is possible to grasp the outline of the video image file even in a case in which a display space is limited.

Figure 33:
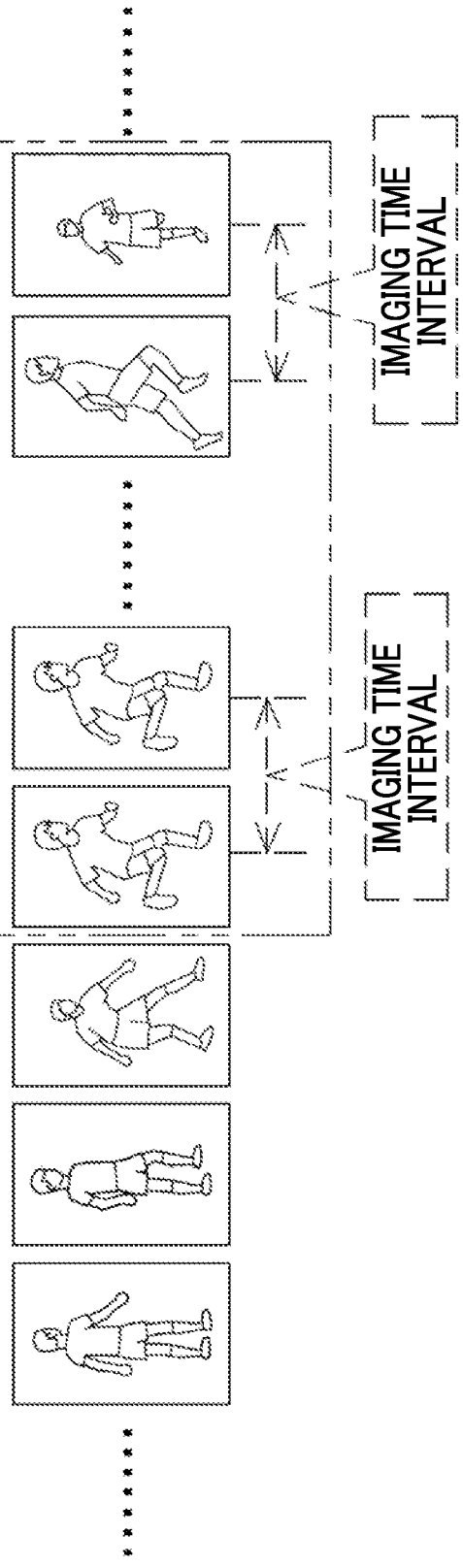
FIG. 33 is a conceptual diagram showing an example of an aspect of a block in which an interval of imaging time points between adjacent frames is equal to or smaller than a predetermined interval.

In addition, in the embodiment described above, the number of frames of the adjustment frame display image data is derived in accordance with the number of frames counted by the frame number counting unit 60I, but the technology of the present disclosure is not limited to this. For example, the number of frames of the adjustment frame display image data may be derived in accordance with an interval of the imaging time points in one block (hereinafter, also referred to as "display image data block") in a reduction display image data group of the previous year for the common event (in the example shown in FIG. 26, all the reduction display image data included in the list image data relating to the 2018-year sports day image file group). For example, as shown in FIG. 33, the number of frames of the adjustment frame display image data may be derived in accordance with an average value of the imaging time intervals in the block in which the interval of the imaging time points between adjacent frames (hereinafter, also referred to as "imaging time interval") is equal to or smaller than the predetermined interval (for example, 1 second) in the reduction display image data group of the previous year for the common event. It should be noted that a median value or a mode value may be adopted instead of the average value. It should be noted that, in a case in which there are a plurality of display image data blocks, the average value, the median value, or the mode value of the imaging time interval between the reduction display image data included in all the display image data blocks need only be calculated and used.

Figure 34:
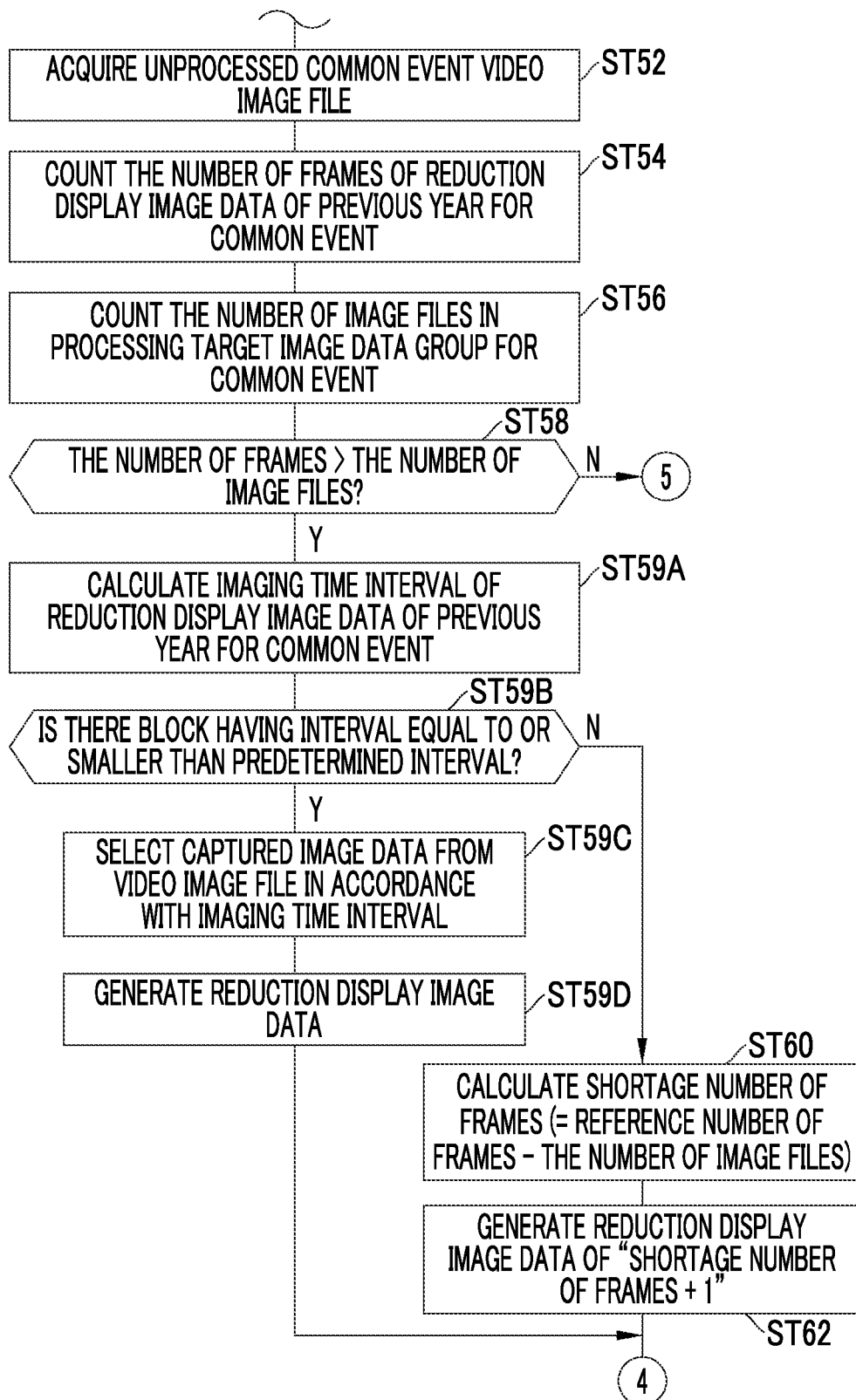
FIG. 34 is a flowchart showing a modification example of the flow of the list image data generation process according to the embodiment.

As described above, in order to derive the number of frames of the adjustment frame display image data in accordance with the interval of the imaging time points in the display image data block, as shown in FIG. 34 as an example, the CPU 60 executes the list image data generation process. The flowchart shown in FIG. 34 is different from the flowchart in FIG. 28C in that step ST59A to step ST59C are provided between step ST58 and step ST60.

In the list image data generation process shown in FIG. 34, in step ST59A, the CPU 60 calculates the imaging time interval of the reduction display image data of the previous year for the common event, and then the list image data generation process proceeds to step ST59B.

In step ST59B, the CPU 60 determines whether or not there is a block of which the imaging time interval calculated in step ST59A is equal to or smaller than the predetermined interval in the reduction display image data group of the previous year for the common event. It should be noted that the predetermined interval may be a fixed value, or may be a variable value that is changed in accordance with a given condition.

In step ST59B, in a case in which there is no block of which the imaging time interval calculated in step ST59A is equal to or smaller than the predetermined interval in the reduction display image data group of the previous year for the common event, a negative determination is made, and the list image data generation process proceeds to step ST60. In step ST59B, in a case in which there is the block of which the imaging time interval calculated in step ST59A is equal to or smaller than the predetermined interval in the reduction display image data group of the previous year for the common event, a positive determination is made, and the list image data generation process proceeds to step ST59C.

In step ST59C, the CPU 60 selects the captured image data from the common event video image file acquired in step ST52 in accordance with the imaging time interval in the block, and then the list image data generation process proceeds to step ST59D. In this step ST59C, the captured image data is selected from the common event video image file at the time interval corresponding to the average value of the imaging time intervals in the block.

In step ST59D, the CPU 60 extracts the original image data from the captured image data selected in step ST59C, and reduces the extracted original image data to generate the reduction display image data, and then the list image data generation process proceeds to step ST68 shown in FIG. 28D.

With the configurations shown in FIGS. 33 and 34, even in a case in which the adjustment number of frames is not calculated based on the number of frames by the frame number counting unit 60I, the number of frames of the adjustment frame display image data can be made close to the number of frames of the reduction display image data of the previous year.

In the embodiment described above, the 2019-year sports day image file group has been described as an example, but as the image data group relating to the year of 2019, the image data group relating to the big event other than the sports day may also be adopted. Here, as an example, a case will be considered in which the image data group relating to the year of 2019 includes a first video image file having a first attribute and a second video image file having a second attribute. It should be noted that, here, the first video image file is an example of "first video image data" according to the technology of the present disclosure, and the second video image file is an example of "second video image data" according to the technology of the present disclosure. In addition, the first attribute is, for example, the big event called the sports day, and the second attribute is, for example, the big event called the concert.

Figure 35:
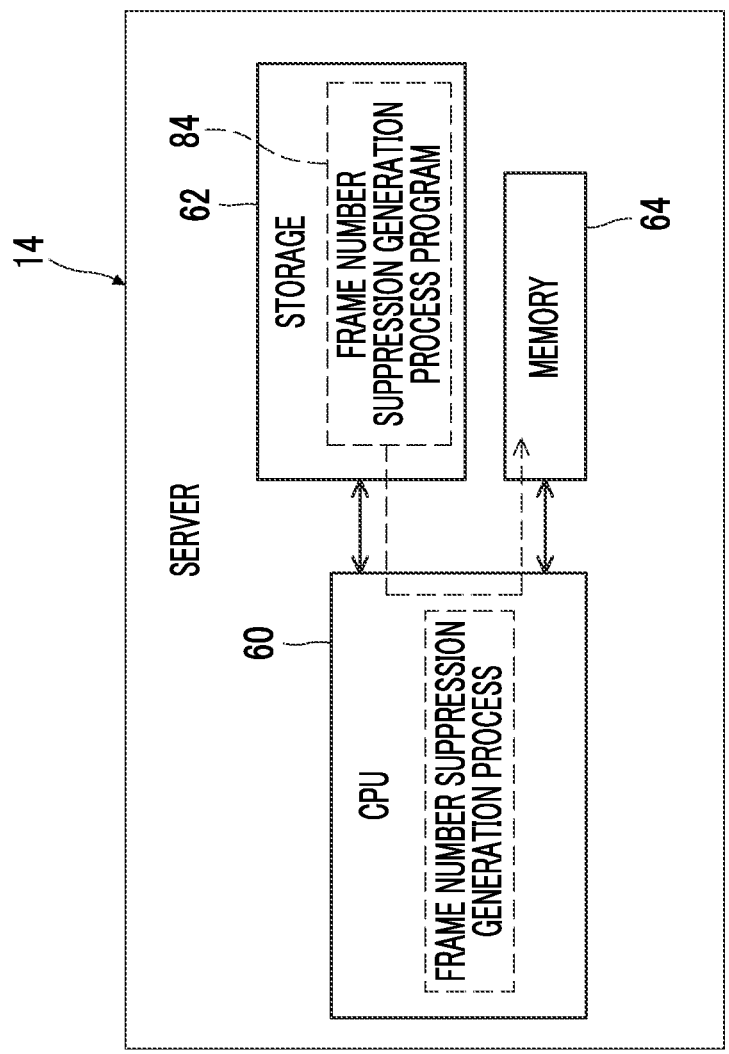
FIG. 35 is a block diagram showing an example of a configuration in which a frame number suppression generation process is executed by the CPU of the server provided in the information processing system according to the embodiment.

In this case, as shown in FIG. 35 as an example, the CPU 60 executes the frame number suppression generation process. A frame number suppression generation process program 84 is stored in the storage 62. The frame number suppression generation process is realized by reading out the frame number suppression generation process program 84 from the storage 62 by the CPU 60 and executing the frame number suppression generation process program 84 on the memory 64.

The CPU 60 executes the frame number suppression generation process to generate the adjustment frame display image data from the video image file by the number of frames determined in accordance with a smaller number of frames out of first and second numbers of frames in a case in which the first number of frames of the adjustment frame display image data corresponding to the first video image file and the second number of frames of the adjustment frame display image data corresponding to the second video image file are different from each other.

Figure 36B:
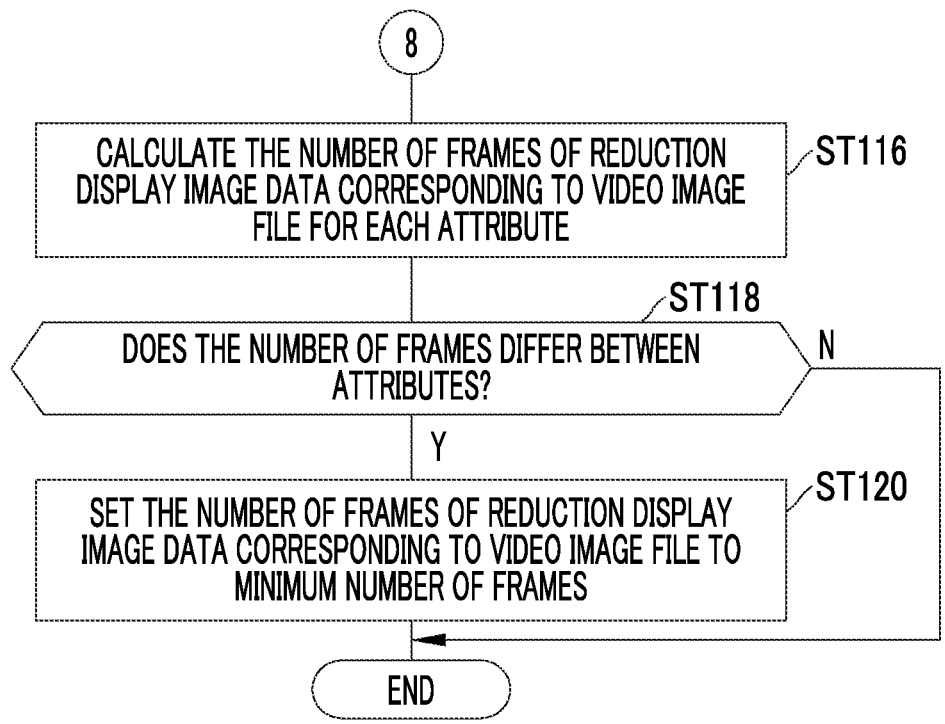
FIG. 36B is a continuation of the flowchart shown in FIG. 36A.

FIGS. 36A and 36B show examples of a flow of the frame number suppression generation process. The frame number suppression generation process shown in FIGS. 36A and 36B is executed by the CPU 60, for example, on condition that the process of step ST74 shown in FIG. 28D is terminated. It should be noted that, in the following, for convenience of description, it is premised that the image file group of the year of 2018 and the image file group of the year of 2019 are the processing targets.

In the frame number suppression generation process shown in FIG. 36A, first, in step ST100, the CPU 60 calculates the data amount of the image file group of a year of 2018, and then the frame number suppression generation process proceeds to step ST102.

In step ST102, the CPU 60 calculates the data amount of the video image file in the image file group of the year of 2018, and then the frame number suppression generation process proceeds to step ST104.

In step ST104, the CPU 60 calculates a 2018-year video image data ratio, and then the frame number suppression generation process proceeds to step ST106. The 2018-year video image data ratio is a ratio of the data amount calculated in step ST102 to the data amount calculated in step ST100.

In step ST106, the CPU 60 calculates the data amount of the image file group of the year of 2019, and then the frame number suppression generation process proceeds to step ST108.

In step ST108, the CPU 60 calculates the data amount of the video image file in the image file group of the year of 2019, and then the frame number suppression generation process proceeds to step ST110.

In step ST110, the CPU 60 calculates a 2019-year video image data ratio, and then the frame number suppression generation process proceeds to step ST112. The 2019-year video image data ratio is a ratio of the data amount calculated in step ST108 to the data amount calculated in step ST106.

In step ST112, the CPU 60 calculates an increase rate of the video image data ratio, and then the frame number suppression generation process proceeds to step ST114. It should be noted that the increase rate is an example of a "degree of a temporal change of a ratio" according to the technology of the present disclosure.

In step ST114, it is determined whether or not the increase rate calculated in step ST112 is higher than a predetermined increase rate (for example, 30%). The predetermined increase rate is an example of a "predetermined degree" according to the technology of the present disclosure. The predetermined increase rate may be a fixed value, or may be a variable value that is changed in accordance with a given condition. In step ST114, in a case in which the increase rate calculated in step ST112 is equal to or smaller than the predetermined increase rate, a negative determination is made, and the frame number suppression generation process proceeds to step ST100. In step ST114, in a case in which the increase rate calculated in step ST112 is higher than the predetermined increase rate, a positive determination is made, and the frame number suppression generation process proceeds to step ST116 shown in FIG. 36B.

In step ST116 shown in FIG. 36B, the CPU 60 calculates the number of frames of the reduction display image data corresponding to the video image file for each attribute. Specifically, the number of frames of the reduction display image data corresponding to the first video image file and the number of frames of the reduction display image data corresponding to the second video image file are calculated. It should be noted that, in this step ST116, the number of frames of the reduction display image data is calculated on the premise that the reduction display image data of one frame is generated for the captured image data of one frame.

In next step ST118, the CPU 60 determines whether or not the number of frames differs between the attributes. That is, the CPU 60 determines whether or not the number of frames of the reduction display image data corresponding to the first video image file and the number of frames of the reduction display image data corresponding to the second video image file are different from each other. In step ST118, in a case in which the number of frames is the same between the attributes, a negative determination is made, and the frame number suppression generation process is terminated. In a case in which the number of frames differs between the attributes in step ST118, a positive determination is made, and the frame number suppression generation process proceeds to step ST120.

In step ST120, the CPU 60 sets the number of frames of the reduction display image data corresponding to the video image file, that is, the number of frames of the adjustment frame display image data included in the list image data generated in step ST74 shown in FIG. 28D to the minimum number of frames. Here, the minimum number of frames refers to a smaller number of frames out of the number of frames of the reduction display image data corresponding to the first video image file and the number of frames of the reduction display image data corresponding to the second video image file. The process of this step ST120 is executed, and then the frame number suppression generation process is terminated.

In a case in which the frame number suppression generation process is executed in this way, the adjustment frame display image data is generated from the video image file by the number of frames determined in accordance with a smaller number of frames out of the first number of frames and the second number of frames. Therefore, it is possible to prevent the number of frames of the adjustment frame display image data from being excessively increased.

In addition, in a case in which the frame number suppression generation process is executed, the number of frames of the adjustment frame display image data is set to the minimum number of frames on condition that the increase rate exceeds the predetermined increase rate. Therefore, it is possible to suppress the number of frames of the adjustment frame display image data from being excessively limited as compared with a case in which the number of frames of the adjustment frame display image data is set to the minimum number of frames regardless of the increase rate. It should be noted that, here, although the increase rate over the years from the year of 2018 to the year of 2019 has been described as an example, but the technology of the present disclosure is not limited to this, and the increase rate over seasons (for example, spring, summer, autumn, and winter), over months, over weeks, or over days may be calculated.

In addition, the number of frames of the adjustment frame display image data may be the number of frames determined in accordance with a smaller number of frames (for example, the minimum number of frames described above) out of the first number of frames and the second number of frames and the ratio (for example, the 2018-year video image data ratio described above) before the increase rate exceeds the predetermined increase rate. In this case, for example, the CPU 60 derives the number of frames of the adjustment frame display image data by using the frame number derivation table 86 shown in FIG. 37. In the frame number derivation table 86 shown in FIG. 37, the number of frames of the adjustment frame display image data is associated with the minimum number of frames and the 2018-year video image data ratio. As described above, by adopting the number of frames determined in accordance with the minimum number of frames and the 2018-year video image data ratio as the number of frames of the adjustment frame display image data, it is possible to suppress the excess or shortage of the number of frames of the adjustment frame display image data as compared with a case in which the number of frames of the adjustment frame display image data is determined depending only on the minimum number of frames or the 2018-year video image data ratio.

It should be noted that the CPU 60 may calculate the number of frames of the adjustment frame display image data by using an arithmetic expression with the minimum number of frames and the 2018-year video image data ratio as independent variables and the number of frames of the adjustment frame display image data as a dependent variable, instead of the frame number derivation table 86.

In addition, in the embodiment described above, the form example has been described in which the adjustment number of frames is calculated by adding one to the shortage number of frames, but the technology of the present disclosure is not limited to this. For example, the number of frames of the adjustment frame display image data may be derived by using the frame number derivation table 88 shown in FIG. 38. In the frame number derivation table 88 shown in FIG. 38, the number of frames of the adjustment frame display image data is associated with the shortage number of frames and the imaging time interval. Therefore, the CPU 60 need only calculate the shortage number of frames and the imaging time interval to derive the number of frames of the adjustment frame display image data from the frame number derivation table 88 in accordance with the calculated shortage number of frames and the imaging time interval. In addition, the CPU 60 may calculate the number of frames of the adjustment frame display image data by using an arithmetic expression with the shortage number of frames and the imaging time interval as independent variables and the number of frames of the adjustment frame display image data as a dependent variable.

In addition, the number of frames determined in accordance with the recording time of the video image file may be adopted as the number of frames of the adjustment frame display image data. In this case, for example, the CPU 60 need only derive the number of frames of the adjustment frame display image data by using a table to which the frame number derivation table 82 shown in FIG. 19 is applied. The table to which the frame number derivation table 82 is applied refers to, for example, a table to which the number of frames of the adjustment frame display image data is applied instead of the number of frames for video image reduction display in the frame number derivation table 82. As described above, by adopting the number of frames determined in accordance with the recording time of the video image file as the number of frames of the adjustment frame display image data, it is possible to suppress the excess or shortage of the number of frames of the adjustment frame display image data as compared with a case in which the number of frames of the adjustment frame display image data is determined without considering the recording time of the video image file.

In addition, the maximum number of frames of the adjustment frame display image data may be limited in accordance with the recording time of the video image file. As a result, it is possible to suppress an excessive increase in the number of frames of the adjustment frame display image data as compared with a case in which the number of frames of the adjustment frame display image data is determined without considering the recording time of the video image file.

In addition, in the embodiment described above, the form example has been described in which the list image data generation process is executed by the server 14, but the technology of the present disclosure is not limited to this. For example, the list image data generation process may be distributed and executed by a plurality of devices. For example, a store server that stores at least one of the image file DB 74 shown in FIG. 9 or the yearly event image file DB 80 shown in FIG. 17, an image analysis server that executes the image analysis with respect to the image file DB 74 and the yearly event image file DB 80, and a process execution server that executes a process other than the image analysis may be provided. In addition, instead of the server 14, the list image data generation process may be performed by a personal computer and/or a user device.

Figure 39:
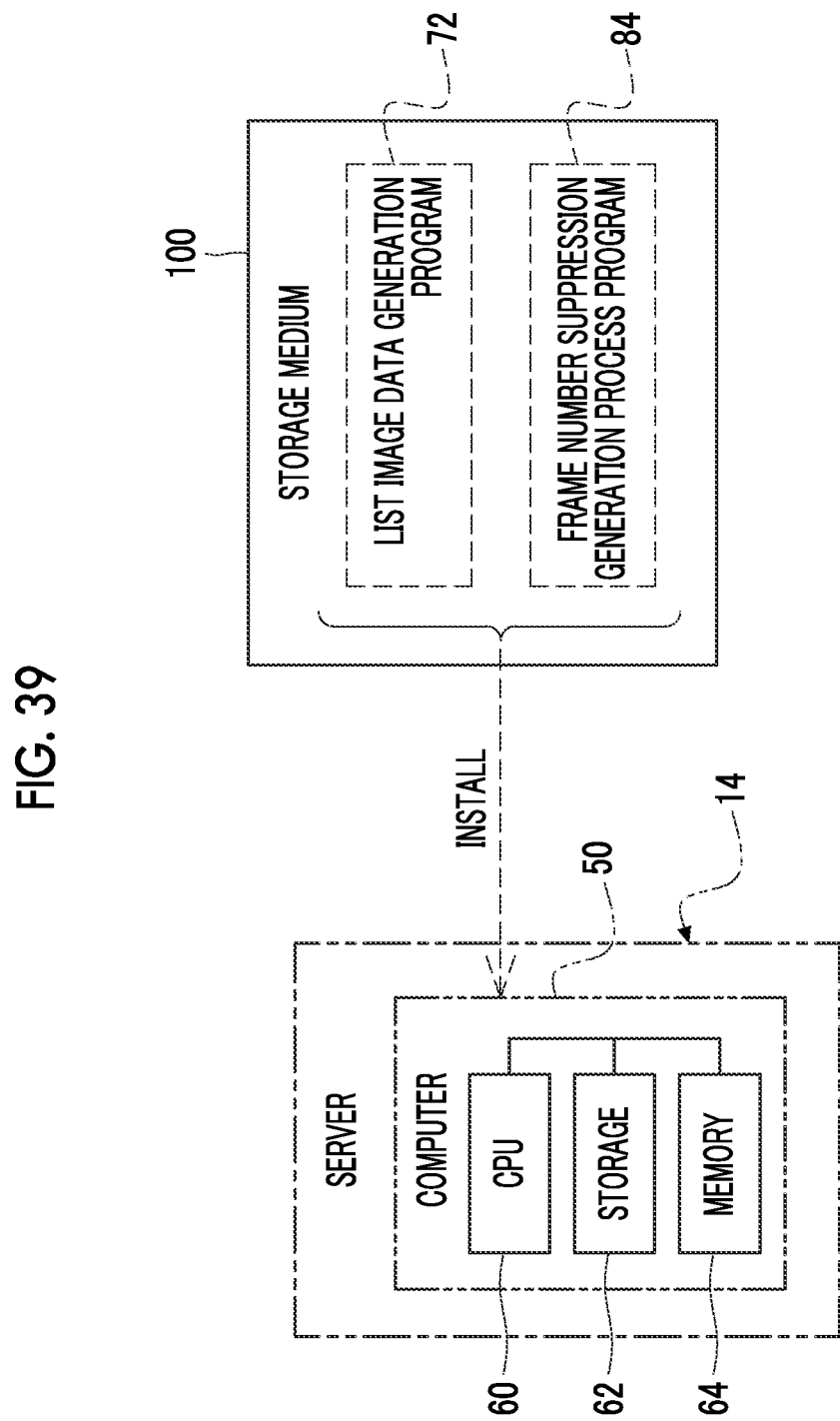
FIG. 39 is a block diagram showing an example of an aspect in which a server side program is installed in a computer in the server from a storage medium in which the server side program is stored.

In addition, in the embodiment described above, the form example has been described in which the list image data generation program 72 and the frame number suppression generation process program 84 (hereinafter, referred to as "server side program" without designating reference numeral in a case in which the distinction between these programs is not necessary) are stored in the storage 62, but the technology of the present disclosure is not limited to this. For example, as shown in FIG. 39, the server side program may be stored in a storage medium 100. The storage medium 100 is a non-transitory storage medium. Examples of the storage medium 100 include any portable storage medium, such as an SSD or a USB memory. It should be noted that the server side program is an example of a "program" according to the technology of the present disclosure.

The server side program stored in the storage medium 100 is installed in the computer 50. The CPU 60 executes the list image data generation process in accordance with the list image data generation program 72, and executes the frame number suppression generation process in accordance with the frame number suppression generation process program 84. It should be noted that, in the following, for convenience of description, the list image data generation process and the frame number suppression generation process are referred to as "server side process" in a case in which the distinction is not necessary.

In addition, the server side program may be stored in a storage unit of another computer, a server device, or the like connected to the computer 50 via a communication network (not shown), and the server side program may be downloaded in response to a request of the server 14 and installed in the computer 50.

It should be noted that, the entire server side program does not have to be stored in a storage unit of another computer, a server, or the like connected to the computer 50, or the storage 62, and a part of the server side programs may be stored.

In the example shown in FIG. 39, the CPU 60 is a single CPU, but may be a plurality of CPUs. In addition, a GPU may be applied instead of the CPU 60 or together with the CPU 60.

In the example shown in FIG. 39, although the computer 50 has been described as an example, the technology of the present disclosure is not limited to this, and a device including an ASIC, an FPGA, and/or a PLD may be applied instead of the computer 50. In addition, instead of the computer 50, a hardware configuration and a software configuration may be used in combination.

As the hardware resource for executing the server side process described in the embodiment described above, the following various processors can be used. Examples of the processor include software, that is, a CPU, which is a general-purpose processor that functions as the hardware resource for executing the server side process by executing the program. In addition, examples of the processor include a dedicated electric circuit which is a processor having a circuit configuration designed to be dedicated to executing a specific process, such as an FPGA, a PLD, or an ASIC. A memory is built in or connected to any processor, and each processor executes the server side process by using the memory.

The hardware resource for executing the server side process may be composed of one of those various processors or may be composed of a combination of two or more processors of the same type or different types (for example, a combination of a plurality of FPGAs or a combination of a CPU and an FPGA). In addition, the hardware resource for executing the server side process may be one processor.

As an example of configuring with one processor, first, there is a form in which one processor is composed of a combination of one or more CPUs and software, and this processor functions as the hardware resource for executing the server side process. Secondly, as represented by SoC, there is a form in which a processor that realizes the functions of the entire system including a plurality of hardware resources for executing the server side process with one IC chip is used. As described above, the server side process is realized by using one or more of the various processors described above as the hardware resource.

Further, as the hardware structure of these various processors, more specifically, it is possible to use an electric circuit in which circuit elements, such as semiconductor elements, are combined. In addition, the server side process described above is merely an example. Therefore, it is needless to say that unnecessary steps may be deleted, new steps may be added, or the process order may be changed within a range that does not deviate from the gist.

The above described contents and shown contents are the detailed description of the parts according to the technology of the present disclosure, and are merely examples of the technology of the present disclosure. For example, the above descriptions of the configurations, the functions, the actions, and the effects are the descriptions of examples of the configurations, the functions, the actions, and the effects of the parts according to the technology of the present disclosure. Accordingly, it is needless to say that unnecessary parts may be deleted, new elements may be added, or replacements may be made with respect to the above described contents and shown contents within a range that does not deviate from the gist of the technology of the present disclosure. In addition, in order to avoid complications and facilitate understanding of the parts according to the technology of the present disclosure, in the above described contents and shown contents, the descriptions of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

What is claimed is:

1. An image display apparatus comprising: a processor; and a memory built in or connected to the processor, wherein the processor is configured to: acquire a video image including a plurality of still images, acquire a plurality of first images having a common attribute to the video image, generate a plurality of second images from the plurality of still images included in the video image based on at least one of a number of the plurality of first images and a time interval between the plurality of first images, and display the plurality of the second images on a display.

2. The image display apparatus according to claim 1, wherein the attribute includes at least one of a date, an event, a subject, an imaging position, an imaging person, or a model of an imaging apparatus.

3. An image display method comprising: acquiring a video image including a plurality of still images; acquiring a plurality of first images having a common attribute to the video image; generating a plurality of second images from the plurality of still images included in the video image based on at least one of a number of the plurality of first images and a time interval between the plurality of first images; and displaying the plurality of the second images on a display.

4. A non-transitory computer-readable storage medium storing a program executable by a computer to perform a process comprising: acquiring a video image including a plurality of still images; acquiring a plurality of first images having a common attribute to the video image; generating a plurality of second images from the plurality of still images included in the video image based on at least one of a number of the plurality of first images and a time interval between the plurality of first images; and displaying the plurality of the second images on a display.

* * * * *